(12) United States Patent
LaBosco

(10) Patent No.: US 11,069,350 B2
(45) Date of Patent: *Jul. 20, 2021

(54) SYSTEM FOR AUDIO DISTRIBUTION INCLUDING NETWORK MICROPHONES FOR VOICE APPLICATIONS

(71) Applicant: Crestron Electronics, Inc., Rockleigh, NJ (US)

(72) Inventor: Mark LaBosco, New City, NY (US)

(73) Assignee: Crestron Electronics, Inc., Rockleigh, NJ (US)

( * ) Notice: Subject to any disclaimer, the term of this patent is extended or adjusted under 35 U.S.C. 154(b) by 189 days.

This patent is subject to a terminal disclaimer.

(21) Appl. No.: 16/207,924

(22) Filed: Dec. 3, 2018

(65) Prior Publication Data
US 2019/0103113 A1 Apr. 4, 2019

Related U.S. Application Data

(63) Continuation of application No. 15/261,296, filed on Sep. 9, 2016, now Pat. No. 10,204,622, which is a
(Continued)

(51) Int. Cl.
*G10L 15/22* (2006.01)
*G10L 21/0208* (2013.01)
(Continued)

(52) U.S. Cl.
CPC .............. *G10L 15/22* (2013.01); *G06F 3/167* (2013.01); *G10L 15/30* (2013.01); *G10L 21/0208* (2013.01); *G10L 2015/223* (2013.01)

(58) Field of Classification Search
CPC ... G10L 15/22; G10L 15/30; G10L 2015/223; G10L 21/0208; G06F 3/167
See application file for complete search history.

(56) References Cited

U.S. PATENT DOCUMENTS 5,708,704 A * 1/1998 Fisher .................... H04B 3/23
379/406.03
6,768,914 B1 * 7/2004 Garey ................ H04M 1/6033
455/569.1
(Continued)

OTHER PUBLICATIONS

"A New DOA Estimation Method Using a Circular Microphone Array," Karbasi, A., et al., School of Comp. Communc. Sciences, Ecole Polytchnique Federal de Lausanne, 2007.
(Continued)

*Primary Examiner* — Angela A Armstrong
(74) *Attorney, Agent, or Firm* — Crestron Electronics, Inc.

(57) ABSTRACT

Disclosed is a method for determining one or more spoken words, comprising: receiving acoustic audio signals at one or more microphones within a microphone system, and converting the same from acoustical energy signals into electrical audio signals and outputting them as microphone output audio signals; receiving the microphone output audio signals from the microphone device at a first input of an acoustic echo cancellation (AEC) device, and receiving a reference input signal at a second input of the AEC device; cancelling substantially all of the reference audio signal from the microphone output audio signal; and outputting the same as a corrected audio signal, and wherein the reference audio signal comprises an audio signal generated by an external audio system.

23 Claims, 22 Drawing Sheets

Related U.S. Application Data continuation-in-part of application No. 14/850,904, filed on Sep. 10, 2015, now abandoned.

(60) Provisional application No. 62/216,971, filed on Sep. 10, 2015, provisional application No. 62/048,722, filed on Sep. 10, 2014.

(51) Int. Cl.
*G10L 15/30* (2013.01)
*G06F 3/16* (2006.01)

(56) References Cited

U.S. PATENT DOCUMENTS

| | | | |
|---|---|---|---|
| 8,340,975 B1 | 12/2012 | Rosenberger | |
| 9,384,754 B2* | 7/2016 | Des Jardins | G10L 25/84 |
| 9,514,752 B2 | 12/2016 | Sharifi | |
| 9,640,174 B2 | 5/2017 | Noh | |
| 9,721,566 B2 | 8/2017 | Newendorp | |
| 9,978,387 B1* | 5/2018 | Pogue | G10L 21/0208 |
| 10,121,473 B2 | 11/2018 | Bargetzi | |
| 10,204,622 B2 | 2/2019 | Bargetzi | |
| 10,325,591 B1* | 6/2019 | Pogue | G10L 15/20 |
| 2002/0083060 A1 | 6/2002 | Wang et al. | |
| 2003/0103075 A1 | 6/2003 | Rosselot | |
| 2007/0133809 A1* | 6/2007 | Felder | G06F 3/162 |
| | | | 381/15 |
| 2009/0323925 A1* | 12/2009 | Sweeney | H04M 9/08 |
| | | | 379/406.05 |
| 2014/0064476 A1* | 3/2014 | Mani | H04M 9/082 |
| | | | 379/406.08 |
| 2014/0143550 A1* | 5/2014 | Ganong, III | G06F 21/606 |
| | | | 713/189 |
| 2014/0218517 A1 | 8/2014 | Kim | |
| 2014/0273818 A1 | 9/2014 | Sallas | |
| 2014/0286497 A1* | 9/2014 | Thyssen | H04R 3/005 |
| | | | 381/66 |
| 2015/0039319 A1 | 2/2015 | Mei | |
| 2015/0120000 A1 | 4/2015 | Coffey | |
| 2015/0198938 A1 | 6/2015 | Steele | |
| 2015/0381822 A1* | 12/2015 | Awano | H04M 9/082 |
| | | | 704/205 |
| 2017/0069321 A1 | 3/2017 | Toiyama | |
| 2017/0127124 A9 | 5/2017 | Wilson | |

OTHER PUBLICATIONS

"Direction of Arrival Estimation Using the Parameterized Spatial Correlation Matrix," Dmochowski, J., et al., IEEE Transactions on Audio, Speech, and Language Processing, vol. 15, No. 4, May 2007.
"Microphone Arrays: A Tutorial," McCowan, I., derived from "Robust Speech Recognition using Microphone Arrays," McCowan, I., PhD Thesis, Queensland University of Technology, Australia, 2001.
https://www.xmos.com/support/boards?product=35564; Sep. 1, 2016.
http://www.vocal.com/voice/; Sep. 1, 2016.
"Time Synchronization for ZigBee Networks," Cox., D., et al, Electrical and Computer Engineering Department, University of Alabama in Huntsville, Huntsville, AL, IEEE 0-7803-8808-09/05, Sep. 2005.
"A Background Noise Reduction Technique Using Adapting Noise Cancellation for Microphone Arrays," Spalt, T., et al., American Institute of Aeronautics and Astronautics, Jun. 2011.
"Why Voice User Interfaces with Bemforming Microphones Work Better with xCore-Voice," Neil, P., Apr. 28, 2016, http://www.xmos.com/blog/xmos/post/introducing-xcore-voice-smart-microphone-applications.
"Multi-Microphone Adaptive Noise Reduction Strategies for Coordinated Stimulation | Bilateral Cochlear Implant Devices," Kokkinakis, K., et al., Department of Electrical Engineering, University of Texas at Dallas, Richardson, Texas, May 2010.
"Non-invasive Time Synchronization for ZigBee Wireless Sensor Networks," Ferrari, P., et al., University of Brescia, DEA,Brescia, 38 Via Branze, Italy, 978-1-4244-2275, IEEE, Mar. 2008.
"Robust Adaptive Beamforming Algorithm Using Instantaneous Direction of Arrival With Enhanced Noise Suppression Capability," Byung-Jun Yoon, et. al, Dept. of Electrical Engineering, California Institute of Technology, Pasadena, CA 91125, USA, 2007 IEEE International Conference on Acoustics, Speech and Signal Processing—ICASSP '07.
"XMOX—xCore Voice USB Smart Microphone High Performance Microphone." Product Brief, 2016 XMOS Ltd.
"Background Noise Reduction: One of your smartphone's greatest tools," Thorn, T., Mobile Phones, Feb. 28, 2014, http://www.techradar.com/news/phone-and-communications/mobile-phones/background-noise-reduction-one-of-your-smartohone-s-greatest-tools-1228924.
"With HomeKit Support in the Caseta Wireless Smart Bridge Lutron lets iPhone and iPad Owners Light up Their Lives," http://www.imore.com/lutron-launches-hoekit-enabled-cas-ta-wireless-smart-bridge; Jun. 2, 2015.
"Lutron Launches HomeKit-Enabled Caseta Wireless Smart Bridge," Ritchie, Renie, Jun. 2, 2015.
Jan. 11, 2018—OfficeAction.
Apr. 11, 2018—Amendment NFOA.
Jun. 6, 2018 Amendment NFOA.
Jul. 2, 2018 Supplemental Amendment NFOA.
Aug. 1, 2018 Notice of Allowance.
Aug. 16, 2018 Second Supplemental Amendment NFOA.
Aug. 30, 2016 Corrected Notice of Allowability.
Aug. 30, 2018 Comments on Allowability.
Sep. 28, 2018 Notice of Allowance.
Webpage printout of Review of Amazon Echo Product; httpswww.engadget.comproductsamazonecho; Sep. 4, 2016.
Jan. 25, 2018—OfficeAction.
Nov. 26, 2018—FinalOfficeAction.
Jul. 23, 2018—AmendmentAsFiled.

\* cited by examiner

SYSTEM FOR AUDIO DISTRIBUTION INCLUDING NETWORK MICROPHONES FOR VOICE APPLICATIONS

PRIORITY INFORMATION

The present application claims priority under 35 U.S.C. § 120 as a Continuation-in-Part application to U.S. Non-provisional patent application Ser. No. 15/261,296, filed 9 Sep. 2016 (client matter number CP00328-01); U.S. Non-provisional patent application Ser. No. 15/261,296 (client matter number CP00328-01), claims priority under 35 U.S.C. § 119(e) to U.S. Provisional Patent Application No. 62/216,971, filed 10 Sep. 2015 (client matter number CP00328-00); U.S. Non-provisional patent application Ser. No. 15/261,296 (client matter number CP00328-01), claims priority as a Continuation-in-Part application to U.S. Non-provisional patent application Ser. No. 14/850,904, filed 10 Sep. 2015 (client matter number CP00296-01); and U.S. Non-provisional patent application Ser. No. 14/850,904 (client matter number CP00296-01), claims priority under 35 U.S.C. § 119(e) to U.S. Provisional Patent Application No. 62/048,722 (client matter number CP00296-00), filed 10 Sep. 2014, the entire contents of all of which are expressly incorporated herein by reference.

CROSS REFERENCE TO RELATED APPLICATIONS

Related subject matter is disclosed in Applicants' co-pending and co-filed U.S. Non-provisional patent application Ser. No. 16/207,847, entitled "System for Audio Distribution Including Network Microphones for Voice Applications," co-filed on Dec. 3, 2018, the entire contents of which are expressly incorporated herein by reference. Related subject matter is disclosed in Applicants' U.S. Non-Provisional patent application Ser. No. 14/850,904, entitled "Improvements in Configuring a Control System," filed on 10 Sep. 2015, the entire contents of which are expressly incorporated herein by reference. Related subject matter is also disclosed in Applicants' co-pending U.S. Non-Provisional patent application Ser. No. 15/261,296, entitled "Acoustic Sensory Network," filed on 9 Sep. 2016, the entire contents of which are expressly incorporated herein by reference.

BACKGROUND

Technical Field

Aspects of the embodiments relate generally to control networks, and more specifically to systems, methods, and modes for controlling controllable devices in the control network based on audio commands alone, according to an aspect of the embodiments, and in further aspects of the embodiments, controlling the controllable devices of the control network based on audio commands and other sensory information.

Background Art

Today, there are home control systems that include lighting, shades, environmental controls, security, audio-visual (AV), and other types of sub-systems. In many of the currently available home control systems, the user can turn and off components of such systems (from hereon in referred to as "controllable devices"), for example, lighting products, by a switch, one or more remote control (RC) devices (such as a dedicated RC device, or through some other type of RC device), remotely through network messages (e.g., command and control messages through the internet), and other means, such as speech.

In the latter case, users always desire more convenient methods for managing controllable devices, and the advent of speech based control in handheld devices has led to a desire for speech based control of controllable devices. Currently, lights can be turned on and off automatically when a user enters a room via use of a motion sensor. However, the motion sensor can take several minutes after an occupant has left a room to turn off the lights. This leads to wasted energy and frustration. Speech based control can allow a user to (relatively) quickly turn off lights while leaving a room. That is, when speech based control systems work.

As those of skill in the art can appreciate, there are several problems with speech based control systems that must be addressed. Among them are inoperativeness, false positives, collocation issues, and privacy issues. In regard to inoperativeness, this is defined by the speech based control system simply failing to respond at all to a proper command. A false positive is when a user does not intend the controllable device to turn off, but it does. This can occur because the speech recognition system misinterprets the recorded audible signal, and incorrectly applies a control, when one was not intended. Collocation issues can arise when two control devices are relatively close to each other, and a command is heard by both, and both or the wrong device acts on the command that was intended for a first control device, but not the second. The privacy issue arises when certain private areas of a home (e.g., the lavatory) are adjacent to other rooms; commands issued in or near that room can be misinterpreted by the system, causing occupants to make possible embarrassing counter-commands.

Accordingly, a need has arisen for more precise audible control of a control network and the controllable devices that make up the control network by providing systems, methods, and modes for controlling controllable devices in the control network based on audio commands alone, according to an aspect of the embodiments, and in further aspects of the embodiments, controlling the controllable devices of the control network based on audio commands and other sensory information.

Existing voice recognition systems (VRSs) are only capable of hearing voices with a relatively high signal-to-noise ratio (SNR) in the presence of multimedia audio (MMA) if the VRS is also the source of the multimedia audio—that is, if the VRS broadcasts MMA, as well as the voice responses, then the VRS can effectively perform voice recognition on the unknown spoken words. Nonetheless, voice recognition systems have improved over the years and cloud-based implementations (e.g., those systems that interconnect via the Internet to one or more remotely based servers), have become popular in phones and home audio devices. Audio devices like the Amazon Echo®, Google-Home®, and Apple HomePod® are some of the most popular audio playing products sold. These devices have the ability to always listen and recognize keywords (i.e., they are always "on" or enabled, and substantially continuously monitor the output of a microphone for keywords). Once a keyword is detected, the device records the subsequent audio and sends it to the cloud for recognition (i.e., remotely located server or serves), parsing and resulting action. Many of these devices are also audio player devices and have speakers incorporated into them. Some devices can have auxiliary audio outputs that allow for external amplifiers and speakers to be used for the content output from the device. These devices can also have one or more microphones used to listen for voice commands.

VRSs also use one or more of several signal processing techniques to improve the SNR detection capability of the microphones. Many of these techniques involve the use of multiple microphones. These include algorithms such as auto-mixing, beam forming, de-reverberation, noise suppression, and gain control, among others. In addition, devices that play audio utilize acoustic echo cancellation (AEC) to help eliminate the media sound played by the device from the microphone signal (i.e., the electrical output signal of the microphone transducer). It is known by those of skill in the art that an AEC implementation in a VRS cannot eliminate the sound from another multimedia device, such as a television playing in the room, because the VRS that is using the AEC does not have a reference signal for the audio output by that device's speakers (i.e., the speakers from the television).

Thus, a need exists to improve voice recognition systems such that the effects of external audio, substantially regardless of its source, can be compensated when processing spoken commands to the voice recognition system.

SUMMARY

It is an object of the embodiments to substantially solve at least the problems and/or disadvantages discussed above, and to provide at least one or more of the advantages described below.

It is therefore a general aspect of the embodiments to provide systems, methods, and modes that will obviate or minimize problems of the type previously described by controlling controllable devices in a control network based on audio commands alone, according to an aspect of the embodiments, and in further aspects of the embodiments, controlling the controllable devices of the control network based on audio commands and other sensory information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

According to a first aspect of the embodiments, a system is provided for determining which controllable device an audible command is directed towards, the system comprising two or more controllable devices; two or more electronic devices, each of which is adapted to receive the audible command, add a respective electronic device identifier to the received audible command, time and date stamp the received audible command, and transmit the respective time and date stamped versions of the audible command, and wherein each of the two or more electronic device are further adapted to control respective ones of the two or more controllable devices; and a central processor adapted to receive each of the transmitted time and date stamped versions of the audible command and perform processing based on the time and date stamp, wherein the electronic device that reports the earlier time and date stamp, as ascertained by the respective electronic device identifier and a comparison of each of the time and date stamps performed by the central processor, is the electronic device to which the audible command is directed towards.

According to the first aspect of the embodiments, the time and date stamped versions of the audible command further conveys amplitude information of the respectively received audible command, and wherein each of the two or more electronic devices are further adapted to compare the amplitudes of the received audible commands, and determine, based on the amplitude of the received audible commands, which controllable device the audible command is directed towards, based on a larger amplitude.

According to a second aspect of the embodiments, a system is provided for determining which controllable device an audible command is directed towards, the system comprising two or more controllable devices; two or more controlling devices, each of which is adapted to control respective ones of the two or more controllable devices, receive the audible command, digitize the received audible command, and transmit the same; and a central processor adapted to receive the transmitted digitized audible commands from the two or more controlling devices, and apply a speech recognition algorithm to the received digitized audible commands to determine which controllable device the received audible command is directed towards.

According to the second aspect of the embodiments, the system further comprises the central processor being further adapted to prepare and transmit a control command to the controllable device that the received audible command was directed towards, to enact the audible command.

According to a third aspect of the embodiments, a method for determining which controllable device an audible command is directed towards is provided, the method comprising: receiving at two or more controlling devices an audible command, the audible command directed to control at least one of two or more controllable devices controlled by a respective one of the two or more controlling devices; digitizing the received audible command and transmitting the same by each of the two or more controlling devices; receiving the transmitted digitized audible commands at a central processor and applying a speech recognition algorithm to determine which of the at least two or more controllable devices the audible command was directed towards.

According to the third aspect of the embodiments, the method further comprises adding a unique controlling device identifier to the received audible command at each respective controlling device; applying a time and date stamp to the received audible command at each respective controlling device; transmitting the respective time and date stamped versions of the received audible command; and receiving the transmitted time and date stamped versions of the audible commands at a central processor, the central processor adapted to receive each of the transmitted time and date stamped versions of the audible command and perform processing based on the time and date stamp, and wherein the central processor is further adapted to determine the earliest time and date stamp of each of the received audible commands by comparing each of the respective time and date stamps of each of the received audible commands; generating a command signal by the central processor and transmitting the same to the controllable device that corresponds to the controlling device that had the earliest time and date stamp.

According to the third aspect of the embodiments, the method further comprises adding a unique controlling device identifier to the received audible command at each respective controlling device; transmitting the respective audible commands with the unique controlling device identifier; and receiving the transmitted audible commands at a central processor, the central processor adapted to receive each of the transmitted audible commands and applying a central processor generated time and date stamp to each received audible commands, and wherein the central processor is further adapted to determine the earliest time and date stamp of each of the received audible commands by comparing each of the respective time and date stamps of each of the received audible commands; generating a command signal by the central processor and transmitting the same to the controllable device that corresponds to the controlling device that had the earliest time and date stamp.

According to a fourth aspect of the embodiments, a method for determining which controllable device an audible command is directed towards is provided, the method comprising: receiving at each of two or more controlling devices the audible command, the audible command being directed to control at least one of two or more controllable devices controlled by a respective one of the two or more controlling devices; digitizing each of the received audible commands; attaching a time-date stamp to each of the digitized audible commands using a time-date stamp generator that employs a time synch protocol, and further attaching a unique identifier to each of the time-date stamped digitized audible commands so as to uniquely correlate it to a respective controlling device; determining a first received digitized audible command on the basis of an earliest time-date stamp, and further determining to which controlling device the audible command is directed to on the basis of the unique identifier of the first received digitized audible command; performing speech recognition on the first received digitized audible command to determine a command for a controllable device; and forwarding the command to the controlling device corresponding to the first received digitized audible command, the command corresponding to the spoken audible command that can be implemented on the controllable device controlled by the controlling device.

According to the fourth aspect of the embodiments, the method further comprises: receiving the command by the controlling device; and controlling the controllable device in accordance with the received command.

According to the fourth aspect of the embodiments, the step of determining further comprises: determining a magnitude of each of the digitized audible commands from respective controlling devices; and verifying that the magnitude of the digitized audible command with the earliest time-date stamp is equal to or larger than any other digitized audible commands.

According to the fourth aspect of the embodiments, the method further comprises: applying additional processing to determine which controlling device the received audible command is directed to if the magnitude of the received and digitized audible command with the earliest time-date stamp is less than any other received and digitized audible command.

According to the fourth aspect of the embodiments, the step of applying additional processing comprises: checking one or more of an occupancy sensor reading, proximity sensor reading, and motion detector reading, each of which is associated with respective controlling devices to determine which controlling device the received audible command is directed to.

According to the fourth aspect of the embodiments, the method further comprises: determining that the occupancy sensor reading associated with a respective controlling device matches the received audible command in order to determine that the received audible command should be applied to the controllable device controlled by the respective controlling device.

According to the fourth aspect of the embodiments, the method further comprises: determining that the proximity sensor reading associated with a respective controlling device matches the received audible command in order to determine that the received audible command should be applied to the controllable device controlled by the respective controlling device.

According to the fourth aspect of the embodiments, the method further comprises: determining that the motion detector reading associated with a respective controlling device matches the received audible command in order to determine that the received audible command should be applied to the controllable device controlled by the respective controlling device.

According to the fourth aspect of the embodiments, the method further comprises: applying noise reduction processing.

According to the fourth aspect of the embodiments, the step of applying noise reduction to the received audible command comprises: filtering the received audible command in an analog domain to attenuate a first bandwidth of noise energy.

According to the fourth aspect of the embodiments, the step of applying noise reduction comprises: using one or more of acoustic echo cancellation filtering, direction of arrival filtering, and directionally adaptive beam forming filtering, to filter the digitized audible command in a digital domain to attenuate noise energy and to amplify audible command energy.

According to the fourth aspect of the embodiments, the noise energy comprises: noise energy generated by one or more of a fan motor, music, air conditioning noise, audio generated by multi-media presentations, and non-command words.

According to the fourth aspect of the embodiments, the method further comprises: receiving at least one additional audible command from at least one additional spatially separated microphone, the at least one additional spatially separated microphone associated with a respective controlling device; digitizing the at least one additional audible command received from the at least one additional spatially separated microphone; attaching a time-date stamp to the at least one digitized additional audible command, and further attaching a unique identifier to each time-date stamped digitized additional audible command so as to uniquely correlate it to its respective controlling device; and using the at least one additional digitized audible command to assist in determining to which controlling device the audible command is directed to.

According to the fourth aspect of the embodiments, the step of determining, on the basis of the time-date stamp, to which controlling device the digitized audible command is directed to, comprises: generating the time-date stamp using a time-date stamp generator, the time-date stamp generator located in at least one controlling device that includes a plurality of microphones located at the controlling device;

averaging all of the time-date stamps generated at the controlling device with a plurality of microphones; and attaching the averaged time-date stamp to each of the plurality of digitized audible commands prior to the step of transmitting.

According to the fourth aspect of the embodiments, the steps of determining, performing, and forwarding are performed by a central controller.

According to the fourth aspect of the embodiments, the steps of digitizing, and attaching the time-date stamp are performed by the controlling device.

According to the fourth aspect of the embodiments, the controllable devices include one or more of a sensor, lighting control device, shade device, audio/video device, environmental control device, security device, household appliance, control device, and industrial device.

According to the fourth aspect of the embodiments, the controlling device comprises a keypad.

According to a fifth aspect of the embodiments, an acoustic sensor network is provided, comprising: two or more controllable devices; two or more controlling devices, each of two or more controlling devices comprising at least one respective microphone, a time-date stamp generator, and an analog to digital converter, each of the two or more controlling devices being adapted to control a respective one of the two or more controllable devices, and wherein each of the two or more controlling devices are further adapted to receive an audible command through its respective microphone, the received audible command being directed to control one of the two or more controllable devices controlled by a respective controlling device, and wherein each of the analog to digital converters are adapted to digitize the received audible command, and wherein each of the two or more controlling devices are further adapted to attach a time-date stamp to each of the digitized audible commands using the time-date stamp generator that employs a time synch protocol and attach a unique identifier to each of the time-date stamped digitized audible commands so as to uniquely correlate the time-date stamped digitized audible command to a respective controlling device; and a central controller adapted to determine, on the basis of an earliest time-date stamp, a first received digitized audible command and the controlling device to which the audible command is directed to, and wherein the central controller is further adapted to perform speech recognition on the first received digitized audible command to determine a command for a controllable device, and wherein the central controller is further adapted to forward the command to the controlling device corresponding to the first received digitized audible command, the command corresponding to the audible command that can be implemented on the controllable device controlled by the controlling device.

According to the fifth aspect of the embodiments, the controlling device that receives the command is adapted to control the controllable device in accordance with the received command.

According to the fifth aspect of the embodiments, the central controller is further adapted to determine a magnitude of each of the digitized audible commands from respective controlling devices, and verify that the magnitude of the digitized audible command with the earliest time-date stamp is equal to or larger than any other digitized audible command signal.

According to the fifth aspect of the embodiments, the central controller is further adapted to apply additional processing to determine which controlling device the received audible command is directed to if the magnitude of the digitized audible command signal with the earliest time-date stamp is less than any other received audible command.

According to the fifth aspect of the embodiments, the central controller is further adapted to check one or more of an occupancy sensor reading, proximity sensor reading, and motion detector reading, each of which is associated with respective controlling devices to determine which controlling device the received audible command is directed to.

According to the fifth aspect of the embodiments, the central controller is further adapted to determine that the occupancy sensor reading associated with a respective controlling device matches the received audible command in order to determine that the received audible command should be applied to the controllable device controlled by the respective controlling device.

According to the fifth aspect of the embodiments, the central controller is further adapted to determine that the proximity sensor reading associated with a respective controlling device matches the received audible command in order to determine that the received audible command should be applied to the controllable device controlled by the respective controlling device.

According to the fifth aspect of the embodiments, the central controller is further adapted to determine that the motion detector reading associated with a respective controlling device matches the received audible command in order to determine that the received audible command should be applied to the controllable device controlled by the respective controlling device.

According to the fifth aspect of the embodiments, the controlling device further comprises a noise reduction processing circuit.

According to the fifth aspect of the embodiments, the noise reduction processing circuit is adapted to filter the received analog audible command signal in an analog domain to attenuate a first bandwidth of noise energy.

According to the fifth aspect of the embodiments, the noise reduction processing circuit is adapted to use one or more of acoustic echo cancellation filtering, direction of arrival filtering, and directionally adaptive beam forming filtering, to filter the digital audible command signal in a digital domain to attenuate noise energy and to amplify audible command energy.

According to the fifth aspect of the embodiments, the noise energy comprises: noise energy generated by one or more of a fan motor, music, air conditioning noise, audio generated by multi-media presentations, and non-command words.

According to the fifth aspect of the embodiments, the acoustic sensor network further comprises at least one additional spatially separated microphone, adapted to receive the audible command and associated with one of the at least two controlling devices; an analog to digital converter associated with the at least one additional spatially separated microphone, and adapted to digitize the received audible command; a time-date stamp generator adapted to add a time-date stamp to the at least one additional digitized audible command, and further adapted to add a unique identifier to the at least one time-dated stamped additional digitized audible command, the unique identifier corresponding to the associated one of the controlling devices, and further wherein the central controller uses the at least one additional digitized audible command to assist in determining to which controlling device the audible command is directed to.

According to the fifth aspect of the embodiments, the controlling device further comprises: a time-date stamp generator adapted to generate the time-date stamp; and at least two microphones, each of which digitizes the received audible command.

According to the fifth aspect of the embodiments, the controlling device is further adapted to average all of the time-date stamps generated at the controlling device, and attach the averaged time-date stamps to each of the plurality of digitized audible commands prior to transmitting the same.

According to the fifth aspect of the embodiments, the controllable devices include one or more of a sensor, lighting control device, shade device, audio/video device, environmental control device, security device, household appliance, control device, and industrial device.

According to the fifth aspect of the embodiments, the controlling device comprises a keypad.

According to a sixth aspect of the embodiments, a method for determining which controllable device an audible command is directed towards is provided, the method comprising: receiving at each of two or more controlling devices the audible command signal, the audible command being directed to control at least one of two or more controllable devices controlled by a respective one of the two or more controlling devices; digitizing each of the received audible command signals; attaching a unique identifier to each digitized audible command so as to uniquely correlate it to a respective controlling device; determining a magnitude of each of the digitized audible command; determining a digitized audible command with the greatest magnitude, and further determining to which controlling device the audible command is directed to on the basis of the unique identifier associated with the digitized audible command with the greatest magnitude; performing speech recognition on the digitized audible command with the greatest magnitude; and forwarding a command to the controlling device corresponding to the digitized audible command with the greatest magnitude, the command corresponding to the audible command that can be implemented on the controllable device controlled by the controlling device.

According to the sixth aspect of the embodiments, the method further comprises: receiving the command by the controlling device; and controlling the controllable device in accordance with the received command.

According to the sixth aspect of the embodiments, the step of determining further comprises: attaching a time-date stamp to the digitized audible command; and verifying that the time-date stamp of the greatest magnitude digitized audible command is the same or earlier than any other digitized audible command.

According to the sixth aspect of the embodiments, the step of attaching a time-date stamp to the digitized audible command is performed by the controlling device that received the audible command through use of a time-date stamp generator using a time synch protocol.

According to the sixth aspect of the embodiments, the step of attaching a time-date stamp to the digitized audible command is performed by a central controller.

According to the sixth aspect of the embodiments, the method further comprises: generating a test signal to determine a travel time from each of the plurality of controlling devices to the central controller; and modifying the time-date stamp of each received digitized audible command signal according to the travel time from a respective controlling device to the central processor, and using the modified time-date stamp to assist in determining to which controlling device the audible command signal is directed to.

According to the sixth aspect of the embodiments, the method further comprises: applying additional processing to determine which controlling device the audible command is directed to if the time-date stamp of the digitized audible command with the largest magnitude is later than any other digitized audible command.

According to the sixth aspect of the embodiments, the step of applying additional processing comprises: checking one or more of an occupancy sensor reading, proximity sensor reading, and motion detector reading, each of which is associated with respective controlling devices to determine which controlling device the audible command is directed to.

According to the sixth aspect of the embodiments, the method further comprises: determining that the occupancy sensor reading associated with a respective controlling device matches the audible command in order to determine that the audible command should be applied to the controllable device controlled by the respective controlling device.

According to the sixth aspect of the embodiments, the method further comprises: determining that the proximity sensor reading associated with a respective controlling device matches the audible command in order to determine that the audible command should be applied to the controllable device controlled by the respective controlling device.

According to the sixth aspect of the embodiments the method further comprises: determining that the motion detector reading associated with a respective controlling device matches the audible command in order to determine that the audible command should be applied to the controllable device controlled by the respective controlling device.

According to the sixth aspect of the embodiments, the step of attaching a time-date stamp comprises: generating the time-date stamp using a time-date stamp generator, the time-date stamp generator located in at least one controlling device that includes a plurality of microphones located at the controlling device; averaging all of the time-date stamps generated at the controlling device with a plurality of microphones; and attaching the averaged time-date stamp to each of the plurality of digitized audible commands prior to the step of transmitting.

According to the sixth aspect of the embodiments, the method further comprises: applying noise reduction processing, and wherein the step of applying noise reduction to the audible command comprises: filtering the received audible command signal in an analog domain to attenuate a first bandwidth of noise energy.

According to the sixth aspect of the embodiments, the step of applying noise reduction comprises: using one or more of acoustic echo cancellation filtering, direction of arrival filtering, and directionally adaptive beam forming filtering, to filter the digitized audible command in a digital domain to attenuate noise energy and to amplify audible command energy.

According to the sixth aspect of the embodiments the noise energy comprises: noise energy generated by one or more of a fan motor, music, air conditioning noise, audio generated by multi-media presentations, and non-command words.

According to the sixth aspect of the embodiments, the method further comprises: receiving at least one additional audible command from at least one additional spatially separated microphone, the at least one additional spatially separated microphone associated with a respective controlling device; digitizing the at least one additional audible command received from the at least one additional spatially separated microphone; attaching a time-date stamp to the at least one additional digitized audible command, and further attaching a unique identifier to each time-date stamped additional digitized audible command so as to uniquely correlate it to its respective controlling device; and using the at least one additional digitized audible command in the step of determining to which controlling device the audible command is directed to.

According to the sixth aspect of the embodiments, the steps of determining a magnitude, determining to which controlling device the audible command is directed to, performing, and forwarding are performed by a central controller.

According to the sixth aspect of the embodiments, the steps of receiving, digitizing, attaching the time-date stamp, and determining a magnitude, are performed by the controlling device.

According to the sixth aspect of the embodiments the controllable devices include one or more of a sensor, lighting control device, shade device, audio/video device, environmental control device, security device, household appliance, control device, and industrial device.

According to the sixth aspect of the embodiments, the controlling device comprises a keypad.

According to a seventh aspect of the embodiments, an acoustic sensor network is provided, comprising: two or more controllable devices; two or more controlling devices, each of two or more controlling devices comprising at least one respective microphone, and an analog to digital converter, each of the two or more controlling devices being adapted to control a respective one of the two or more controllable devices, and wherein each of the two or more controlling devices are further adapted to receive an audible command through at least one respective microphone, the received audible command being directed to control one of the two or more controllable devices controlled by a respective controlling device, and wherein each of the analog to digital converters are adapted to digitize the received audible command, and wherein each of the two or more controlling devices are further adapted to attach a unique identifier to each of the digitized audible commands so as to uniquely correlate it to a respective controlling device and transmit the same; and a central controller adapted to receive each of the transmitted digitized audible commands, determine a magnitude of each of the digitized audible commands, determine a digitized audible command with the greatest magnitude, and further determine to which controlling device the audible command is directed to on the basis of the unique identifier associated with the digitized audible command with the greatest magnitude, and wherein the central controller is further adapted to perform speech recognition on the digitized audible command with the greatest magnitude to determine a command for a controllable device, and wherein the central controller is further adapted to forward the command to the controlling device corresponding to the digitized audible command with the greatest magnitude, the command corresponding to the audible command that can be implemented on the controllable device controlled by the controlling device.

According to the seventh aspect of the embodiments, the controlling device that receives the command is adapted to control the controllable device in accordance with the received command.

According to the seventh aspect of the embodiments, each of the controlling devices are further adapted to attach a time-date stamp to the digitized audible commands through use of a time-date stamp generator using a time synch protocol, and wherein the central controller is further adapted to verify that the time-date stamp of the digitized audible command with the greatest magnitude is the same or earlier than the time-date stamp of any other digitized received audible command signal.

According to the seventh aspect of the embodiments, the central controller is further adapted to generate a test signal to determine a travel time from each of the plurality of controlling devices to the central controller, modify the time-date stamp of each received digitized audible command signal according to the travel time from a respective controlling device to the central processor, and use the modified time-date stamp to assist in determining to which controlling device the audible command signal is directed to.

According to the seventh aspect of the embodiments, the central controller is further adapted to apply additional processing to determine which controlling device the received audible command is directed to if the time-date stamp of the digitized audible command signal with the greatest magnitude is later than the time-date stamp any other digitized audible command.

According to the seventh aspect of the embodiments, the central controller is further adapted to check one or more of an occupancy sensor reading, proximity sensor reading, and motion detector reading, each of which is associated with respective controlling devices to determine which controlling device the received audible command is directed to.

According to the seventh aspect of the embodiments, the central controller is further adapted to determine that the occupancy sensor reading associated with a respective controlling device matches the received audible command in order to determine that the received audible command should be applied to the controllable device controlled by the respective controlling device.

According to the seventh aspect of the embodiments, the central controller is further adapted to determine that the proximity sensor reading associated with a respective controlling device matches the received audible command in order to determine that the received audible command should be applied to the controllable device controlled by the respective controlling device.

According to the seventh aspect of the embodiments, the central controller is further adapted to determine that the motion detector reading associated with a respective controlling device matches the received audible command in order to determine that the received audible command should be applied to the controllable device controlled by the respective controlling device.

According to the seventh aspect of the embodiments, the controlling device further comprises a noise reduction processing circuit.

According to the seventh aspect of the embodiments, the noise reduction processing circuit is adapted to filter the received audible command in an analog domain to attenuate a first bandwidth of noise energy.

According to the seventh aspect of the embodiments, the noise reduction processing circuit is adapted to use one or more of acoustic echo cancellation filtering, direction of arrival filtering, and directionally adaptive beam forming filtering, to filter the digitized audible command in a digital domain to attenuate noise energy and to amplify audible command energy.

According to the seventh aspect of the embodiments, the noise energy comprises noise energy generated by one or more of a fan motor, music, air conditioning noise, audio generated by multi-media presentations, and non-command words.

According to the seventh aspect of the embodiments, the acoustic sensor network further comprises: at least one additional spatially separated microphone, adapted to receive the audible command, and associated with one of the at least two controlling devices; an analog to digital converter associated with the at least one spatially separated microphone, and adapted to digitize the received audible command; a time-date stamp generator adapted to add a time-date stamp to the additional digitized audible command, and further adapted to add a unique identifier to the additional digitized audible command, the unique identifier corresponding to the associated one of the controlling devices, and further wherein the central controller uses the at least one additional digitized audible command to assist in determining to which controlling device the audible command is directed to.

According to the seventh aspect of the embodiments, the controlling device further comprises: a time-date stamp generator adapted to generate the time-date stamp; and at least two microphones, each of which digitizes the received audible command.

According to the seventh aspect of the embodiments, the controlling device is further adapted to average all of the time-date stamps generated at the controlling device, and attach the averaged time-date stamps to each of the plurality of digitized audible commands prior to transmitting the same.

According to the seventh aspect of the embodiments, the controllable devices include one or more of a sensor, lighting control device, shade device, audio/video device, environmental control device, security device, household appliance, control device, and industrial device.

According to the seventh aspect of the embodiments, the controlling device comprises a keypad.

According to an eighth aspect of the embodiments, a method for determining one or more spoken words is provided, comprising: receiving acoustic audio signals at one or more microphones within a microphone system, and converting the same from acoustical energy signals into electrical audio signals and outputting them as microphone output audio signals; receiving the microphone output audio signals from the microphone device at a first input of an acoustic echo cancellation (AEC) device, and receiving a reference input signal at a second input of the AEC device; cancelling substantially all of the reference audio signal from the microphone output audio signal; and outputting the same as a corrected audio signal, and wherein the reference audio signal comprises an audio signal generated by an external audio system.

According to the eighth aspect of the embodiments, wherein the step of cancelling comprises: subtracting the reference input signal from the microphone output audio signals and outputting the result as the corrected audio signal.

According to the eighth aspect of the embodiments, the method further comprises: receiving two or more corrected audio signals at a direction detection and beamforming device and combining the same into a single audio output signal.

According to the eighth aspect of the embodiments, the method further comprises encrypting the output of the DDB device prior to outputting the single audio signal.

According to the eighth aspect of the embodiments, the reference audio signal comprises an audio signal that is provided to external amplifiers and speakers.

According to the eighth aspect of the embodiments, the external amplifiers and speakers are located within an audible detection radius of the AEC circuit.

According to the eighth aspect of the embodiments, the external amplifiers and speakers are located within hearing distance of the two or more microphones.

According to the eighth aspect of the embodiments, the method further comprises detecting a spoken keyword in the corrected audio signal by a keyword recognition device.

According to the eighth aspect of the embodiments, the method further comprises: initiating transmission of the corrected audio signal to a voice recognition server through a network following detection of the spoken keyword; and terminating transmission of the corrected audio signal upon the occurrence of a termination event.

According to the eighth aspect of the embodiments, the termination event comprises at least one of a timeout condition, and one or more termination words.

According to the eighth aspect of the embodiments, the received acoustic audio signals comprises a combination of a desired spoken audio signal and a delayed version of undesired audio signals, and wherein the reference audio signal comprises an undelayed version of the undesired audio signals, and further wherein the corrected audio signal comprises substantially only the desired spoken audio signal.

According to the eighth aspect of the embodiments, the method further comprises delaying substantially all of the undesired audio signals by a delay circuit adapted to delay, prior to the undesired audio signals being broadcast by one or more speakers within hearing distance of the one or more microphones.

According to the eighth aspect of the embodiments, the method further comprises: receiving the corrected audio signal at a voice recognition system; and performing speech recognition analysis on the corrected audio signal by the voice recognition system.

According to the eighth aspect of the embodiments, the method further comprises responding to the recognized corrected audio signal by the voice recognition system.

According to the eighth aspect of the embodiments, the method further comprises operating the microphone system in a full duplex intercom mode.

According to the eighth aspect of the embodiments, the method further comprises operating a first microphone and one or more additional microphones through the voice recognition system in a full duplex intercom conversation mode.

According to the eighth aspect of the embodiments, the method further comprises operating the microphone system as a telephone system.

According to the eighth aspect of the embodiments, the method further comprises conducting telephone conversations between a first microphone and one or more additional microphones.

According to the eighth aspect of the embodiments, the microphone device comprises an Ethernet network device.

According to the eighth aspect of the embodiments, wherein the Ethernet network device is adapted to receive power over a power-over-Ethernet interface.

According to the eighth aspect of the embodiments, wherein the network is associated with a voice recognition system.

According to the eighth aspect of the embodiments, the method further comprises encrypting the reference audio signal prior to being transmitted from the network to the AEC device.

According to a ninth aspect of the embodiments, a method for determining one or more spoken words is provided, comprising: receiving acoustic audio signals at one or more microphones within a microphone system, and converting the same from acoustical energy signals into electrical audio signals and outputting them as microphone output audio signals; receiving the microphone output audio signals from the microphone device at a first input of an acoustic echo cancellation (AEC) device, and receiving a reference input signal at a second input of the AEC device; subtracting the reference input signal from the microphone output audio signals; and outputting the same as a corrected audio signal, and wherein the reference audio signal comprises an audio signal generated by an external audio system.

According to the ninth aspect of the embodiments, the method further comprises receiving two or more corrected audio signals at a direction detection and beamforming device and combining the same into a single audio output signal.

According to the ninth aspect of the embodiments, the method further comprises encrypting the output of the DDB device prior to outputting the single audio signal.

According to the ninth aspect of the embodiments, wherein the received acoustic audio signals comprises a combination of a desired spoken audio signal and a delayed version of undesired audio signals, and wherein the reference audio signal comprises an undelayed version of the undesired audio signals, and further wherein the corrected audio signal comprises substantially only the desired spoken audio signal.

According to a tenth aspect of the embodiments, a method is provided for determining one or more spoken words, comprising: receiving acoustic audio signals at one or more microphones within a microphone system, and converting the same from acoustical energy signals into electrical audio signals and outputting them as microphone output audio signals; receiving the microphone output audio signals from the microphone device at a first input of an acoustic echo cancellation (AEC) device, and receiving a reference input signal at a second input of the AEC device; subtracting the reference input signal from the microphone output audio signals; and outputting the same as a corrected audio signal, and wherein the reference audio signal comprises an audio signal generated by an external audio system, and wherein the reference audio signal comprises an audio signal generated by an external audio system, and further wherein the received acoustic audio signals comprises a combination of a desired spoken audio signal and a delayed version of undesired audio signals, and wherein the reference audio signal comprises an undelayed version of the undesired audio signals, and further wherein the corrected audio signal comprises substantially only the desired spoken audio signal; and delaying substantially all of the undesired audio signals by a delay circuit adapted to delay, prior to the undesired audio signals being broadcast by one or more speakers within hearing distance of the one or more microphones.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWING

Figure 1:
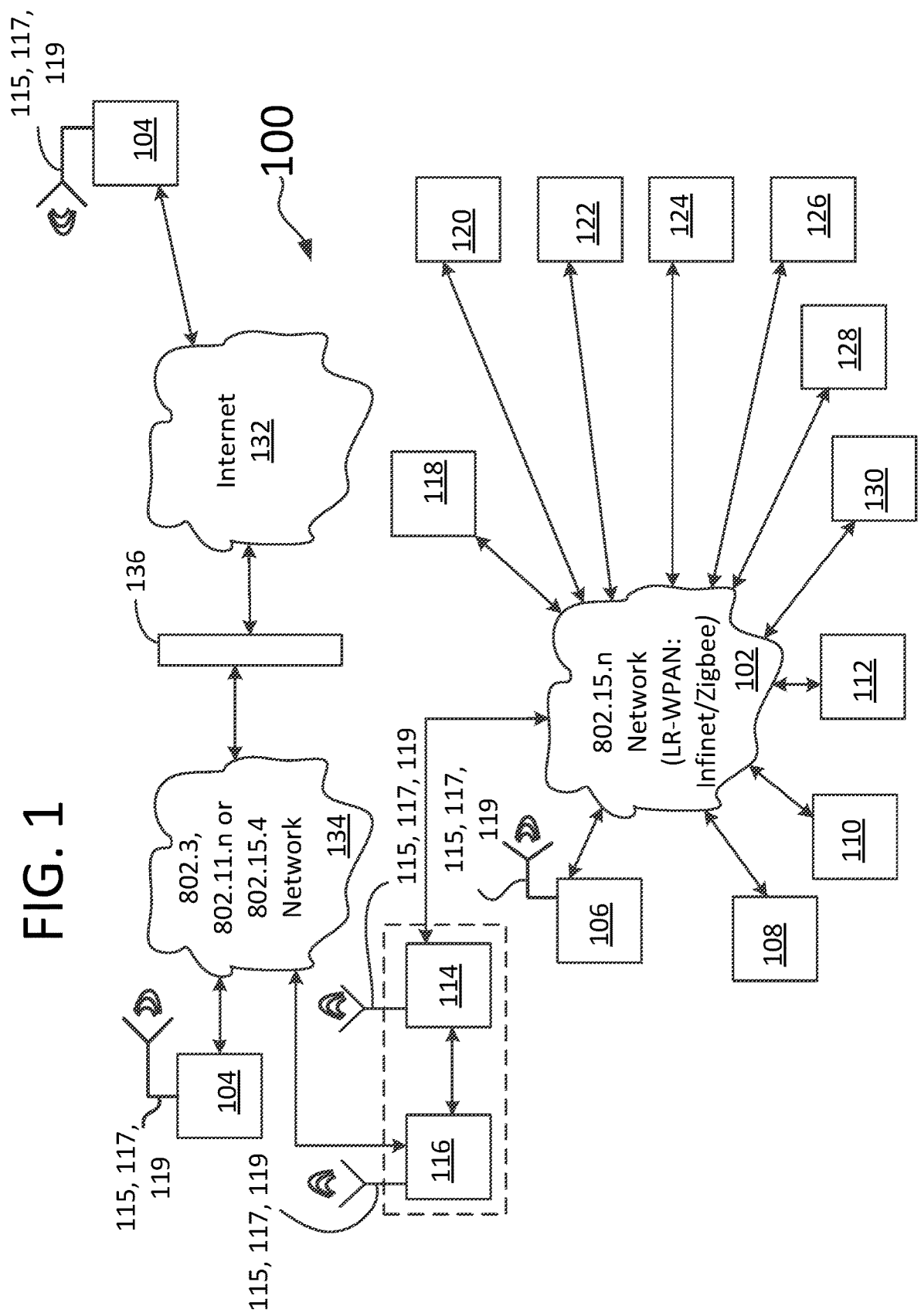

FIG. 1 illustrates a block diagram of a control network for controlling one or more controllable devices in a home, business, or enterprise environment according to aspects of the embodiments.

Figure 2:
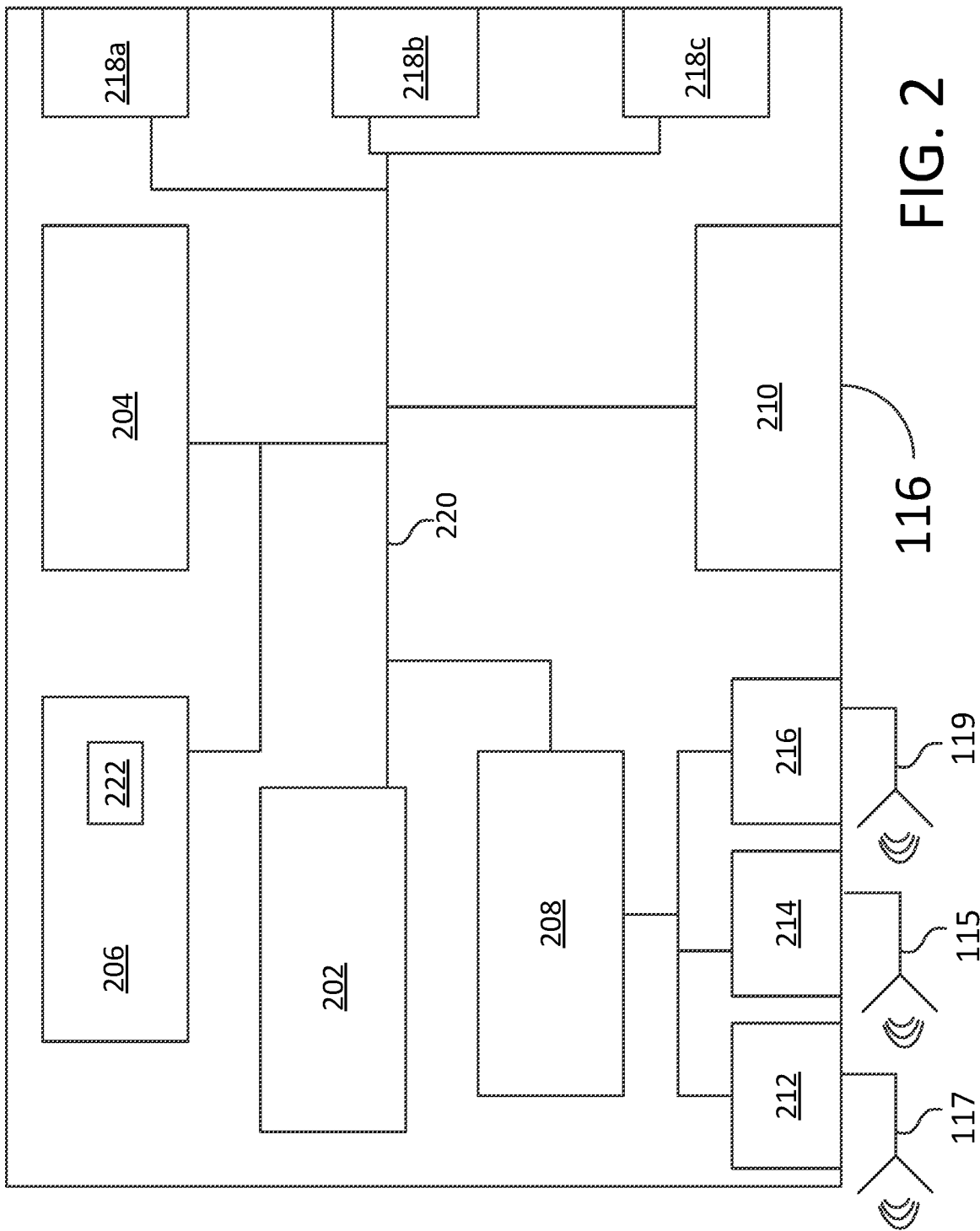

FIG. 2 illustrates a block diagram of a controller for use in the control network of FIG. 1 according to aspects of the embodiments.

Figure 3:
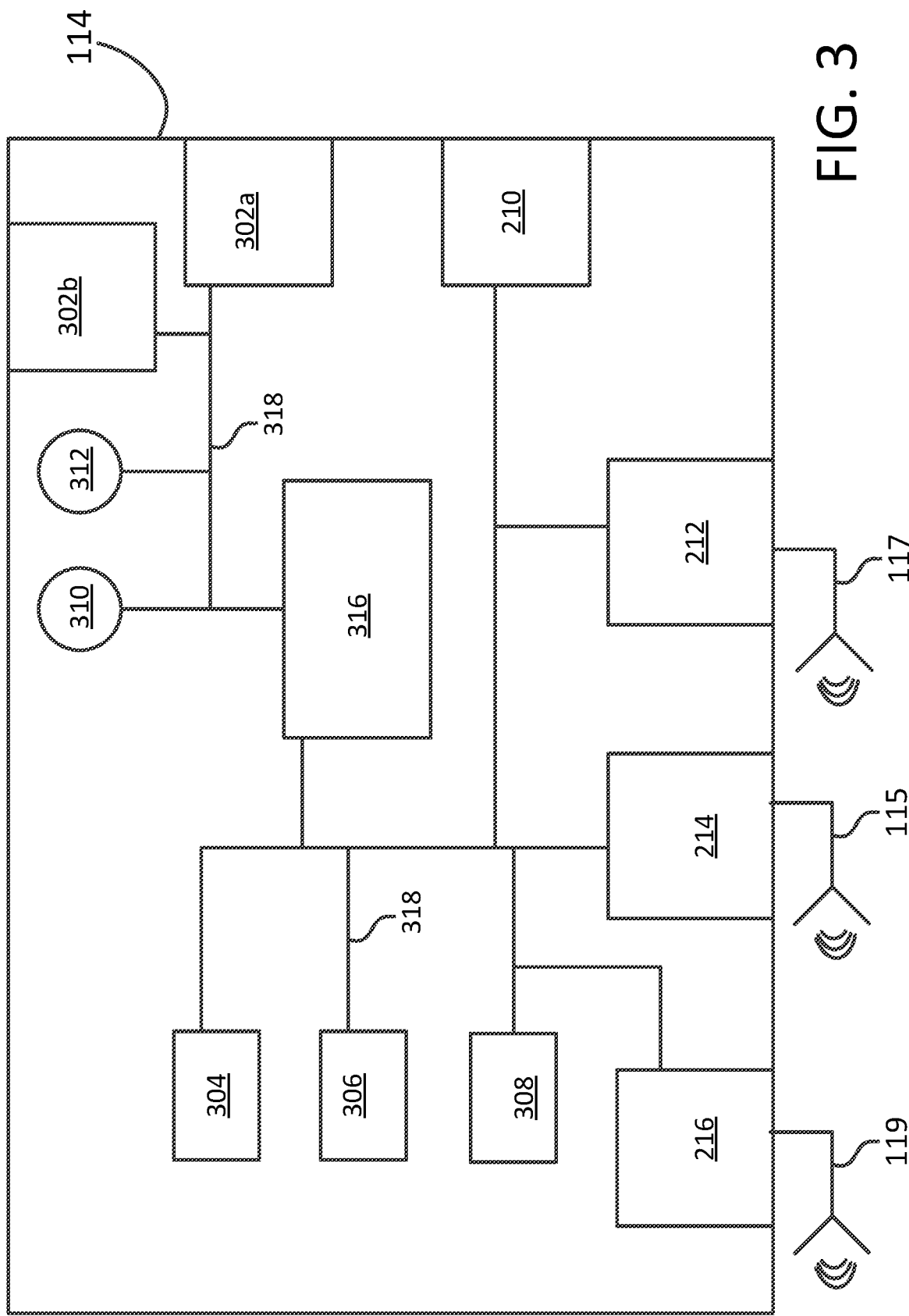

FIG. 3 illustrates a block diagram of a gateway for use in the control network of FIG. 1 according to aspects of the embodiments.

Figure 4:
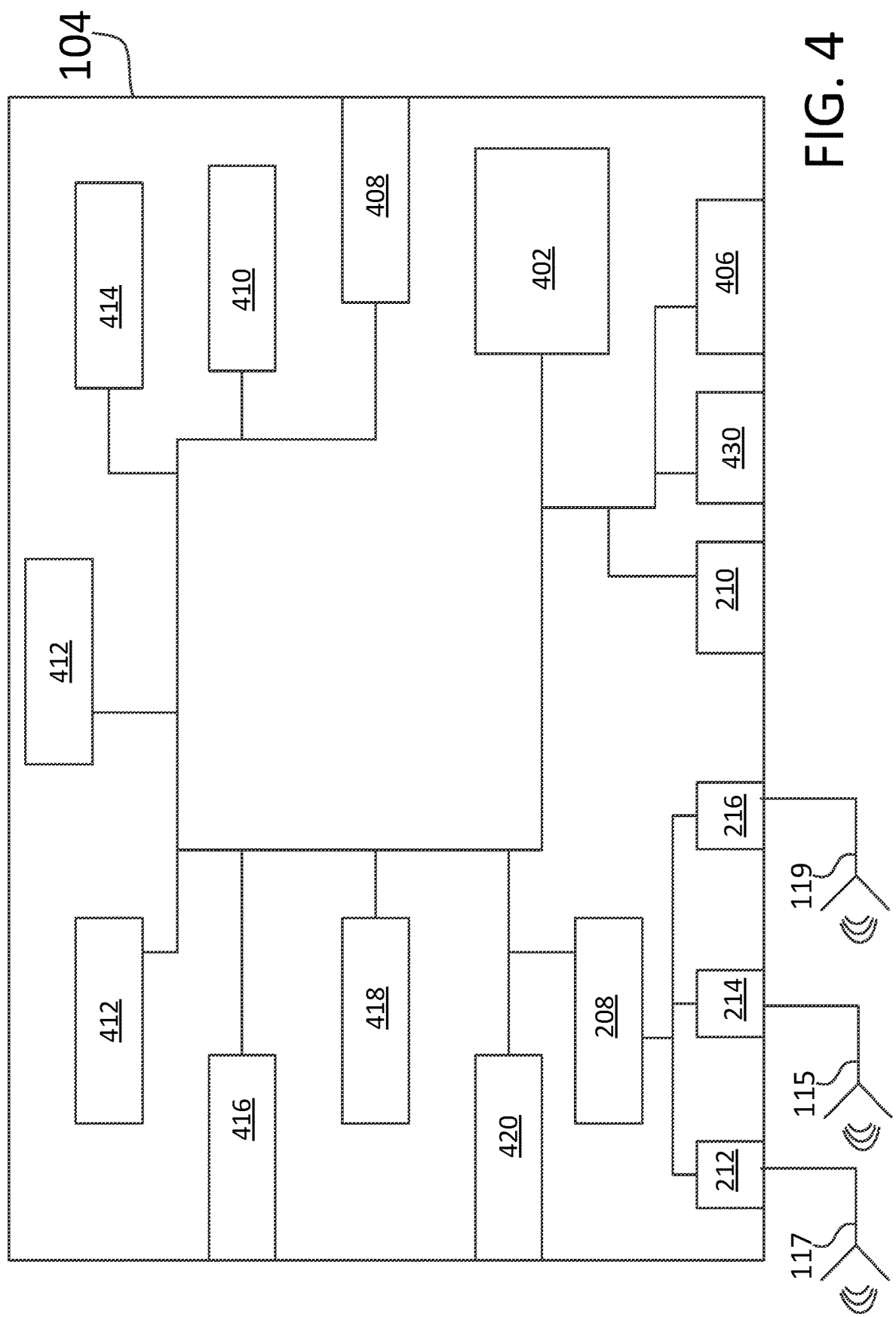

FIG. 4 illustrates a block diagram of a personal electronic device for use with the control system of FIG. 1 according to aspects of the embodiments.

Figure 5:
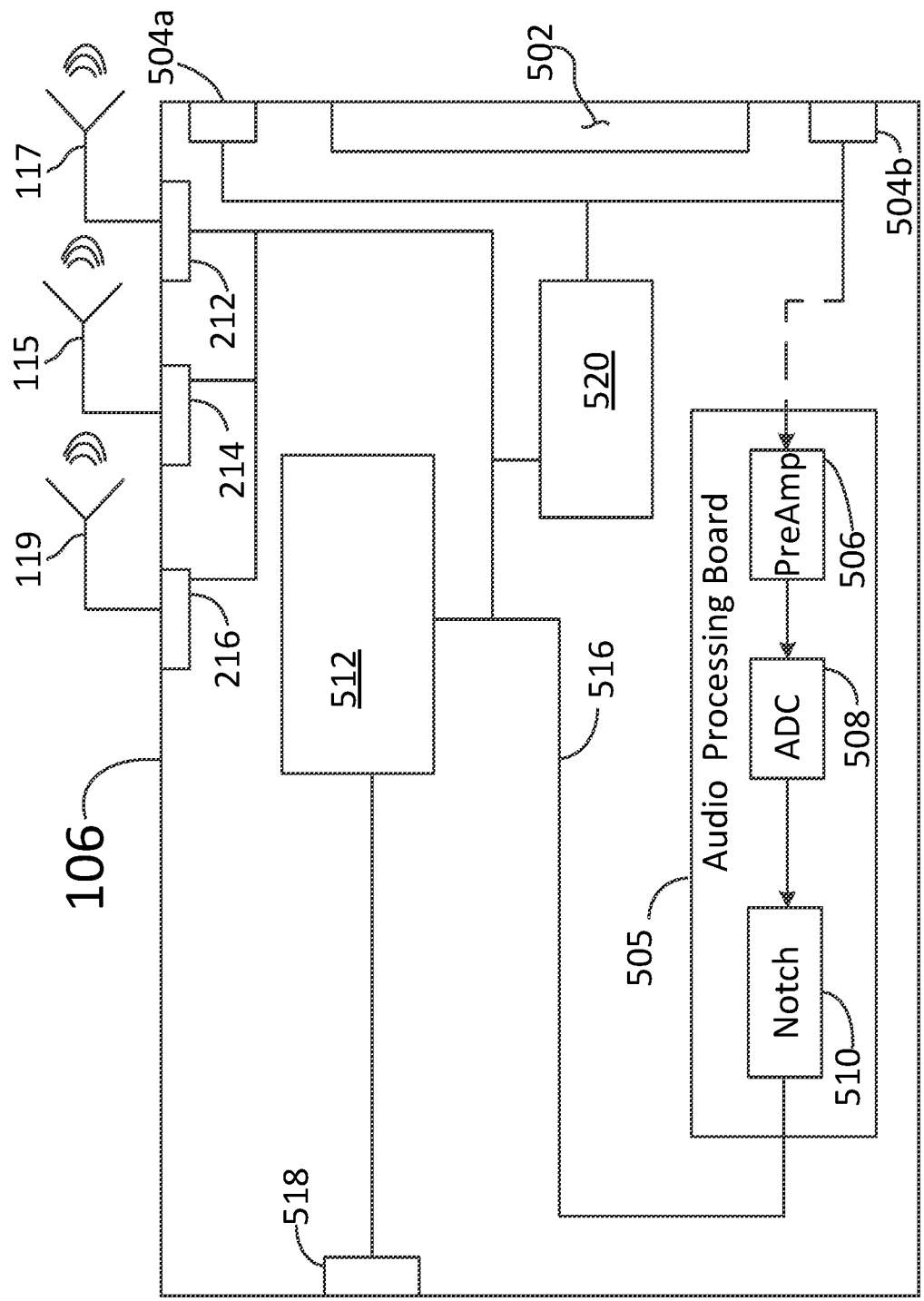

FIG. 5 illustrates a block diagram of a wall mount keypad for use in the control network as shown in FIG. 1, wherein the wall mount keypad can be used as part of an acoustic sensory network according to aspects of the embodiments.

Figure 6:
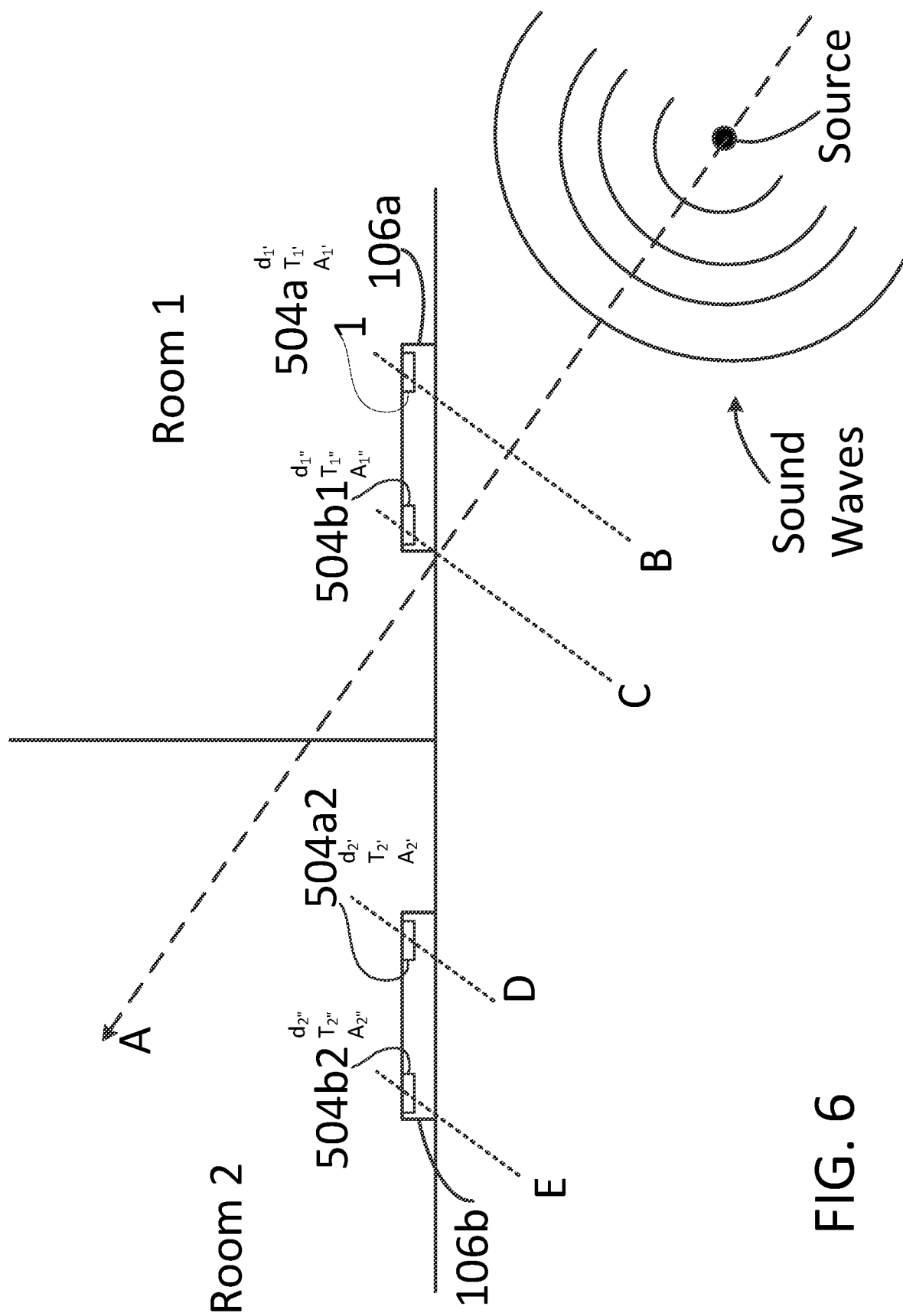

FIG. 6 illustrates a simplified view of the generation and detection of sound waves as used in the aspects of the embodiments.

Figure 7:
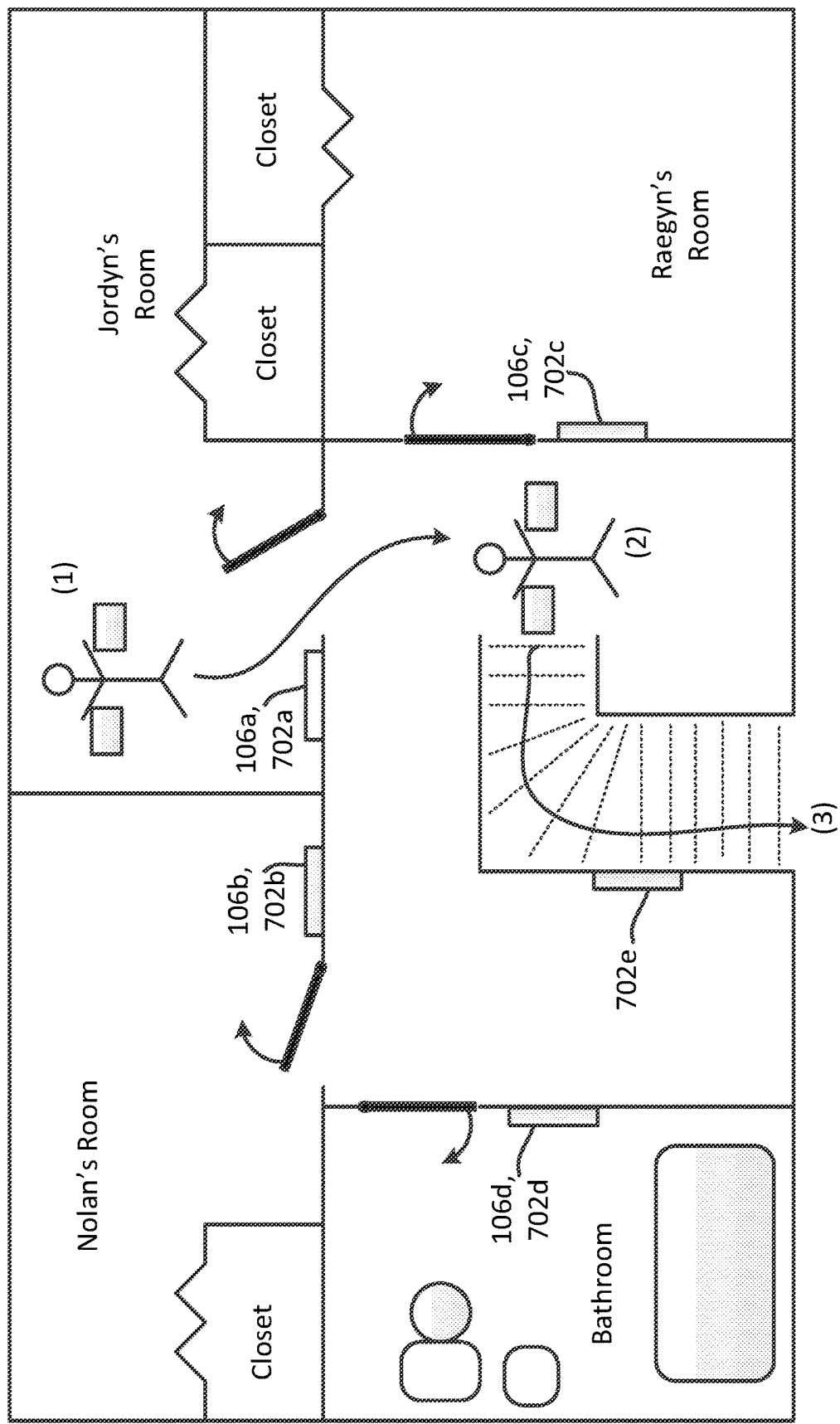

FIG. 7 illustrates a plan view of a floor of a house in which the system and method for determining which controllable device an audible command is directed to can be used according to aspects of the embodiments.

Figure 8:
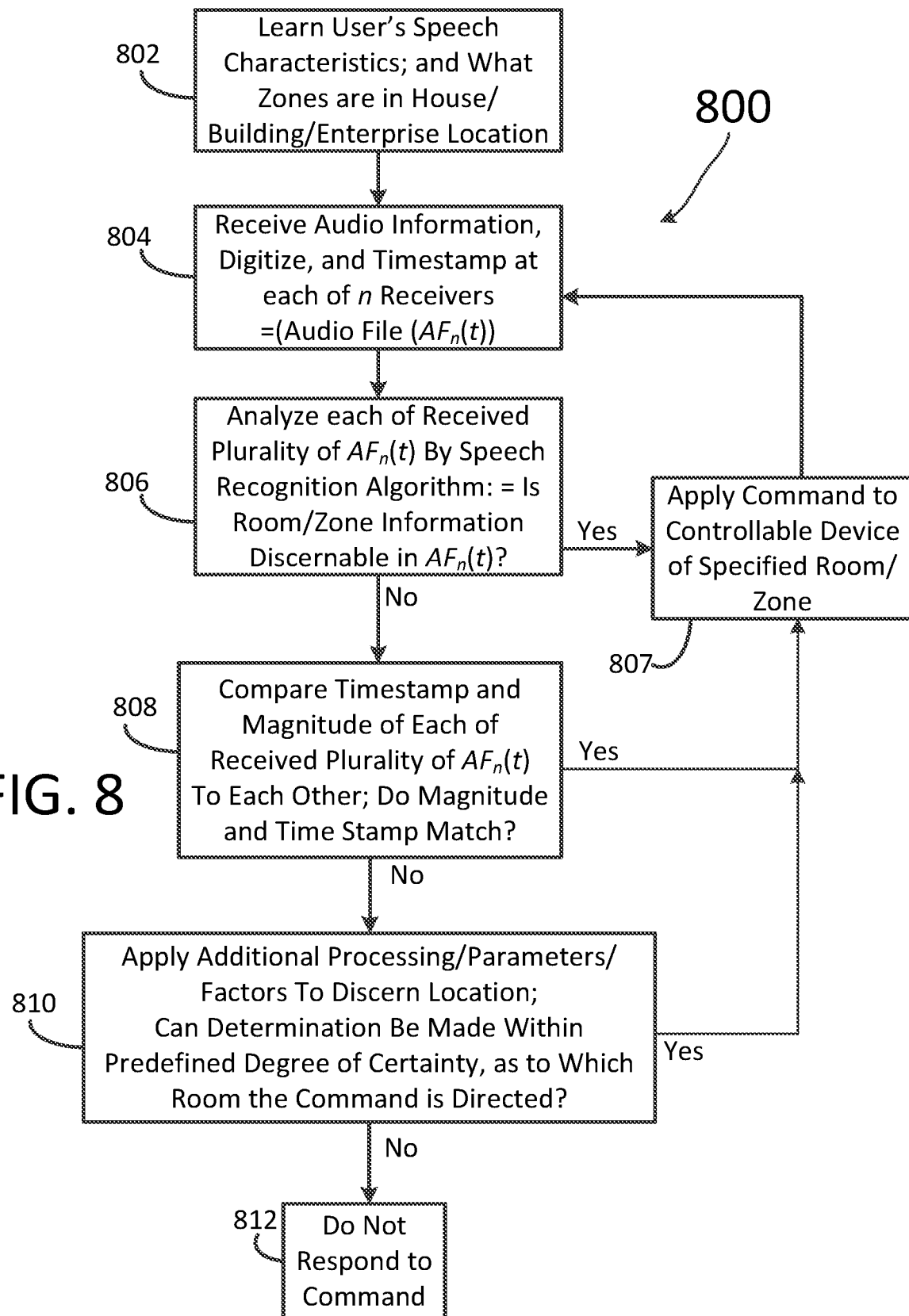

FIG. 8 illustrates a flow diagram of a method for determining which controllable device an audible command is directed to according to aspects of the embodiments.

Figure 9:
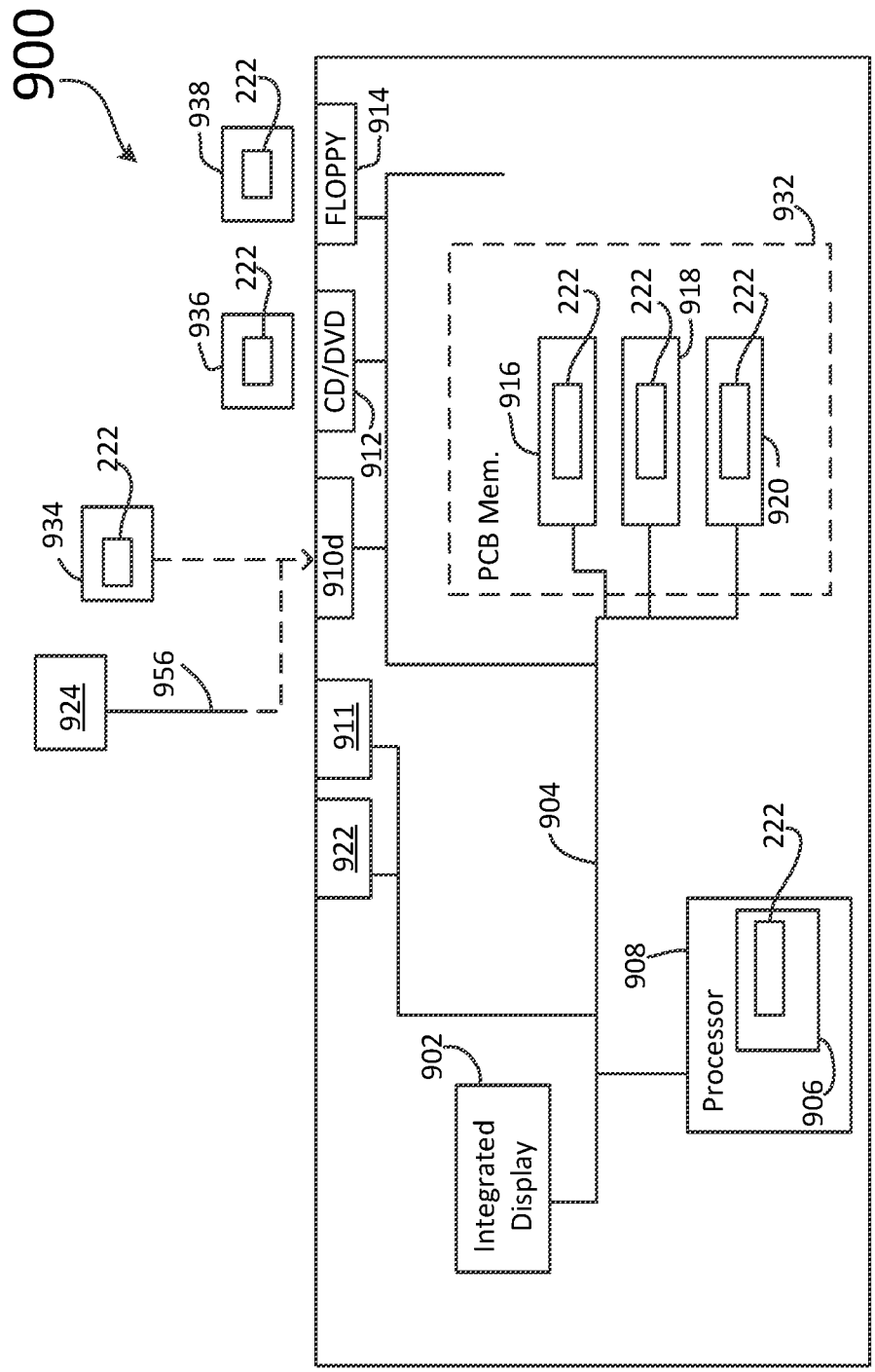

FIG. 9 illustrates processing and memory components/circuitry of one or more of the personal electronic device 104 of FIG. 4, gateway device 114 of FIG. 3, controller 116 of FIG. 2, and any other devices that uses one or more processors as described herein that uses software and/or applications to perform various functions and actions as described herein according to aspects of the embodiments.

Figure 10:
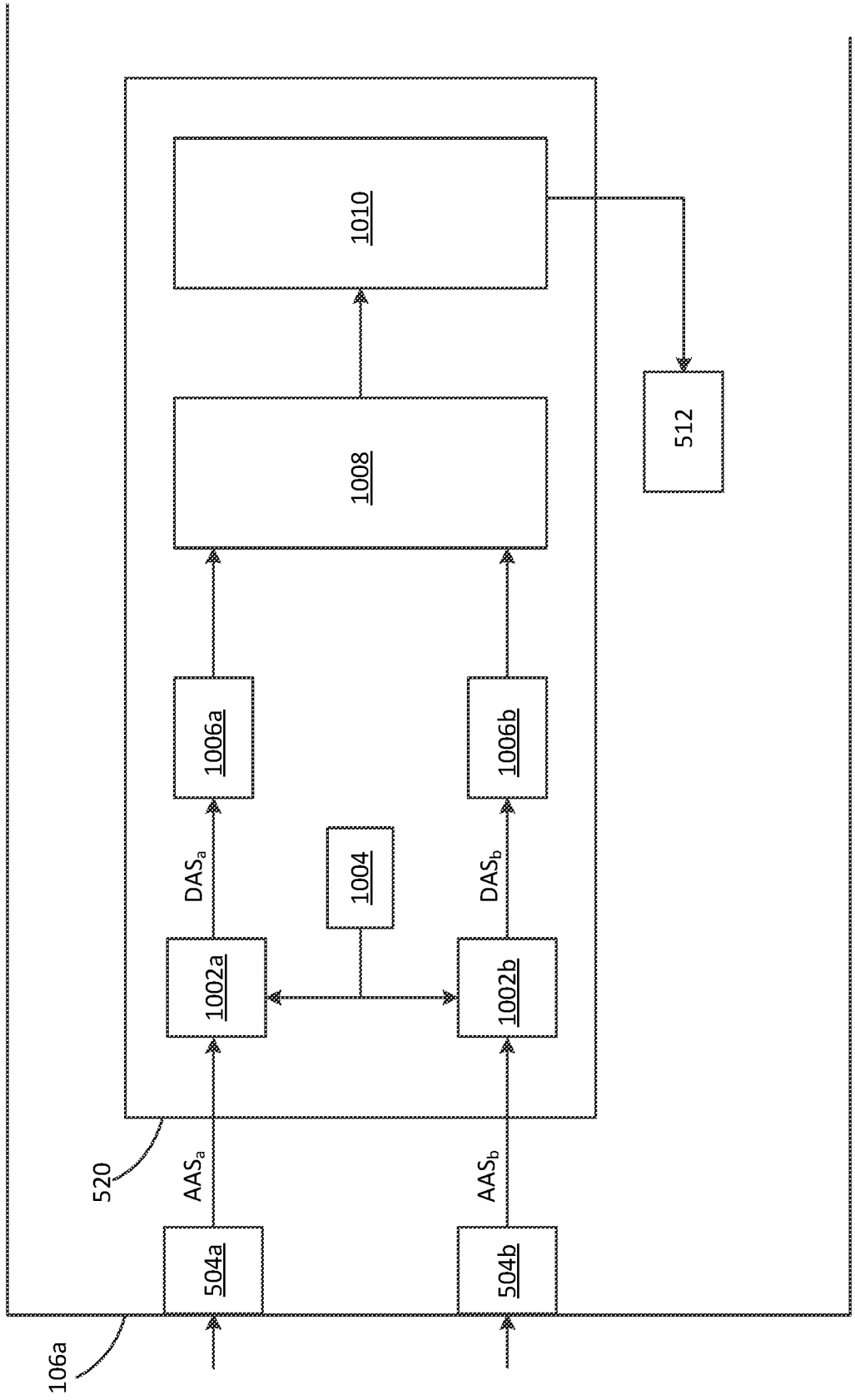

FIG. 10 illustrates several audio processing blocks that can occur within either or both of an audio processing board and a voice recognition system-on-a-chip circuit according to aspects of the embodiments.

Figure 11:
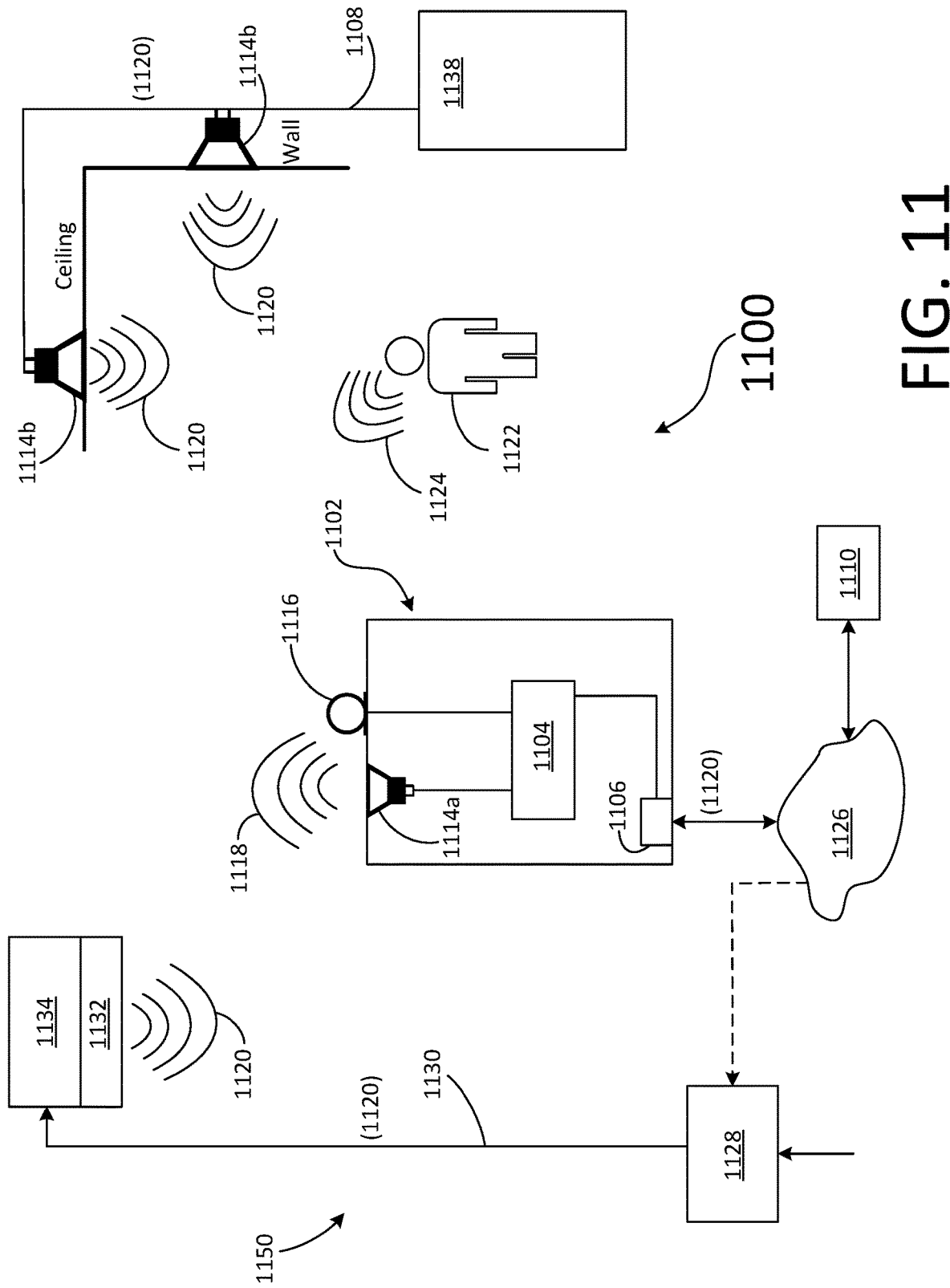

FIG. 11 illustrates a conventional voice recognition system, a person speaking, and an unrelated multi-media audio system broadcasting unknown multi-media audio, as well as unrelated multi-media audio broadcast by a video distribution system.

Figure 12:
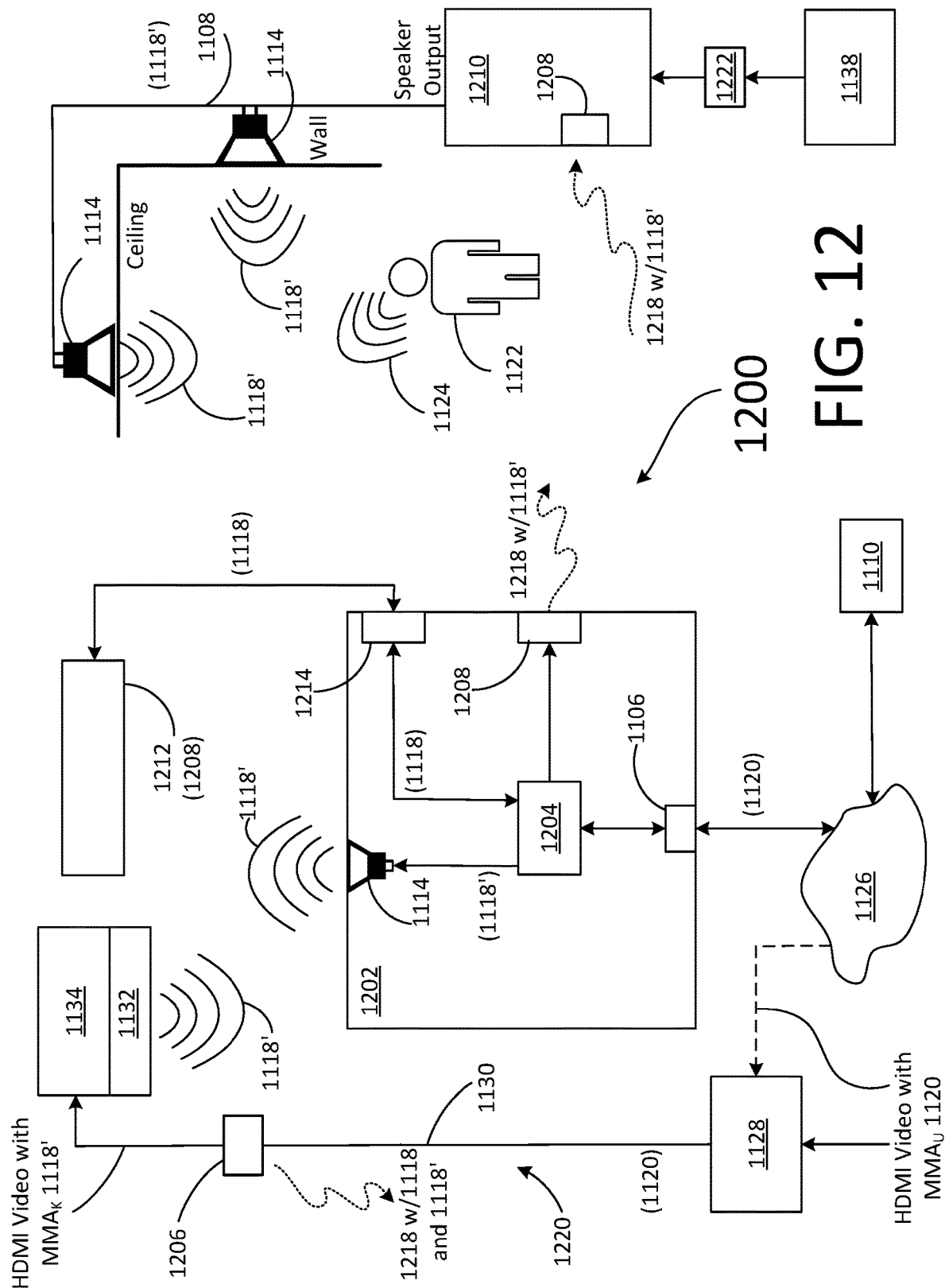

FIG. 12 illustrates a block diagram view of an external audio compensated voice recognition system (EAC-VRS) according to aspects of the embodiments, wherein previously unknown multi-media audio, broadcast by an unrelated multi-media audio system, and unrelated multi-media audio broadcast by a video distribution system, becomes known multi-media audio, and the EAC-VRS, according to aspects of the embodiments, can take into account known multi-media audio to enhance the recognition of voice audio generated by person speaking, according to aspects of the embodiments.

Figure 13:
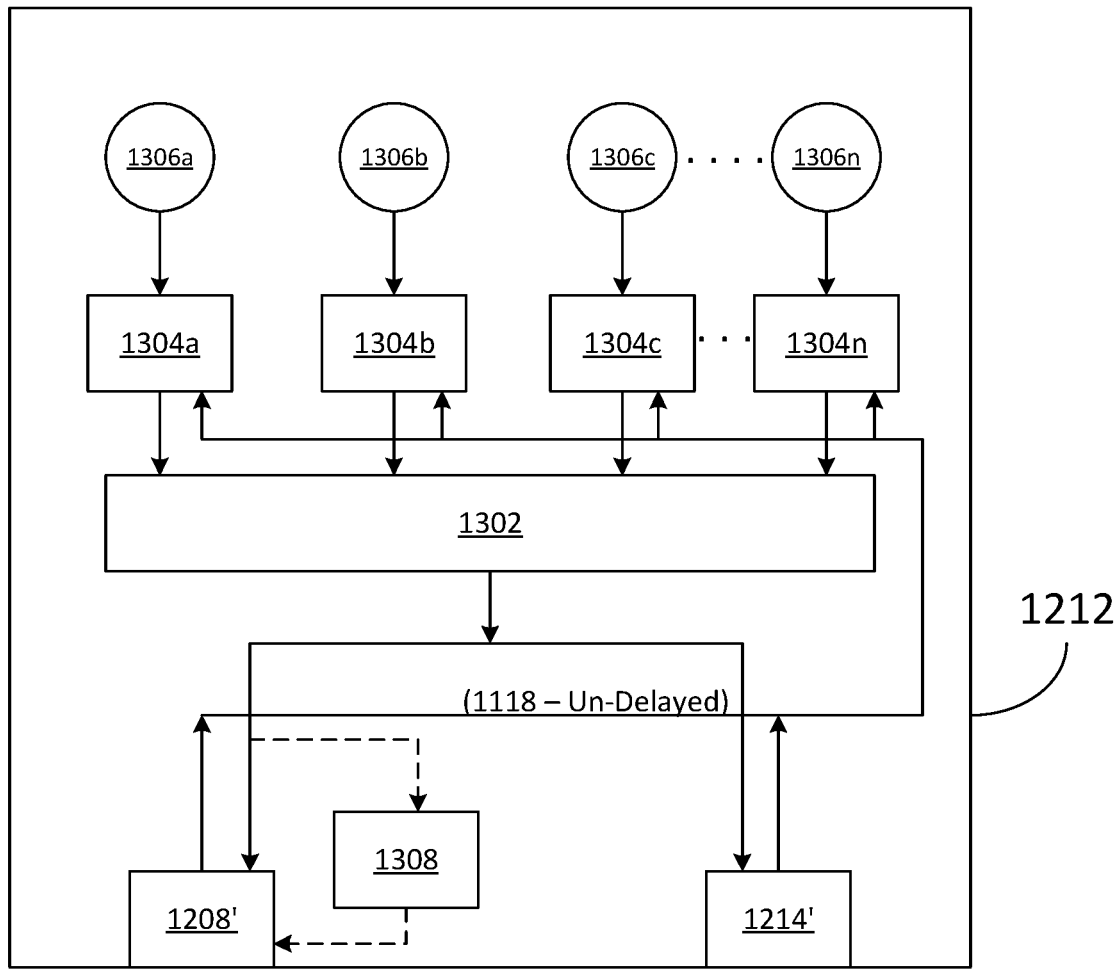

FIG. 13 illustrates a block diagram of a remotely located network microphone device using micro-electromechanical technology for use in the EAC-VRS of FIG. 12 according to aspects of the embodiments.

Figure 14:
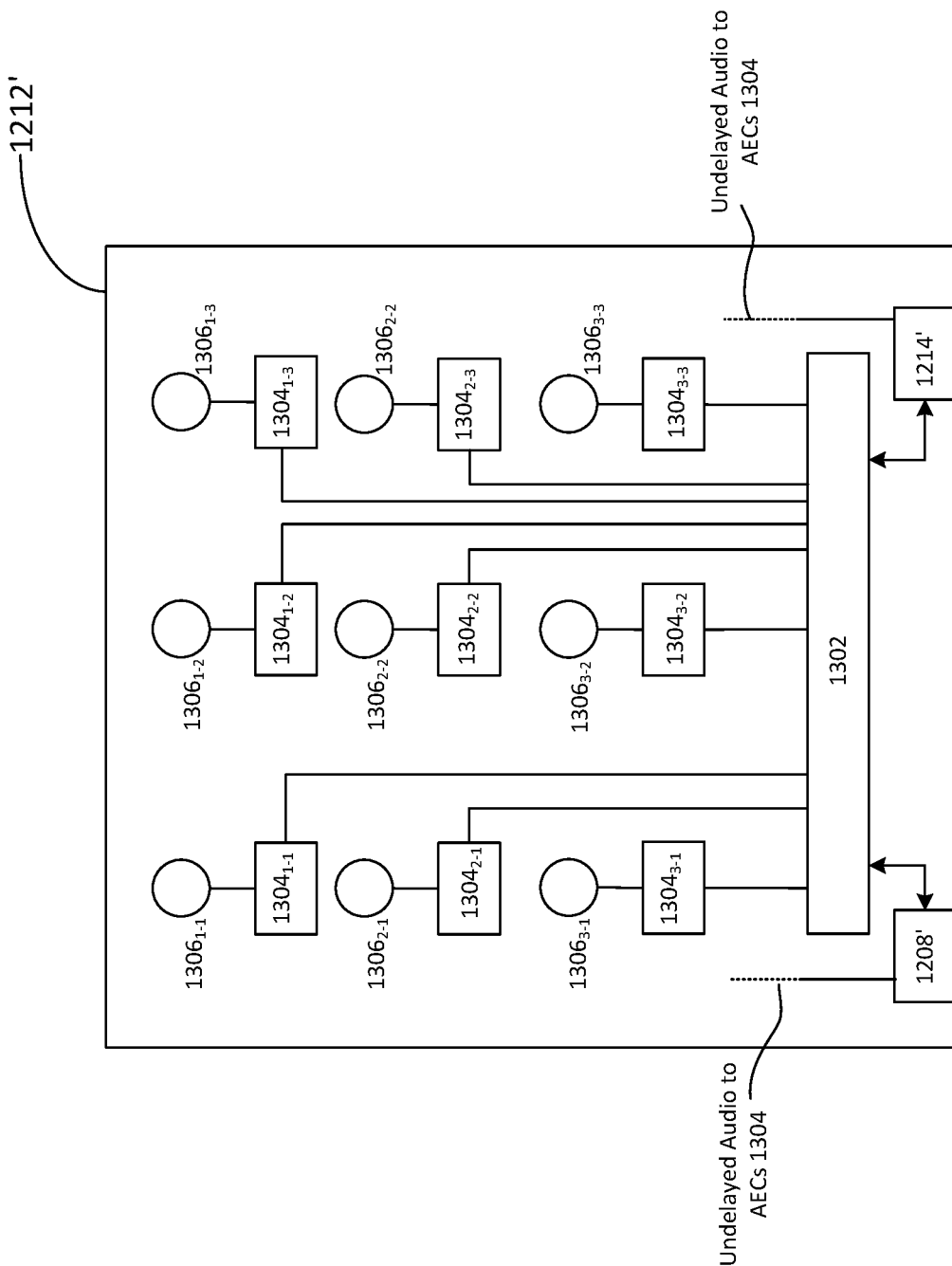

FIG. 14 illustrates a block diagram of a further embodiment of the network microphone device of FIG. 13 using micro-electromechanical technology according to an aspect of the embodiments.

Figure 15:
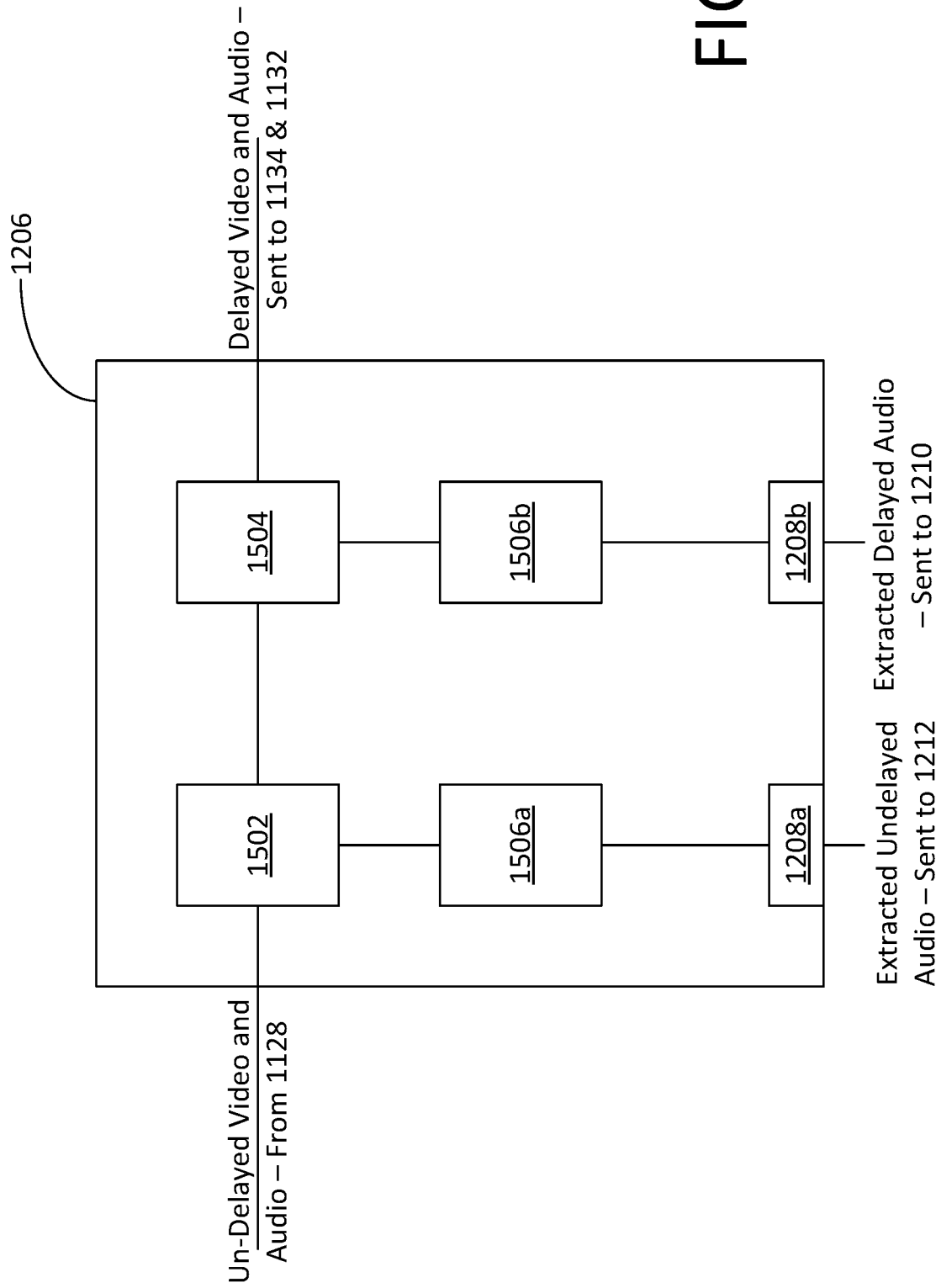

FIG. 15 illustrates a block diagram of an HDMI audio extractor device for use in the EAC-VRS of FIG. 12 according to aspects of the embodiments.

Figure 16:
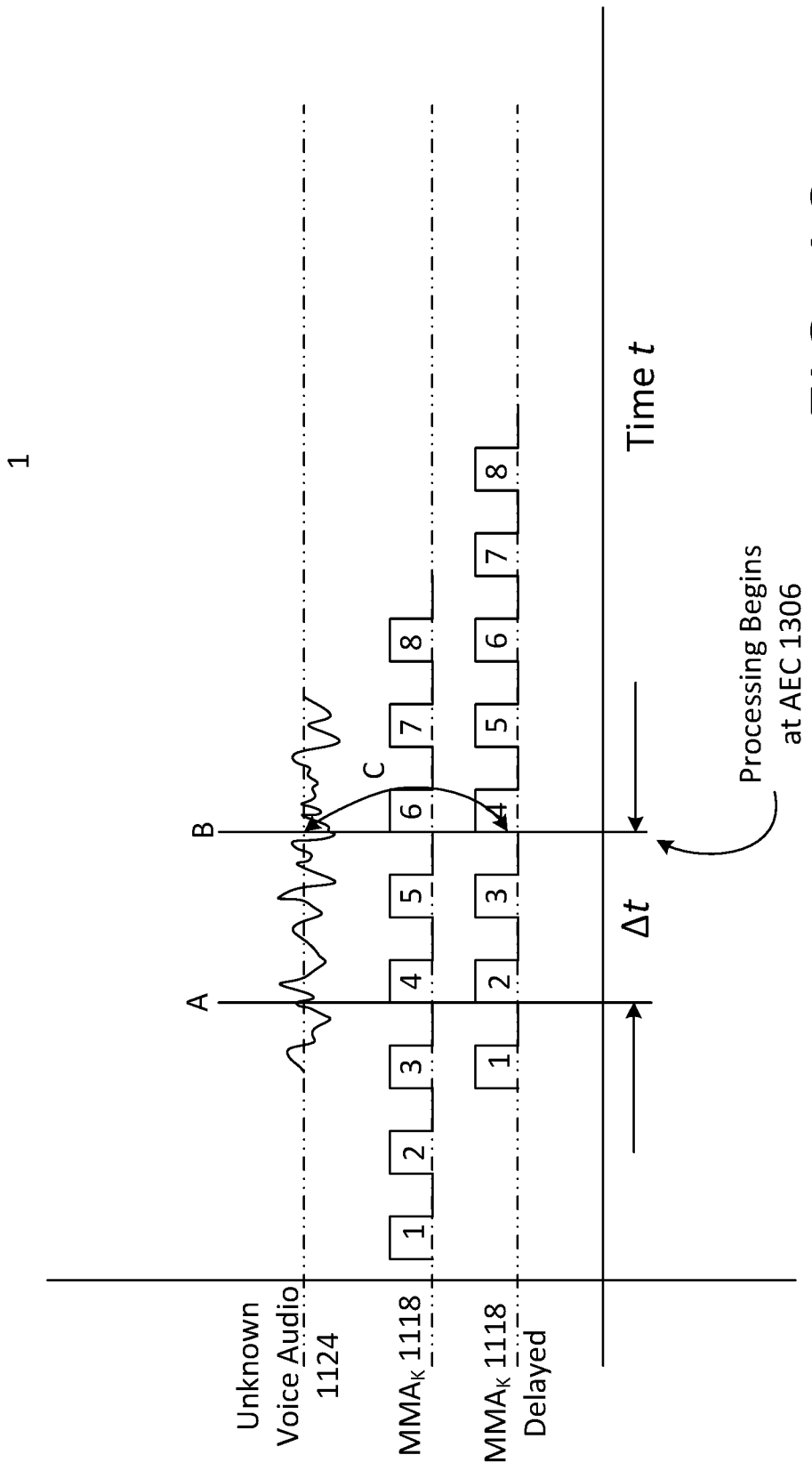

FIG. 16 illustrates a timing diagram of delayed known multi-media audio, un-delayed multi-media audio, and unknown audio from a speaker and/or other sources according to aspects of the embodiments.

Figure 17:
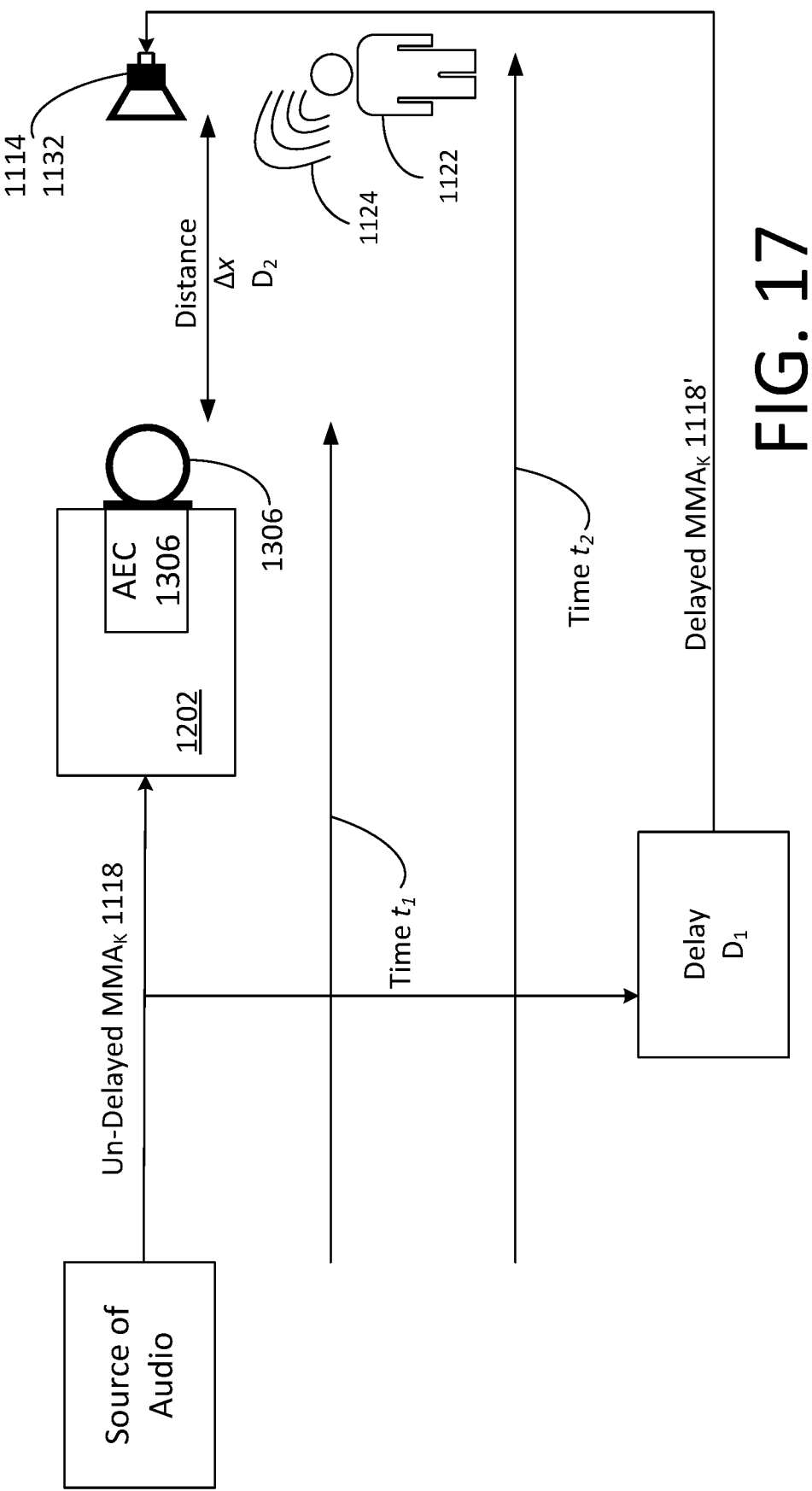

FIG. 17 illustrates a simplified block diagram illustrating the principle of determining an appropriate time delay between the broadcasting of known audio from one or more speakers and receipt by a microphone associated with an acoustic echo cancellation device wherein knowledge of the delay increases the efficacy of echo cancellation and other audio system processes according to aspects of the embodiments.

Figure 18:
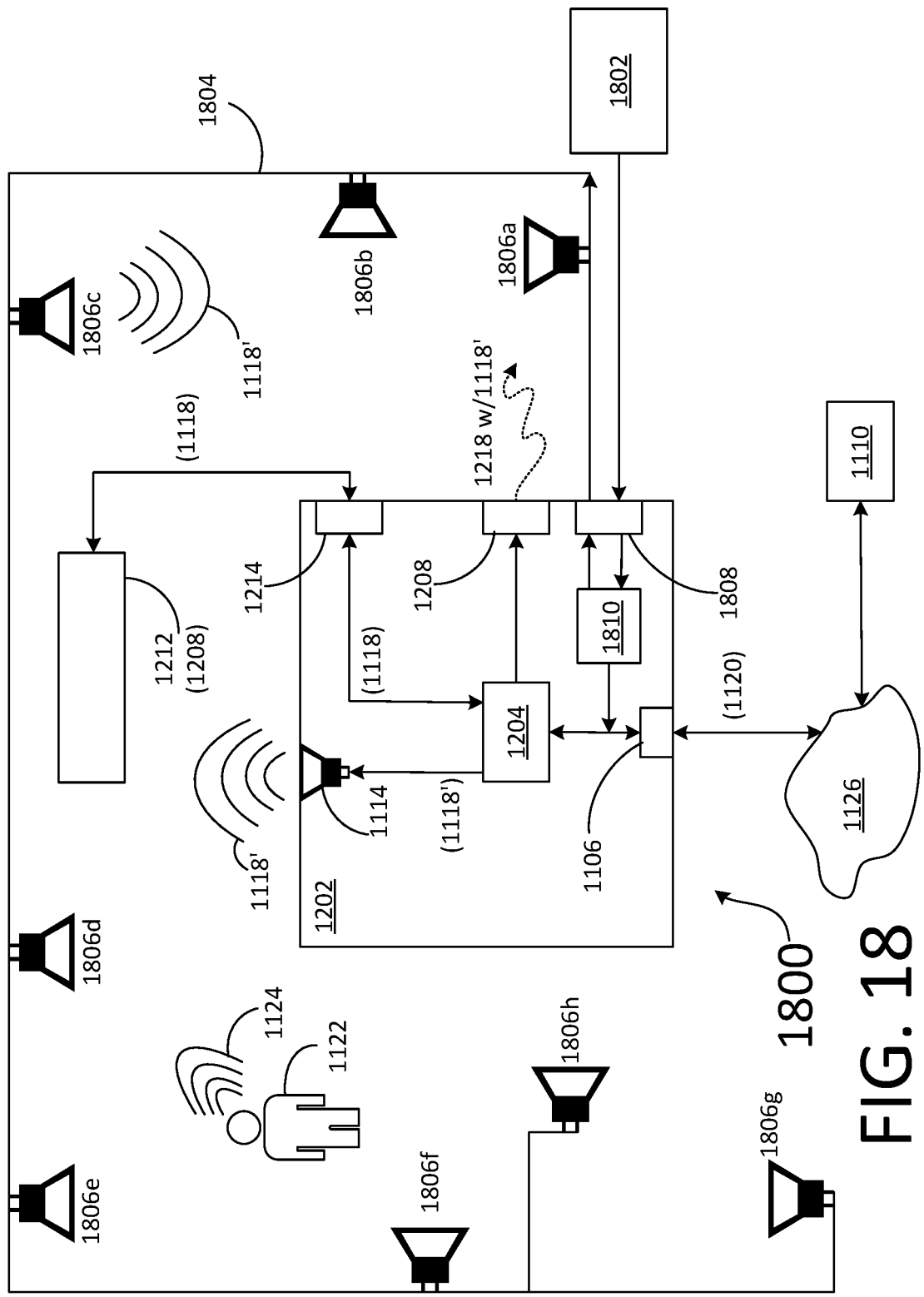

FIG. 18 illustrates a block diagram view of an external audio compensated voice recognition system (EAC-VRS) according to further aspects of the embodiment.

Figure 19:
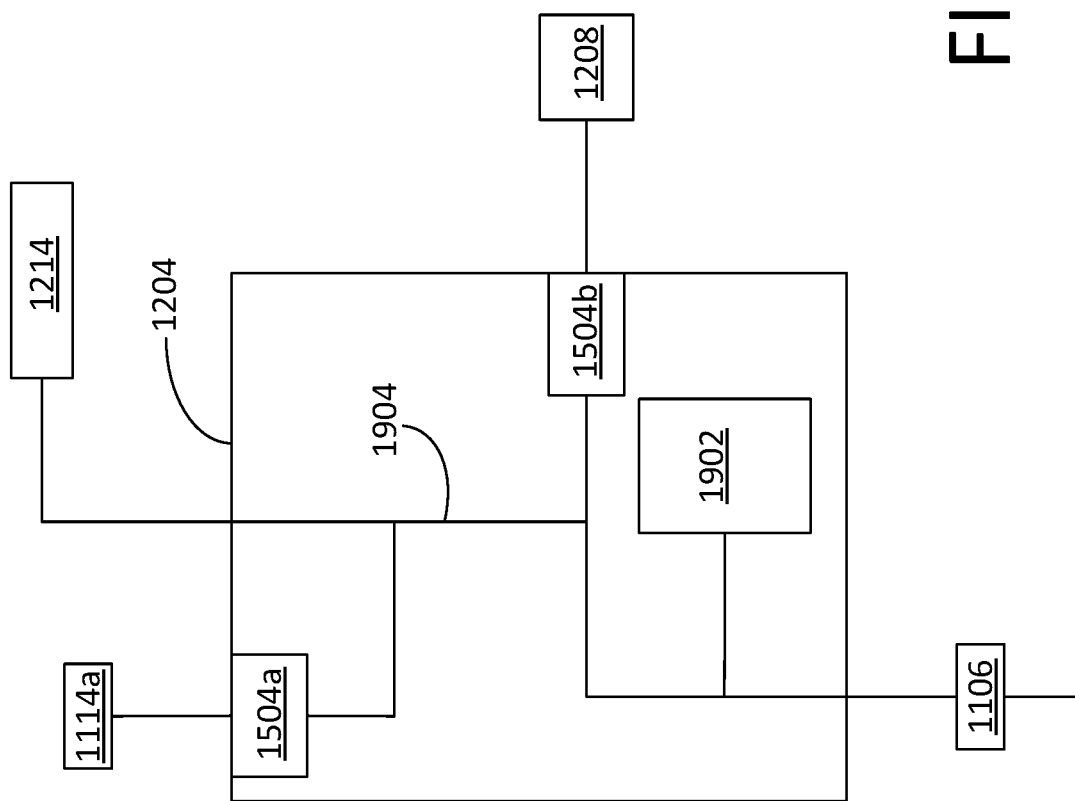

FIG. 19 illustrates a detailed block diagram of the EAC-VRS NW processor referenced in regard to FIG. 12 according to aspects of the embodiments.

Figure 20:
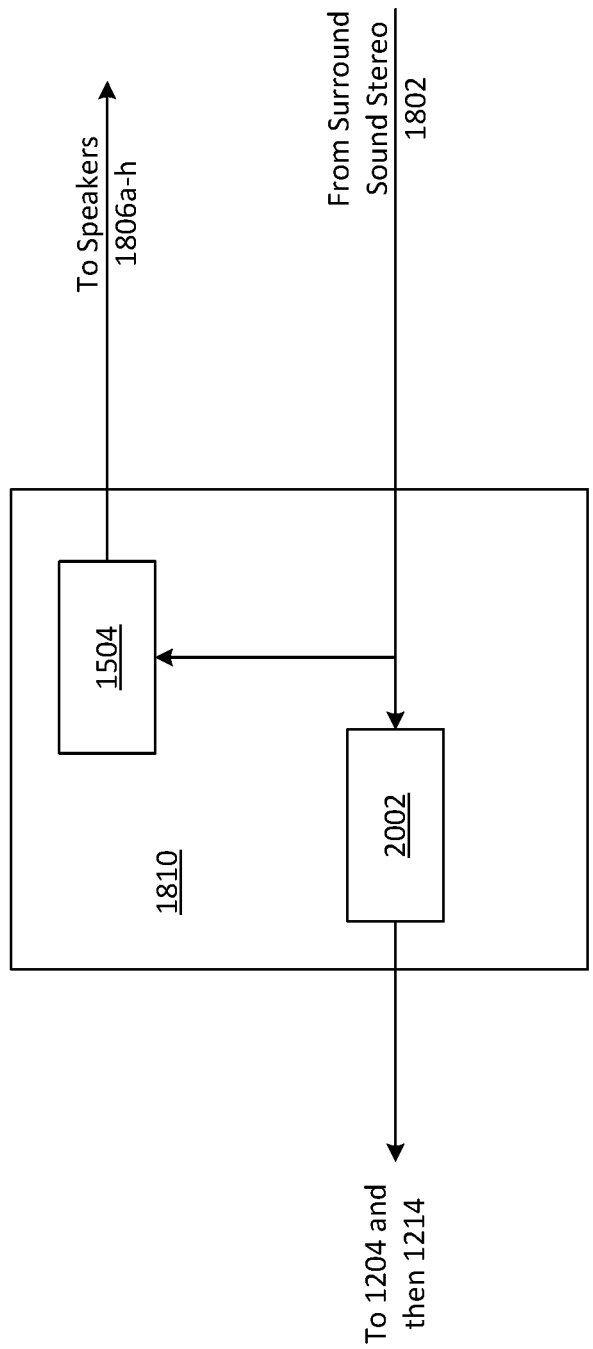

FIG. 20 illustrates a detailed block diagram of a down-mixer device and delay according to aspects of the embodiments.

Figure 21:
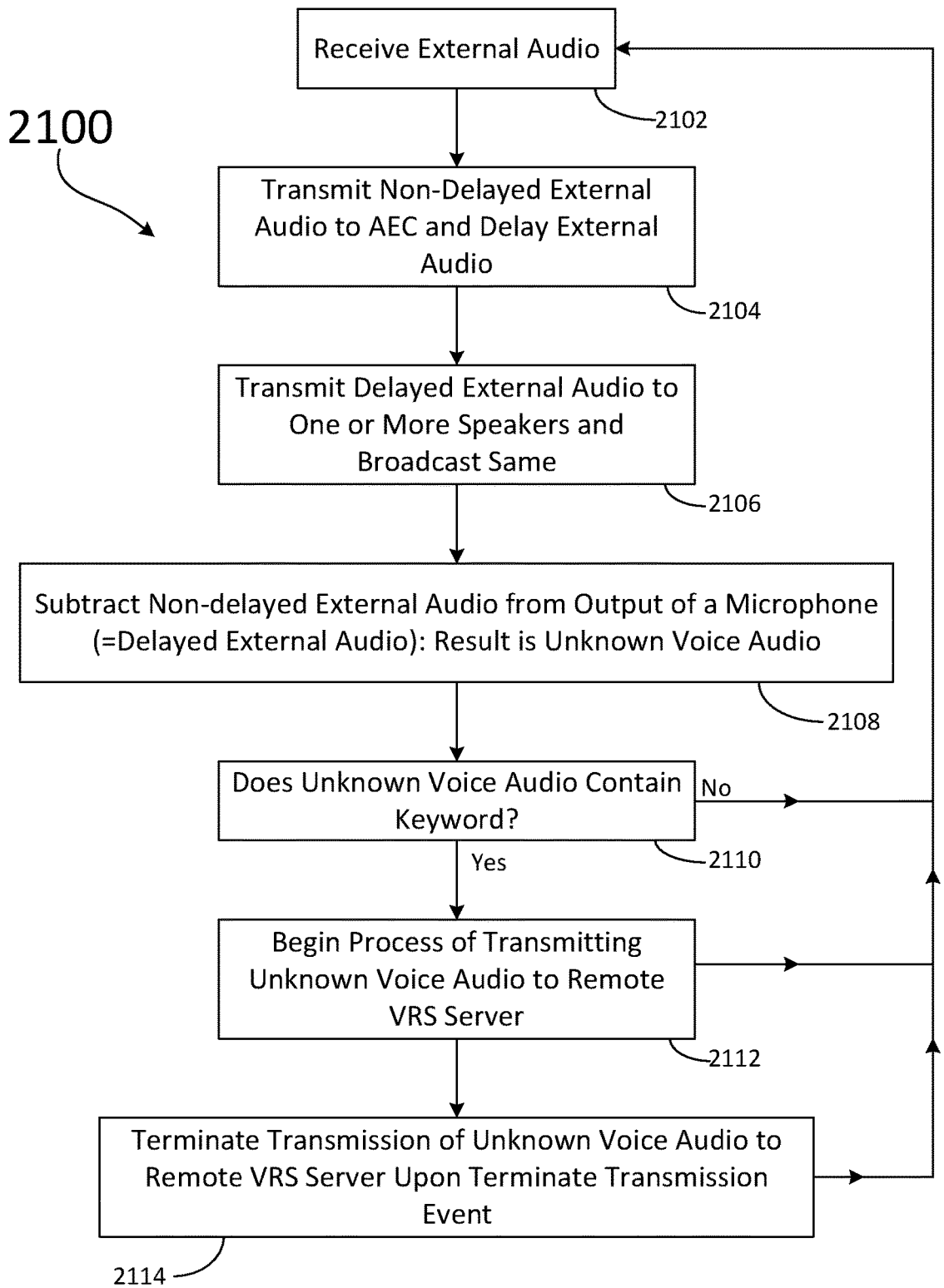

FIG. 21 illustrates a flow chart of a method for compensating for known audio in regard to unknown audio, so that the unknown audio can more be more clearly determined using an external audio compensated voice recognition system (EAC-VRS) according to aspects of the embodiments.

Figure 22:
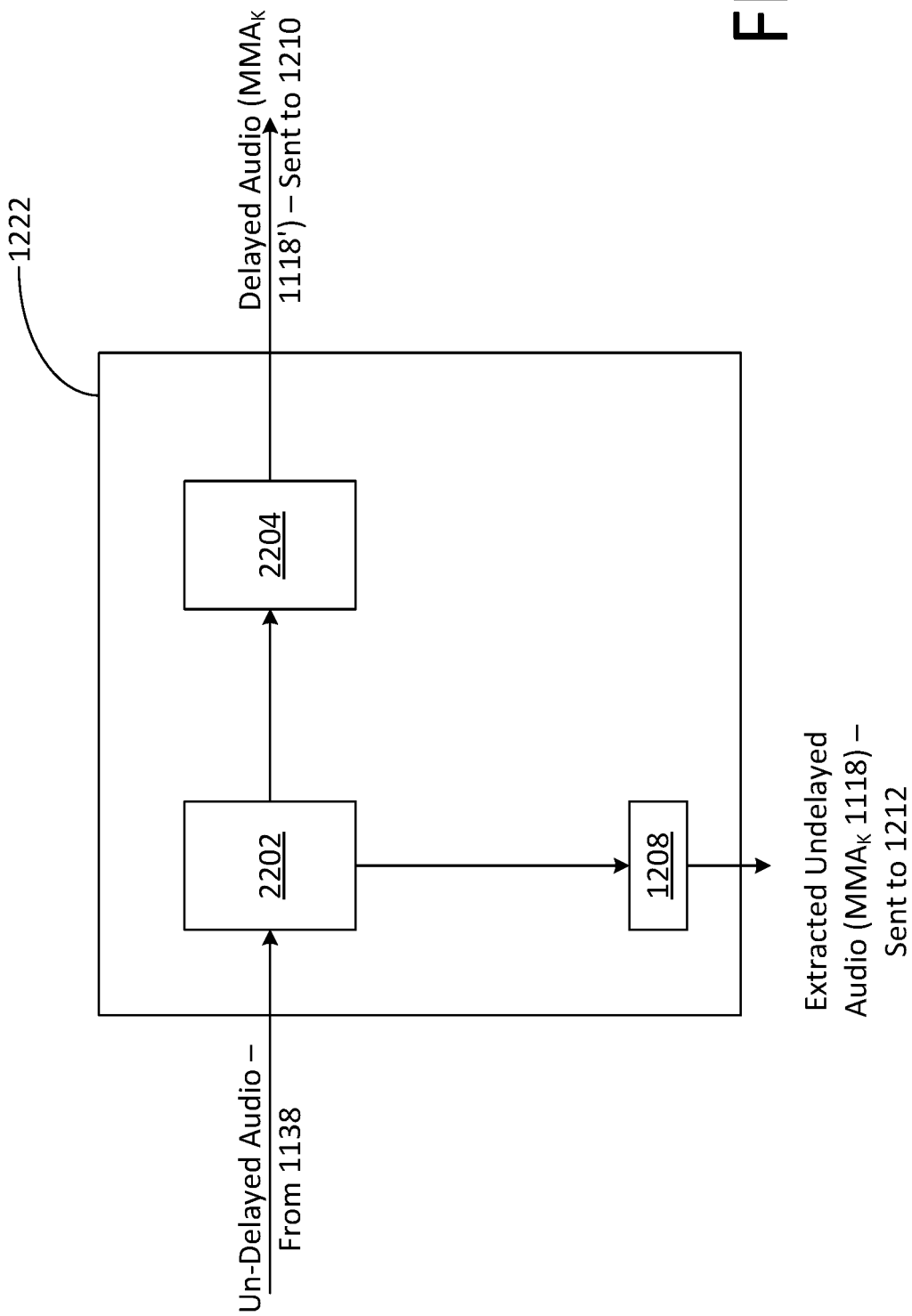

FIG. 22 illustrates an audio extraction and delay device according to aspects of the embodiments.

DETAILED DESCRIPTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices, such as home controllable devices.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.
100 Control Network
102 Institute of Electrical and Electronic Engineers standard (IEEE) 802.15.4 Low Rate Wireless Personal Area Network (LR-PAN) (Communication Network)
104 Portable Electronic Device (PED)
106 Control Point/User Interface/Keypad (Keypad)
108 Sensor
110 Lighting Control Device (Lighting Device)
112 Shade Control Device (Shade Device)
114 Gateway Device
115 First Antenna
116 Controller (Controller)
117 Second Antenna
118 Audio/Video (AV) Device
119 Third Antenna
120 Heating Ventilation and Air Conditioning (HVAC) Device
122 Security Device
124 Household Appliances
126 Control Device
128 Industrial Device
130 Repeaters
132 Internet
134 Local Area Network (LAN)
136 Router/Firewall
202 Central Processor Unit (CPU)
204 Nonvolatile Storage
206 Main Memory
208 Network Interfaces
210 Wired I/O Interface
212 Low Rate Wireless Personal Area Network (LR-WPAN) Transceiver (LR-WPAN) (IEEE 802.15.4)
214 Wireless Local Area Network (WLAN) Transceiver (WLAN Transceiver) (IEEE 802.11)
216 3G/4G/LTE Wireless Wide Area Network (WWAN) Cellular Transceiver (Cellular Transceiver)
218 Programmable Relay Ports
220 Internal Bus
222 Audible Command Processing and Determination Program
302 Network Interface
304 Power On/Off LED
306 Network Activity Indicator LED
308 Activity Indicator LED
310 Acquire Button
312 Setup Button
314 Wireless Transceiver
316 Processor
318 Internal Bus
402 Central Processing Unit
406 Location Sensing Circuitry
408 User Interface
410 Display
412 Non-volatile Storage
414 Main Memory
416 NFC Interface 418 Accelerometers
420 Camera
502 Display/Touch Panel
504 Microphone
505 Audio Processing Board
506 Pre-amplifier
508 Analog-to-Digital Converter (ADC)
510 60 Hz Notch Filter
512 Processor
516 Internal Bus
518 LAN/Ethernet Connector (IEEE 802.3)
520 Voice Recognition (VR) System-on-a-Chip (SoC) Circuit (VR SoC Circuit)
702 Proximity Sensor
800 Method for Determining Which Controllable Device an Audible Command is Directed Towards
802-812 Method Steps of Method 800
900 Personal Computer/Laptop/Tablet/Personal Electronic Device (PED)/Server (PC)
902 Integrated Display/Touch-Screen (laptop/tablet etc.)
904 Internal Data/Command Bus (Bus)
906 Processor Internal Memory
908 Processor(s)
910 Universal Serial Bus (USB) Port
911 Ethernet Port
912 Compact Disk (CD)/Digital Video Disk (DVD) Read/Write (RW) (CD/DVD/RW) Drive
914 Floppy Diskette Drive
916 Hard Disk Drive (HDD)
918 Read-Only Memory (ROM)
920 Random Access Memory (RAM)
922 Video Graphics Array (VGA) Port or High Definition Multimedia Interface (HDMI)
924 External Memory Storage Device
932 Processor Board/PC Internal Memory (Internal Memory)
934 Flash Drive Memory
936 CD/DVD Diskettes
938 Floppy Diskettes
940 Executable Software Programming Code/Application (Application, or "App")
956 Universal Serial Bus (USB) Cable
1002 Analog Processing Circuit
1004 Time-Date Stamp Generator
1006 Acoustic Echo Cancellation Block
1008 Direction of Arrival Block
1010 Directionally Adaptive Beam Forming Block
1100 Conventional Voice Recognition System (CVRS)
1102 Conventional Voice Recognition Circuitry (CVRC)
1104 Voice Recognition System (VRS) Processor
1106 Network Connection
1108 Speaker Cable
1110 Voice Recognition Server
1114 Speaker
1116 Microphone (Mic)
1118 Multi-Media Audio-Known ($MMA_K$)
1120 Multi-Media Audio-Unknown ($MMA_U$)
1122 Person(s)
1124 Unknown Voice Audio
1126 Internet (Network, LAN, WAN, PAN, etc.)
1128 HDMI Transceiver
1130 HDMI Cable
1132 Audio Sound Bar
1134 Video Display
1138 External Multi-Media Audio System (MMAS)
1150 Video Distribution System (VDS)
1200 External Audio Compensated (EAC) Voice Recognition System (EAC VRS)
1202 External Audio Compensated Voice Recognition Circuitry (EAC-VRSC)
1204 External Audio Compensated Voice Recognition System Network Audio Processor (EAC-VRS NW Processor)
1206 HDMI Audio Extractor Device (with Programmable Delay)
1208 Extracted Audio Transceiver
1210 Audio Amplifier
1212 Remotely Located Microphone (Network Microphone Device (NMD))
1214 Remotely Located Microphone Interface
1218 Transmitted Audio Signal
1220 Video Distribution System
1222 Audio Extraction and Delay Device
1302 Direction Detection and Beamforming (DDB) Circuit
1304 Acoustic Echo Cancellation (AEC) Circuit
1306 Micro-Electrical-Mechanical Systems (MEMs) Microphone
1308 Network Interface Device (NID)
1502 HDMI Transceiver
1504 HDMI Video and/or Audio Delay (Programmable)
1506 HDMI Audio Extractor
1800 External Audio Compensated Voice Recognition System with Surround Sound Stereo System (EAC-VRS-S)
1802 Surround Sound Stereo Source
1804 Surround Sound Audio Transfer Cable (Audio Cable)
1806 Speaker
1808 Surround Sound Audio Transfer Audio Interface (Audio Interface)
1810 Surround Sound Audio Down-Mixer Device (Audio Down-Mixer Device)
2002 Surround Sound Stereo Down-Mixer Circuit (Down-Mixer Circuit)
2100 Method for Compensating for Known Audio in regard to Unknown Audio Using an External Audio Compensated Voice Recognition System
2102-2114 Method Steps of Method 2100
2202 Audio Transceiver/Digitizer
2204 Audio Delay List of Acronyms Used in the Specification in Alphabetical Order The following is a list of the acronyms used in the specification in alphabetical order.
3G Third Generation Cellular Telecommunications Network
4G Fourth Generation Cellular Telecommunications Network
ACPD Audio Command Processing and Determination
ADC Analog-to-Digital Converter
AEC Acoustic Echo Cancellation
App Application
ASIC Application Specific Integrated Circuit
ASN Acoustic Sensory Network
A/V Audio Video
AVB Audio Video Bridging
BIOS Basic Input-Output System
CD Compact Disk
CISC Complex Instruction Set
cm Centimeter
CPU Central Processing Unit
CRT Cathode Ray Tubes
CVRS Conventional Voice Recognition System
DABF Directionally Adaptive Beam Forming DAS Digital Audible Signal
DDB Direction Detection and Beamforming
DHCP Dynamic Host Communication Protocol
DNS Domain Name Service
DOA Direction of Arrival
DVD Digital Versatile Disk
EAC-VRS External Audio Compensated Voice Recognition System
EAC-VRSC External Audio Compensated Voice Recognition System Circuitry
EAC-VRS-S External Audio Compensated Voice Recognition System with Surround Sound Stereo System
EDGE GSM Evolution
EEPROM Electrically Erasable Programmable Read Only Memory
EGPRS Enhanced GPRS
ERL Echo Return Loss
FPGA Field Programmable Gate Array
FPS Feet Per Second
GPRS general packet radio service
GPS Global Positioning System
GSM Global System for Mobile Communications
GUI Graphical User Interface
HDD Hard Disk Drive
HDMI High Definition Multi-Media
http Hyper-Text Transport Protocol
HVAC Heating Ventilation and Air Conditioning
Hz Hertz
IC Integrated Circuit
I/O Input/Output
IEEE Institute of Electrical and Electronic Engineers
IMT International Mobile Telecommunications
IP Internet Protocol
IR Infrared
IrDA Infra-Red Data Association
ISO International Standards Organization
kb/s Kilo-byte per second
LAN Local Area Network
LCD Liquid Crystal Display
LED Light Emitting Diode
LMS Least Mean Square(s)
LR-PAN Low Rate Personal Area Network
LR-WPAN Low Rate Wireless Personal Area Network
LTE Long Term Evolution
MEMS Microelectromechanical System
Mic Microphone
mb/s Mega-byte per second
mm Milli-meter
MMA Multi-Media Audio
MMAS Multi-Media Audio System
$MMA_K$ Multi-Media Audio—Known
$MMA_U$ Multi-Media Audio—Unknown
NFC Near Field Communications
NIC Network Interface Card
NICR Network Interface Controller
NID Network Interface Device
NMD Network Microphone Device
NWC Network Controller
NWI Network Interface
OCR Optical Character Recognition
OLED Organic LED
OS Operating System
OSI Open Source Initiative
PAN Personal Area Network
PC Personal Computer
PCM Pulse Code Modulation
PDA Personal Digital Assistant
PDM Pulse Density Modulation
PED Personal Electronic Device
PoE Power over Ethernet
PSTN Public Switched Telephone Network
RAM Random Access Memory
RCD Remote Control Devices
RF Radio Frequency
RFID Radio Frequency Identification
RISC Reduced Instruction Set Processor
ROM Read Only Memory
RTP Real Time Protocol
RW Read-Write
SC Single Carrier
SIP Session Initiation Protocol
SoC System-on-a-Chip
SRA Speech Recognition Algorithm
SNR Signal-to-Noise Ratio
USB Universal Serial Bus
UVPROM Ultra-Violet Light Programmable Read Only Memory
VDC Voltage, Direct Current
VDS Video Distribution System
VoIP Voice over Internet Protocol
VR Voice Recognition
VRS Voice Recognition System
VRSv Voice Recognition Server
WAN Wide Area Network
WLAN Wireless Local Area Network
Wi-Fi IEEE 802.11n Wireless Communication Standard (Where "n" includes, "a," "b," or "g," among others)
µs/ft Micro-seconds per foot The different aspects of the embodiments described herein pertain to the context of a home, office, or enterprise location control network, but is not limited thereto, except as may be set forth expressly in the appended claims.

For 40 years Creston Electronics Inc., of Rockleigh, N.J., has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein, as embodied as control network 100, and its constituent components, can be manufactured by Crestron Electronics, Inc., located in Rockleigh, N.J.

FIG. 1 illustrates a block diagram of control network 100 that includes controllable devices, monitoring devices, and active devices according to aspects of the embodiments. Control network 100 comprises portable electronic device (PED) 104, control point (e.g., keypad) 106, gateway device (gateway) 114, controller (controller) 116, and one or more controllable devices such as, but not limited to, sensors 108, lighting control devices (lighting device) 110, shade control devices (shade device) 112, audio/video (A/V) devices 118, heating ventilation and air conditioning (HVAC) devices 120, and security devices 122. As those of skill in the art can appreciate, there can be one or more of each of the controllable devices, and controller 116, PED 104, keypad 106, and gateway 114. According to further aspects of the embodiments, gateway 114 and controller 116 can be part of the same device, as the dashed line box around the two indicates. According to further aspects of the embodiments, while ostensible all or substantially all of the controllable devices will be wireless devices, one or more can be connected to gateway 114 and/or controller 116 by cabling (not shown).

Also shown in FIG. 1 are first antenna 115, second antenna 117, and third antenna 119. First antenna 115 is designed to work in the frequency band appropriate for Institute of Electrical and Electronic Engineers (IEEE) standard 802.11n, where n can be one of "a," "b," and "g," among other versions of the standard (herein after referred to as "802.11"). As those of skill in the art can appreciate, the IEEE 802.11 standards encompass wireless local area networks (LANs), in this case, those that are referred to as "Wi-Fi" networks. Thus, first antenna 115 is an antenna capable of transceiving Wi-Fi signals. First antenna 115 is therefore included as part of PED 104, controller 116, which communicate via communication network 134, described in greater detail below, as well as any of the devices 106, 108, 110, 112, 118, 120, 122, 124, 126, 128, and 130. Each component that includes first antenna 115 also can include a suitably arranged transceiver, such as a Wi-Fi transceiver, which can process signals for Wi-Fi (IEEE 802.11) transmission and reception thereof as well.

Second antenna 117 is designed to work in the frequency band appropriate for IEEE standard 802.15.n, where n can be one of 3, 4, 5, 6, among other versions of the standard (herein after referred to as "802.15"). As those of skill in the art can appreciate, the IEEE 802.15 standards encompass low rate wireless personal area wireless networks (LR WPANs). In this case, the LR WPAN can be one those that are referred to as "ZigBee" networks, or, according to further aspects of the embodiments, an Infinet® as designed and manufactured by Crestron Electronics, Inc., of Rockleigh, N.J. (among other types of LR WPANs, which can include WirelessHart, Mi-Wi, and Thread, among others). Thus, second antenna 117 is an antenna capable of transceiving ZigBee or Infinet signals. Included in any of the devices that includes second antenna 117 (which can include one or more of devices 104, 106, 108, 110, 112, 114, 116, 118, 120, 122, 124, 126, 128, and 130) is a suitably arranged transceiver, such as IEEE 802.15.4 LR-WPAN transceiver (LR-WPAN transceiver) 214 that can process signals for ZigBee/Infinet transmission and reception thereof as well. All of the other controllable devices can also utilize such wireless communications devices, so one, some, or all of them can also include second antenna 117, and be also equipped with a suitable transceiver, for substantially similar purposes as that of gateway device 114, among others, such as keypad 106.

According to further aspects of the embodiments, each of the devices of network 100, which can include devices 104, 106, 108, 110, 112, 114, 116, 118, 120, 122, 124, 126, 128, and 130, can further include third antenna 119, which is adapted to work with one or more of third generation (3G), fourth generation (4G), and long term evolution (LTE) cellular (cellular) transceiver 216. Thus, controller 116 includes third antenna 119 and cellular transceiver 216 according to aspects of the embodiments.

As those of skill in the art can appreciate, and in fulfillment of the dual purposes of clarity and brevity, a more detailed discussion of the internal operation of controller 116 is not needed to understand the various aspects of the embodiments described herein, and therefore has been omitted from this discussion herein. However, such detailed discussion can be found in the co-pending related U.S. Non-provisional patent application referenced above, the entire contents of which are hereby incorporated herein in its entirety.

Control network 100 further comprises IEEE 802.15.4 communication network (communication network) 102. As those of skill in the art can appreciate, there can be one or more of each of the controllable or controlling devices described above in network 100, and even two or more communication networks 102a,b according to aspects of the embodiments. Control network 100 can further include LAN 134 (which can be an IEEE 802.3 communication network (e.g., Ethernet), router/firewall 136, and internet 132. As shown in FIG. 1, PED 104 can access control network 100 through internet 132 and/or LAN 134. In the former, a router/firewall 136 can be used to protect control network 100 and direct commands from PED 104 to the remaining components of control network 100, as well as provide feedback information to PED 104 from the devices of control network 100. As those of skill in the art can appreciate, a firewall a system designed to prevent unauthorized access to or from a private network. Firewalls can be implemented in either hardware or software, or a combination of both. A router is a device that forwards data packets along networks. A router can be connected to at least two networks and are located at gateways.

According to further aspects of the embodiments, sensors 108 provide information to the various hardware and software components of the system and method of the aspects of the embodiments that can be used to ascertain the location, movements, and mannerisms of the users of control network 100. That is, sensors 108 can be used in helping to determine patterns of usage, and also to augment decision making capabilities in determining what actions to take (e.g., open or close shades based on occupancy (or lack thereof)), or what actions not to take, as the case may be, according to aspects of the embodiments.

According to aspects of the embodiments, the one or more controllable devices comprise lighting control device (lighting device) 110, which can include devices such as a lighting dimmer, and shade control device (shade device) 112, which can include devices such as a shade motor. It should be understood that the controllable devices are not limited to a dimmer and a shade motor. For example, lighting device 110 can be a switch or a relay panel, and shade device 112 can be a drapery motor or a smart window film. Additionally, those of skill in the art can appreciate that the controllable devices are not limited to lighting control devices and shade control devices. For example, the controllable devices can be: A/V devices 118 that can include one or more of content sources (audio source, video source), content sinks (stereos with speakers, televisions, and the like), video recorders, audio receivers, speakers, projectors, and the like; Lighting devices 110 that can include one or more of lamps, ballasts, light emitting diode (LED) drivers; HVAC devices 120 that can include one or more of thermostats, occupancy sensors, air conditioning units, heating units, filtration systems, fans, humidifiers, and the like; Shading devices 112 that can include one or more of motorized window treatments, dimmable windows, and the like; Security devices 122 that can include one or more of security cameras, monitors, door locks, and the like; Household appliances 124 that can include one or more of refrigerators, ovens, blenders, microwaves, and the like; Control devices 126 that can include one or more of switches, relays, current limiting devices, and the like; and Industrial devices 128 that can include one or more of motors, pumps, chillers, air compressors, and the like.

In addition, control network 100 can comprise one or more control points 106 for receiving user inputs to control each of the one or more controllable devices. Control points 106 can be keypads, touch-panels, remote controls, and thermostats. For the purposes of this discussion, and in fulfillment of the dual purposes of clarity and brevity, control points shall herein after be referred to as keypads 106. Additionally, keypads 106 can be user interfaces of the controllable devices themselves. Keypads 106 can transmit control commands to and through communication network 102 to control each of the other controllable devices of control network 100, as well as communicate information to/from such controllable devices. For example, keypads 106 can communicate with each of the controllable devices or with controller 116 either directly or via one or more of gateways 114 and/or repeaters 130 (repeaters 130 can communicate with additions control networks 100b, and/or communication networks 102b, and so on).

According to further aspects of the embodiments, keypad 106 can comprise feedback indicators to provide feedback to the user. The feedback indicators can include any combination of visual feedback indicators, haptic feedback indicators, and audible feedback indicators. Feedback indication control can be provided by keypad 106 upon receiving a user input, upon requesting feedback, or upon a change in the status of any of the controllable devices 108-130, and PED 104.

Such controllable lighting devices 110 and controllers 116 can be manufactured by Crestron Electronics Inc., of Rockleigh, N.J. For example, one or more controllable lighting devices 110 and controllers 116 can comprise the following devices, each available from Crestron Electronics: CLW-DIMEX wireless lighting dimmer, CLW-DELVEX wireless lighting dimmer, CLW-SWEX wireless switch, CLW-DIM-SWEX wireless switch/dimmer combination, CLW-LSWEX wireless lamp switch, CLF-LDIMUEX wireless lamp dimmer, CLWI-DIMUEX universal phase dimmer, CLWI-SWEX in-wall switch, CLWI-1SW2EX in-wall 2-channel switch, CLWI-DIMFLVEX 0-10V Dimmer, CLCI-DIMUEX wireless in-ceiling dimmer, CLCI-1DIMFLV2EX wireless In-Ceiling 0-10V dimmer, CLCI-1SW2EX wireless in-ceiling switch, CLC-1DIMFLV2EX-24V wireless in-ceiling 0-10V dimmer.

Other components of control network 100 can also be manufactured by

Crestron Electronics Inc. These include one or more controllable shade devices 112 and controllers 116 that comprise the following devices: CSC-ACEX infiNET EX® Interface to shade motor, CSC-DCEX infiNET EX® interface to Crestron CSM-QMT30 Shades, CSC-DRPEX, and the CSM-QMT50EX QMT motor.

In addition, the one or more keypads 106 can comprise the following devices, also available from Crestron Electronics, Inc.: INET-CBDEX Cameo® Express Wireless Keypad with infiNET EX®, HTT-B2EX battery-powered infiNET EX® 2-button Wireless Keypad, and CLWI-KPLEX on-wall wireless lighting keypad.

As described above, sensors 108 can be included in control network 100 according to aspects of the embodiments. Such sensors 108 can include occupancy sensors, and motion sensors, as well as sensors 108 related to fire and smoke detection, bio-hazard sensors, and the like. The one or more sensors 108 can comprise the following devices, each available from Crestron Electronics, Inc. of Rockleigh, N.J.: GLS-OIR-CSM-EX-BATT battery-powered infiNET EX® occupancy sensor.

Controller 116 can be connected to the various controllable devices via either or both of a wired and wireless connection. The one or more controllers 116 can be a DIN-AP3MEX DIN Rail 3-Series® Automation Processor with infiNET EX®, or an MC3 3-Series Control System® with infiNET EX®, each of which are available from Crestron Electronics Inc. of Rockleigh N.J. Any one or more of these controllers 116 can provide a substantially complete integrated automation solution. According to aspects of the embodiments, the various controllable devices of the facility or enterprise become integrated and accessible through operation of controller 116. According to further aspects of the embodiments, controller 116 can be a server, a personal computer (PC), or any other electronic device capable of processing electrical signals. Still further, according to further aspects of the embodiments, controller 116 further comprises a web x-panel project, to allow for PC based setup. According to still further aspects of the embodiments, controller 116 can be a device manufactured by Crestron Electronics, Inc., of Rockleigh, N.J., comprising a PYNG-HUB. As shown in FIG. 1, controller 116 and gateway 114 can be arranged as two separate devices, but, as indicated by the dashed line forming a box around 114, 116, they can be arranged to be one device, or contained within a single enclosure.

According to still further aspects of the embodiments, each of the devices in FIG. 1 can be interconnected with other components in either or both of a wired or wireless manner. For example, PED 104 can connect to internet 132 via a cellular communications interface, or can be connected through router/firewall device 136 using conventional Ethernet cables. And, as shown in FIG. 1, PED 104 can be connected to LAN 134 via a wired interface (typically a category 5 type cable, i.e., Ethernet cable), or via a wireless interface such as the Wi-Fi connection that is also shown. According to still further aspects of the embodiments, each of the controllable and controlled devices of FIG. 1, such as sensors 108, controller 116, and gateway device 114, can use a wireless protocol such as infiNET EX. Other wireless communications protocols can also be used.

FIG. 2 is a block diagram of controller 116 for use with control network 100 according to an aspect of the embodiments. Controller 116 can be used to control various controllable devices, such as, for example, those described and discussed above that include, among others, controllable devices 108, 110, 112, 118, 120, 122, 124, 126, 128, and 130 (security devices (e.g., door locks), lighting system devices, blinds/drapes, HVAC system devices, and sensors such as motion sensors, among many others). One or more controllers 116 can comprise one or more logic engines for processing control commands.

Controller 116 can include at least one central processing unit (CPU) 202, as well as internal bus 220, the operation of which is known to those of skill in the art. For example, CPU 202 can represent one or more microprocessors, and the microprocessors may be "general purpose" microprocessors, a combination of general and special purpose microprocessors, or application specific integrated circuits (ASICs). Additionally, or alternatively, the CPU 191 may include one or more reduced instruction set processors (RISC), video processors, or related chip sets. CPU 22 can provide processing capability to execute an, run various applications, and/or provide processing for one or more of the techniques described herein. Applications that can run on controller 116 can include, for example, software for processing control commands, software for managing a calendar, software for controlling other electronic devices via a control network as noted above, among other types of software/applications.

Controller 116 can further include main memory 206, which can be communicably coupled to CPU 202, and which can store data and executable code, as known to those of skill in the art. Main memory 206 can represent volatile memory such as random access memory (RAM), but may also include nonvolatile memory, such as read-only memory (ROM) or Flash memory. In buffering or caching data related to operations of CPU 202, main memory 206 can store data associated with applications running on controller 116.

Controller 116 can also further include nonvolatile storage 204. Nonvolatile storage 204 can represent any suitable, nonvolatile storage medium, such as a hard disk drive (HDD) or nonvolatile memory, such as flash memory. Being well-suited to long-term storage, nonvolatile storage 204 can store data files such as media, software, and preference information. Nonvolatile storage 204 can be removable and interchangeable, thereby allowing portability of stored files, such as project files, created during programming of control network 100. According to aspects of the embodiments, project files can be used to map user desires into functions; as used thusly, project files are configuration files. These project files describe all the devices control system 100 knows about, what their buttons are configured to do, what types of devices they are, how they operate, and the operating parameters, among other features of each controllable device associated with control network 100. According to further aspects of the embodiments, project files can also be used to keep track of scheduling data, which users are using the system (e.g., identifiable by PED 104).

Also shown as part of controller 116 is network interface 208. Network interface 208 provides interface capability with one or more of several different types of network interfaces, including low rate-personal area network (LR-PAN) transceiver 212, wireless local area network (WLAN) transceiver 214, and cellular transceiver 216. Each of transceivers 212, 214, and 216 can provide wireless connectivity for controller 116 via respective ones of first, second, and third antennas 115, 117, and 119. Network interface 208 can represent, for example, one or more network interface controllers (NICRs) or a network controller. As those of skill in the art can appreciate, the difference between a LAN and PAN can be less certain, and more one of degree; that is, in some cases, PANs are defined as those interconnections of devices that are within a few meters of each other, while other definitions indicated that devices that are within ten meters or so and are interconnected in a manner that can be considered to be within a PAN. Regardless of the exact definition, or, if no exact definition should ever exist, control system 100 can make use of each of a WAN, LAN, and PAN, or sometimes two or all three at one time, depending on the circumstances, as those of skill in the art can now appreciate.

According to certain aspects of the embodiments, network interface 208 can include LR-WPAN transceiver 212. LR-WPAN transceiver 212 can provide capabilities to network with, for example, a Bluetooth® network, a near field communication (NFC) type network, an IEEE 802.15.4 (e.g. ZigBee) network among others. As can be appreciated by those of skill in the art, the networks accessed by LR-WPAN transceiver 212 can, but do not necessarily, represent low power, low bandwidth, or close range wireless connections. LR-WPAN transceiver 212 can permit one electronic device to connect to another local electronic device via an ad-hoc or peer-to-peer connection. However, the connection can be disrupted if the separation between the two electronic devices exceeds the proscribed range capability of PAN interface 212. As those of skill in the art can appreciate, the networks described by IEEE 802.15.4 are mesh-type networks, and operate with a central router/coordinator; in control network 100, the function of such central coordination is performed by one or more controller 116 and/or gateway 114, according to aspects of the embodiments.

Network interface 208 can also include WLAN transceiver 214. WLAN transceiver 214 can represent an interface to a wireless LAN, such as an 802.11 wireless network. The range of WLAN transceiver 214 can generally exceed the range available via LR-WPAN transceiver 212. Additionally, in many cases, a connection between two electronic devices via WLAN transceiver 214 can involve communication through a network router or other intermediary device (not shown in FIG. 2). WLAN transceivers 214 can also incorporate an ultra-wideband network.

According to further aspects of the embodiments in regard to controller 116, network interfaces 208 can include the capability to connect directly to a WAN via cellular transceiver 216. Cellular transceiver 216 can permit connection to a cellular data network, such as the enhanced data rates for global system for mobile communications (GSM) Evolution (EDGE) (also known as enhanced general packet radio service (GPRS) (EGPRS), or international mobile telecommunications (IMT) single carrier (IMT-SC) EDGE network, or other third generation/further generation (3G/4G) cellular telecommunication networks (a detailed discussion of which is both not needed to understand the aspects of the embodiments, and beyond the scope of this discussion). When connected via cellular transceiver 216, controller 116 can remain connected to the internet and, in some embodiments, to one or more other electronic devices, despite changes in location that might otherwise disrupt connectivity via LR-WPAN transceiver 212, or WLAN transceiver 214. Also shown in FIG. 2 as a component of controller 116 is internal bus 220, which provides signal and data flow to and between all of the internal components of controller 116 in a manner known to those of skill in the art.

As known by those of skill in the art, Ethernet connectivity enables integration with IP-controllable devices and allows controller 116 to be part of a larger managed control network. Whether residing on a sensitive, security-conscious corporate LAN 134, a home network, or accessing Internet 132 through a cable modem, controller 116 can provide secure, reliable interconnectivity with IP-enabled devices, such as touch screens (which can be part of keypad 106), computers, mobile devices, video displays, Blu-ray Disc® players, media servers, security systems, lighting, HVAC, and other equipment—both locally and globally.

Controller 116 can also include one or more wired input/output (I/O) interface 210 for a wired connection between controller 116 and one or more electronic devices. Wired I/O interface 210 can represent a serial port. A serial port, as those of skill in the art can appreciate, is a serial communication physical interface through which information transfers in or out one bit at a time (as opposed to a parallel port, which transmits several bits (typically in groups of 8 bits wide) substantially simultaneously). While it is known that interfaces such as Ethernet, FireWire, and USB, all send data as a serial stream, the term "serial port" usually identifies hardware more or less compliant to the RS-232 standard, intended to interface with a modem or with a similar communication device.

Wired I/O interface 210 can also represent, for example, a Cresnet port. Cresnet provides a network wiring solution for Crestron keypads, lighting controls, thermostats, and other devices that do not require the higher speed of Ethernet. The Cresnet bus offers wiring and configuration, carrying bidirectional communication and 24 volte direct current (VDC) power to each device over a simple 4-conductor cable.

One or more infrared (IR) interfaces can also be part of wired I/O interface 210; the IR interface can enable controller 116 to receive and/or transmit signals with infrared light. The IR interface can comply with an infrared data acquisition (IrDA) specification for data transmission. Alternatively, the IR interface can function exclusively to receive control signals or to output control signals. The IR interface can provide a direct connection with one or more devices such as a centralized AV sources, video displays, and other devices.

Controller 116 can also include, but not necessarily, one or more programmable relay ports 218a-c. Programmable relay ports 218 can be used by controller 116 to control window shades, projection screens, lifts, power controllers, and other contact-closure actuated equipment. Controller 116 can include, as programmable relay port 218, a "Versiport" relay port that is manufactured by Crestron Electronics Inc., of Rockleigh, N.J. The Versiport relay port can be managed by a DIN-108 module (also manufactured by Crestron Electronics Inc.), which is a DIN rail-mounted automation control module that provides eight Versiport I/O ports for interfacing with a wide range of third-party devices and systems. Each "Versiport" can be configured via software to function as a digital or analog sensing input, or as a digital trigger output. When configured as a digital input, the Versiport can sense a contact closure or logic level signal from devices such as motion detectors, partition sensors, alarm panels, 12V triggers, and all types of switches and relays. When configured as an analog input, the Versiport can sense changes in a resistance or DC voltage level, working with everything from temperature and light sensors to water level meters to volume control potentiometers. When operating as a digital output, the Versiport provides a logic level closure signal to trigger control and alarm inputs on a variety of external devices.

Thus, one or more "Versiport" programmable relay ports 218 can enable the integration of occupancy sensors, power sensors, door switches, or other devices by providing a dry contact closure, low-voltage logic, or 0-10 Volt DC signal.

By leveraging remote access of controller 116, a user can control one or more of the controllable devices and/or environment settings in a facility (home, place of business or manufacture, or enterprise location) from substantially anywhere in the world using PED 104. Such control can be accomplished by a domain name system (DNS) service. Those of skill in the art can appreciate that DNS is a hierarchical distributed naming system used for computers, services, or any resource that is connected to the internet or a private network. According to further aspects of the embodiments, controller 116 can be configured to utilize dynamic host communication protocol (DHCP) communications that include a hostname prefixed by a model number. A more detailed discussion of the internal operation of controller 116 is not needed to understand the various aspects of the embodiments described herein, and therefore is beyond the scope of discussion herein. However, such detailed discussion can be found in the aforementioned Applicants' co-pending U.S. Non-Provisional patent application, as referenced above.

According to aspects of the embodiments, controller 116 hosts a project file, such as a Crestron Core 3 project file, also referred to as "Smart Graphics [Project]," which is intended to be used by one or more mobile devices (such as PED 104) with a control application (App) such as a Crestron App (located on PED 104). As described above, one or more project files can be created during the installation of control network 100. The Crestron App is designed to receive and render the Smart Graphics project file. The Crestron App is responsible for communicating taps and feedback to the user. Additionally, Smart object App can be created for use with a local Crestron Mobile Pro Project as well as with foreign AV processors. The Crestron Mobile Pro project can contain just a Core 3 Smart Object and nothing else. The Smart Graphics Project file, located on controller 116, is a collection of items that are meaningful in some way to a control system program, such as Crestron App. This collection of items can include things like "buttons," "sliders," or "text" (among other graphical representations). According to further aspects of the embodiments, Smart graphics project file can include "smart object" file, which can be a predefined conglomeration of other objects (buttons, slides, among others). For example, a lighting smart object file can comprise a slider to report/set a light level, and a few buttons to raise/lower and turn on/off the lights. According to further aspects of the embodiments, in control network 100, smart object file talks directly to a Pyng-HUB, such as controller 116. As such, smart object files can be used in or by any smart graphics project file, and they'll communicate with control network 100 and Crestron App, even if the project (i.e., the program currently being executed) is intended to control an external AV processor.

Referring back to FIG. 1, control network 100 further comprises communication network 102 that provides access with and between devices of control network 100 according to aspects of the embodiments. Communication network 102 can be a PAN, LAN, metropolitan area network, WAN, an alternate network configuration, or some other combination of network types and/or topologies.

According to an aspect of the embodiments, communication network 102 can employ both wired and wireless communication protocols. For example, the controllable devices can form communication network 102 with gateway device 114 (operating in a wireless manner) by communicating over a short range communication protocol such as Crestron infiNET EX wireless protocol (e.g., the IEEE 802.15.4 wireless protocol). Or, according to a different aspect of the embodiments, gateway device 114, operating in a wired manner, can form a LAN with PED 104 communicating via Ethernet protocols using a wire-based Ethernet capability (it can also do so in a wireless manner). According to a further aspect of the embodiments, controller 116 or PED 104 can connect via a WAN such as the world wide web to access data stored on a remote server (not shown in FIG. 1).

According to further aspects of the embodiments, communication network 102 can be a public switched telephone network (PSTN). Alternatively, communication network 102 can further include a cable telephony network, an internet protocol (IP) telephony network, a wireless network, a hybrid cable/PSTN network, a hybrid IP/PSTN network, a hybrid wireless/PSTN network, or any other suitable communication network 102 or combination of communication networks. In addition, other network embodiments can be deployed with many variations in the number and type of devices, communication networks, the communication protocols, system topologies, and myriad other details without departing from the spirit and scope of the aspects of the embodiments.

Referring now to FIG. 3, control network 100 can include one or more gateway devices 114. According to a further aspect of the embodiments, controller 116 further comprises a built-in gateway 114. According to still further aspects, control network 100 can comprise an external gateway 114, such as a CEN-RFGW-EX gateway, available from Crestron Electronics, Inc.

According to aspects of the embodiments, gateway 114 of control network 100 provides network devices with an entrance to communication network 102 through controller 116 and can include software and/or hardware components to manage traffic entering and exiting communication network 102 and conversion between the communication protocols used by the network devices and communication network 102.

Gateway 114 can be configured to operate in both a wired a wireless manner and act as the network coordinator, and can further manage network configurations. Additionally, gateway 114 can be configured to communicate with controller 116 via wired I/O interface 210, such as an Ethernet interface (IEEE 802.3). One such gateway 114 according to an aspect of the embodiments is the CEN-RFGW-EX wireless gateway manufactured by Crestron Electronics, Inc., and which is a two-way radio frequency (RF) gateway\transceiver designed to enable communications and management for a complete infiNET EX wireless network of dimmers, keypads, remote control devices (RCDs), among other types of devices. The CEN-RFGW-EX wireless gateway links the infiNET EX network to a Crestron control system via a wired connection such as Ethernet or Cresnet. infiNET EX dimmers, switches, keypads, thermostats, and other devices, can be linked to controller 116 via a single CEN-RFGW-EX gateway 114. Additional gateways 114 can be installed to support more devices. Wireless expanders (not shown in FIG. 1) can be added wherever needed to extend control network 100 by filling in gaps between devices. That is, according to aspects of the embodiments, expanders can reinforce the network when operating in accordance with mesh networks principles.

FIG. 3 illustrates a block diagram of gateway 114 according to an aspect of the embodiments. Gateway 114 can include one or more transceivers 212, 214, and 216, which can provide connectivity for gateway 114 when acting in a wireless manner. In addition to the transceivers 212, 214, 216, gateway 114 can further include a network interface (NWI) that comprises one or more network interface cards (NICs), or network controllers (NWCs). In certain embodiments, the network interface can include LR-WPAN transceiver 212, which can provide capabilities to network with, for example, a Bluetooth® network, NFC network, or a ZigBee/Infinet network, among others. As can be appreciated by those of skill in the art, the networks accessed by LR-WPAN transceiver 212 can, but do not necessarily, represent low power, low bandwidth, or close range wireless connections, such as that used by second antenna 117. LR-WPAN transceiver 212 can permit one electronic device to connect to another local electronic device via an ad-hoc or peer-to-peer connection.

Gateway 114 can further include wired I/O interface 210, which can represent an interface to a wired Ethernet-based network. Gateway 114 includes WLAN transceiver 214, which can access an IEEE 802.11x wireless network. The range of the WLAN interface (WLAN transceiver 214) can generally exceed the range available via the PAN interface. Additionally, in many cases, a connection between two electronic devices via the LAN interface can involve communication through a network router or other intermediary devices. As discussed above, gateway 114 further comprises LR-WPAN transceiver 212 that can access an IEEE 802.15.4 (e.g. ZigBee/InfiNet) network. As those of skill in the art can appreciate, the networks described by IEEE 802.15.4 are mesh-type networks, and operate with a central router/coordinator; in control network 100, the function of such central coordination is performed by one or more controller 116 and/or gateway 114, according to aspects of the embodiments.

In a wired configuration, wired I/O interface 210 can be a LAN power-over-Ethernet (PoE) interface that can be fashioned using an 8-wire RJ-45 female connection with two LED indicators. According to a further aspect of the embodiments, a another type of NWI can be Cresnet interface 302b, which is a 4-pin 3.5 millimeter (mm) detachable terminal block providing an interface for Cresnet proprietary communications on a LAN that includes power-over-Ethernet (PoE). The PoE interface can be configured for receiving both an electric power signal and an information signal from a control network. For example, Cresnet interface 302b can be connected through category 5 cable (CAT 5) to a LAN that contains a power supply, multiple control points, and signal generators. Through Cresnet interface/LAN PoE interface 302b, gateway 114 can interface with control network 100. For example, gateway 114 (which can be both wired and wireless) can communicate with controller 116, such as a PRO3 available from Crestron Electronics, Inc.

Gateway 114 comprises one or more connectors, indicators and interface buttons, as well as an antenna connection for the supplied antenna. Gateway further comprises LED indicators, such as power on/off LED 304, network activity indicator LED 306, and activity indicator LED 308. Power on/off LED 304 is an indicator that shows that operating power is being supplied to gateway 114 whether from the Cresnet network or a PoE connection. Network LED indicator 306 shows that communication with the Cresnet system is occurring. Activity indicator LED 308 shows that wireless communications are occurring, such as those that involve the elements of the wireless PAN.

Gateway 114 further comprises acquire button 310 and setup button 312. Acquire button 310 and setup button 312 can be recessed push buttons each with an indicator LED. Acquire button 310 can be employed to configure communication with the PAN and setup button 312 can be employed to configure communication with control network 100.

Gateway 114 can be placed in the "Acquire" mode via acquire button 310 or a different means, such as the pushing of certain buttons in a certain order. The associated LED can indicate that gateway 114 is in the "Acquire" mode. Once gateway 114 has been placed in the "Acquire" mode, the joining device can be brought into range and can be placed in the "Acquire" mode to be acquired by gateway 114 through a certain sequence. Such sequence involves the pushing of buttons in a certain, specific order, a detailed discussion of which has been omitted in fulfillment of the dual purposes of clarity and brevity. By pushing acquire button 310 a second time (within a predetermined time period), gateway 114 can exit the "Acquire" mode as indicated by the LED-illuminated acquire button 310.

As discussed above, control network 100 can further comprise PED 104. PED 104 can be a smart phone, tablet, remote control, personal digital assistant (PDA), or any other electronic device configured for presenting a user interface, such as a graphical user interface (GUI) and receiving user inputs, such as in the form of selections from a graphic user interface.

FIG. 4 illustrates a block diagram of a personal electronic device 104 for use with control system 100 according to aspects of the embodiment. PED 104 can include at least one central processing unit (CPU) 402. For example, CPU 402 can represent one or more microprocessors, and the microprocessors can be "general purpose" microprocessors, a combination of general and special purpose microprocessors, or ASICs. Additionally, or alternatively, CPU 402 can include one or more reduced instruction set (RISC), advanced RISC machine (ARM), or complex instruction set (CISC) processors, video processors, or related chip sets. CPU 402 can provide processing capability to execute an operating system (OS), run various applications, and/or provide processing for one or more of the techniques described herein. Applications that can run on PED 104 can include, for example, software for managing and playing AV content, software for managing a calendar, software for controlling telephone capabilities, software for controlling other electronic devices via a control network as noted above, as well as software for controlling various other functions and interconnected devices.

PED 104 further comprises main memory 414, which can be communicably coupled to CPU 402, and which may store data and executable code. Main memory 414 can represent volatile memory such as RAM, but can also include nonvolatile memory, such as ROM or flash memory. In buffering or caching data related to operations of CPU 402, main memory 414 can store data associated with applications running on PED 104.

PED 104 can also include nonvolatile storage 412. Nonvolatile storage 412 can represent any suitable nonvolatile storage medium, such as a HDD or nonvolatile memory, such as flash memory. Being well-suited to long-term storage, nonvolatile storage 412 may store data files such as media, software and preference information. Nonvolatile storage 412 can be removable and interchangeable, thereby allowing portability of stored files such as project files created during programming of control network 100. Those of skill in the art can appreciate that data associated with controlling certain other electronic devices, such as a project file for a control application, can be saved in nonvolatile storage 412.

Display 410 can display images and data for PED 104. As those of skill in the art can appreciate, display 410 is optional. If included in PED 104, however, display 410 can use any type of display technology, such as, but not limited to, a liquid crystal display (LCD), a light emitting diode (LED) based display, an organic light emitting diode (OLED) based display, a cathode ray tube (CRT) display, or an analog or digital television, among other types. According to other aspects of the embodiments, display 410 can function as a touch screen display through which a user can interact with PED 104.

PED 104 can further include user interface 408. User interface 408 can include indicator lights and user input structures, but can also include a GUI on display 410. As those of skill in the art can appreciate, user interface 408 can operate via CPU 402, using memory from main memory 414 and long-term storage in nonvolatile storage 412, among using other types of memory (such as an HDD, not shown in FIG. 4). According to aspects of the embodiments, if display 410 is not included in PED 104, indicator lights, sound devices, buttons, and other various input/output (I/O) devices can allow a user to interface with PED 104. If, however, display 410 is included in PED 104 and uses a GUI, user interface 408 can provide interaction with interface elements on display 410 via certain user input structures, user input peripherals such as a keyboard or mouse, or a touch sensitive implementation of display 410.

As can be appreciated by those of skill in the art, one or more applications can be opened and accessible to a user via user interface 408 and displayed on display 410 of PED 104. One or more of the opened applications can be run on CPU 402 in conjunction with main memory 414, nonvolatile storage 412, display 410, and user interface 408. Instructions stored in main memory 414, nonvolatile storage 412, or CPU 402 (CPU 402 can have its own internal storage, of many different types), of PED 104 can enable a user to install control network 100. As such, those of skill in the art can appreciate that the instructions for carrying out such techniques on PED 104 can represent a standalone application, a function of the OS on PED 104, or a function of the hardware of CPU 402, main memory 414, nonvolatile storage 412, or other hardware of PED 104.

One such application that can be opened and accessible to the user is a configuration application for installing control network 100 according to an aspect of the embodiments. The configuration application can be downloaded from an application marketplace such as from the Google Play application marketplace or the Apple iTunes® application marketplace, among other market places available through the internet, or other networks.

As briefly described above, the project file provides the instructions allowing the control application to communicate with the target control network (control network 100, according to aspects of the embodiments). Further, the project file comprises the menu pages of the control application corresponding to the locations of controllable devices. For example, the control application can display one or more menu pages identified by page identities for controlling the one or more controllable devices on control network 100 according to the project file. The menu pages comprise selectable elements corresponding to control functions as defined in the project file.

The configuration application displays a series of menu pages comprising selectable elements and graphical elements. As will be described in greater detail below, the one or more of the selectable elements can correspond to initialization functions of the configuration application. PED 104 can transmit signals to control network 100 according to the initialization functions selected by the user. Additionally, control network 100 can communicate with PED 104, such as by providing feedback signals to PED 104. According to an aspect of the embodiments, PED 104 can communicate with controller 116 running a logic engine via communication network 102. Gateway 114, according to further aspects of the embodiments, can be used to relay commands and return status information to and from sensors 108 and from the various controllable devices 110, 112, 118, 120, 122, 124, 126, 128, and 130

According to various aspects of the embodiments, PED 104 can include location sensing circuitry 406. Location sensing circuitry 406 can comprise global positioning system (GPS) circuitry, but can also represent one or more algorithms and databases, stored in nonvolatile storage 412 or main memory 414 and executed by CPU 402, which may be used to infer the location of PED 104 based on various observed factors. For example, location sensing circuitry 406 can represent an algorithm and database used to approximate geographic location based on the detection of local 802.11x (Wi-Fi) networks or nearby cellular phone towers.

PED 104 can also include wired I/O interface 210 for a wired interconnection between a first electronic device and a second electronic device. Wired I/O interface 210 can represent, for example, a universal serial bus (USB) port, an IEEE 1394 port, or a FireWire® port. However, wired I/O interface 210 can also represent a proprietary connection. Additionally, wired I/O interface 210 interface can permit a connection to user input peripheral devices, such as a keyboard or a mouse. In addition to wired I/O interface 210, PED 104 further comprises IR interface 430 that can enable PED 104 to receive and/or transmit signals with infrared light. By way of example, IR interface 430 can comply with an infrared IRDA specification for data transmission.

One or more network interfaces 208 can also be provided in PED 104. One or more of such network interfaces 208 can provide additional connectivity for PED 104. Network interfaces 208 can represent, for example, one or more NICs or a network controller. In certain embodiments, the network interface 208 can include LR-WPAN transceiver 212. LR-WPAN transceiver 212 can provide capabilities to network with, for example, a Bluetooth® network, an NFC network, or a ZigBee/CresNet network. As should be appreciated, the networks accessed by LR-WPAN transceiver 212 can, but do not necessarily, represent low-power, low-bandwidth, or close range wireless connections. However, as those of skill in the art can appreciate, the connection in a PAN can be disrupted if the separation between the two electronic devices exceeds the operational range capability of LR-WPAN transceiver 212. LR-WPAN transceiver 212 can permit one electronic device to connect to another local electronic device via an ad-hoc, or peer-to-peer connection, such as that defined by the wireless PAN protocol IEEE 802.15.n, communications network 102.

LR-WPAN transceiver 212 can also incorporate IEEE 802.15.4 (e.g. ZigBee) network, or an ultra-wideband network. As those of skill in the art can appreciate, the networks described by IEEE 802.15.4 are mesh-type networks, and operate with a central router/coordinator; in control network 100, the function of such central coordination is performed by either or both of controller 116 and/or gateway 114, according to aspects of the embodiments.

Network interface 208 can also include WLAN transceiver 214. WLAN transceiver 214 can represent an interface to a wireless LAN, such as an IEEE 802.11x wireless network (Wi-Fi). The wireless operating range capability of LAN interface 426 can generally exceed the wireless operating range capability available via LR-WPAN transceiver 212. Additionally, in many cases, a connection between two electronic devices via WLAN transceiver 214 can involve communication through a network router or other intermediary devices. In PED 104 WLAN transceiver 214 interfaces with first antenna 115, WLAN transceiver 212 interfaces with second antenna 117, and cellular transceiver 216 interfaces with third antenna 119 according to aspects of the embodiments. Communications network 134 is a wired or wireless LAN, such as that defined by IEEE 802.11.n (Wi-Fi), or 802.3 (Ethernet).

According to further aspects of the embodiments, network interfaces 208 of PED 104 can further include the capability to connect directly to a WWAN via cellular transceiver 216, and third antenna 119 according to aspects of the embodiments. Cellular transceiver 216 can permit a connection to a cellular data network, such as an EDGE network, or another 3G/4G network, among others. When connected via cellular transceiver 216, PED 104 can remain connected to the internet and, in some embodiments, to other electronic devices, despite changes in location that might otherwise disrupt connectivity via LR-WPAN transceiver 212, or WLAN transceiver 214. As will be discussed in greater detail below, wired I/O interface 210 and network interfaces 208 can represent both low- and high-bandwidth communication channels for transferring user data using the simplified data transfer techniques discussed herein.

PED 104 can also include NFC interface 416. NFC interface 416 can allow for extremely close range communications at relatively low data rates (e.g., about 464 kilobits/second (kb/s)), and can comply with such standards as International Standards Organization (ISO) 18092 or ISO 21521, or it can allow for close range communications at relatively high data rates (e.g., about 560 mega-bits/second (Mb/s)), and can comply with the TransferJet® protocol. NFC interface 416 can have a range of between about 2 to about 4 centimeters (cm) (or between about 0.78" to about 1.57"). The close range communication with NFC interface 416 can take place via magnetic field induction, allowing NFC interface 416 to communicate with other NFC interfaces, or to retrieve information from tags having radio frequency identification (RFID) circuitry. As discussed in greater detail below, NFC interface 416 can provide a manner of initiating or facilitating a transfer of user data from one electronic device to another electronic device.

PED 104 can also include camera 420. With camera 420, PED 104 can obtain digital images or videos. In combination with optical character recognition (OCR) software, barcode-reading software, or matrix-code-reading software running on PED 104, camera 420 can be used to input data from printed materials having text or barcode information. Such data can include information indicating how to control another device from a matrix barcode that can be printed on the other device, as described in greater detail below.

According to further aspects of the embodiments, PED 104 can also include one or more accelerometers 418 that can sense the movement or orientation of PED 104. Accelerometers 418 can provide input or feedback regarding the position of PED 104 to certain applications running on CPU 402. According to further aspects of the embodiments, accelerometer 418 can be provided by devices made using microelectromechanical system (MEMS) technology. MEMS devices, which can be defined as die-level components of first-level packaging, can include pressure sensors, accelerometers, gyroscopes, microphones, digital mirror displays, microfluidic devices, among other devices.

According to aspects of the embodiments, control network 100 can be configured to be installed by untrained users executing a configuration application on PED 104. According to further aspects of the embodiments, the control system and associated configuration application are referred to as Pyng, which are software programs created and manufactured by Crestron Electronics, Inc., of Rockleigh, N.J.

One such application that can be opened and accessible to the user is a configuration application for installing control network 100 according to an aspect of the embodiments. The configuration application can be downloaded from an application marketplace such as from the Google Play application marketplace, or the Apple iTunes® application marketplace, among other application market places available through the internet, or other networks. A detailed discussion of the configuration application is both not needed to appreciate the various aspects of the embodiments, and can be found in the co-pending U.S. Non-provisional patent application referenced above; as such, a detailed discussion has been omitted in fulfillment of the dual purposes of clarity and brevity.

Attention is now directed towards FIG. 5, which illustrates wall mount keypad (keypad) 106 that can be used in control network 100 as part of an acoustic sensory network (ASN) according to aspects of the embodiments. Keypad 106 includes display/touch panel 502 (an interactive display that can be an LCD or LED, or combination thereof), microphone(s) 504, optional audio processing board 505 (which comprises pre-amplifier 506, analog-to-digital converter (ADC) 508, and 60 Hertz (Hz) notch filter according to an aspect of the embodiments), processor 512, IEEE 811.15.4 LR-WPAN transceiver (transceiver) 212, WLAN transceiver 214, cellular transceiver 216 (and their respective antennas, 115, 117, and 119), internal bus 516, antenna 117, LAN/Ethernet connector 518, and voice recognition (VR) system-on-a-chip (SoC) circuit (VR SoC circuit) 520. As those of skill in the art can appreciate, other components have been omitted from FIG. 5 in fulfillment of the dual purposes of clarity and brevity, as they would not aid in understanding the various aspects of the embodiments. According to further aspects of the embodiments, the devices, software, algorithms, and other components of the ASN are described in reference to keypad 106 and controller 116, but can be distributed in one or more of any of the devices of network 100, e.g., gateway 114. In addition, one or more of the components of the ASN can be separated from keypad 106, such as microphones 504, audio processing board 505, and VR SoC circuit 520, according to aspects of the embodiments. For example, either or both of audio processing board 505 (and its components) or VR SoC circuit 520 can be included in controller 116 or gateway 114. However, in fulfillment of the dual purposes of clarity and brevity, and according to aspects of the embodiments, the following description of the devices, software, algorithms, and other components of the ASN shall be made in reference to keypad 106 and controller 116.

The ASN according to aspects of the embodiments includes audio processing components to interpret spoken words as commands to control the controllable devices, including those of lights and related devices, in such a manner as to overcome the problems of the prior art as previously described. That is, the ASN can include one or more microphones 504a,b, VR SoC circuit 520, or, in the alternative, optional audio processing board 505, to capture, process, and implement audible commands. As those of skill in the art can appreciate, VR SoC circuit 520 contains the necessary components to convert the audio signals received by each mic 504a,b, into digital form, provide filtering before and/or after conversion to digital form, perform additional processing (as described in greater detail below), and can, according to aspects of the embodiments, include software to identify the word (or words) that were spoken to produce the digital words. Such processing can be referred to as acoustic finger printing, or voice recognition. Further, VR SoC circuit 520 can also provide a time stamp to the received audio signal, which can be further used in processing in a manner to be described below, or the time stamp can be provided by other circuitry, such as, for example, controller 116. Optionally, substantially similar processing can occur in audio processing board 505; however, in fulfillment of the dual purposes of clarity and brevity, discussion shall only be made in regard to VR SoC circuit 520.

According to still further aspects of the embodiments, either or both of VR SoC 520 and audio processing board 505 can be implemented in one or more of the dimmers, wall mounted touch panels, remote control devices, and the like, all of which can be considered to be part of control network 100 and the ASN according to aspects of the embodiments.

In cases where it is implemented, audio processing board 505 accepts as an input the analog audible signal (audible signal) received from each of microphones 504a,b, applies a pre-amplification to the signal to scale it, then converts the same to a digital audible signal using ADC 508. The "raw" output of ADC 508 can then be filtered by notch filter 510 to remove as much 60 Hz "hum" as possible, and the filtered digital audible signal (digital audible signal) can then be sent to processor 512 for further processing.

Attention is also directed to FIG. 10, which illustrates several audio processing blocks that can occur within either or both of audio processing board 505 and VR SoC circuit 520 according to aspects of the embodiments. In fulfillment of the dual purposes of clarity and brevity, however, reference will be made as to the processing blocks as occurring within VR SoC circuit 520, although that need not necessarily be the case; one or more of the processing blocks shown is within VR SoC circuit 520 can also be implemented in one or more separate devices, such as ASICs, or even the processors of keypad 106, controller 116, and keypad 104, among other devices of network 100.

Referring now to FIGS. 5 and 10, microphones 504a,b receive audio commands spoken by a user or occupant of the home or enterprise location, along with other extraneous audio signals, the latter of which can be collectively referred to as audio noise; thus, the combined analog audio signal consists of an audio command and audio noise, and is represented as the analog audio signal from microphone 504a, or AASa, and similarly from mic 504b, AASb. Within VR SoC circuit 520, both of the analog microphone output signals encounter analog processing circuit 1002a,b respectively. Analog processing circuit can include, among other circuitry, 60 Hz notch filters, one or more of a low pass filter, high pass filter and a bandpass filter, pre- and post-amplifiers, and an ADC. The output of analog processing circuits 1002a,b can be referred to as digital audio signal "a" and "b," respectively, DASa, DASb. Although some noise has been removed, DASa,b both still contain ambient, background noise that can include one or more noise signals generated by fans, motors, audio sources, and non-command words, among others.

According to further aspects of the embodiments, upon conversion from an analog to digital form, each of DASa,b can have a time-date stamp applied to it. According to aspects of the embodiments, the application of a time-date stamp can be applied to the received digital audio signal by time-date stamp generator 1004. As those of skill in the art can appreciate, any processing steps that occur at processor 512 of keypad 106 (or any other similarly situated control or controllable device of control network 100) can also occur in one or both of gateway 114 and controller 116. The time-date stamp applied by time-date stamp generator 1004 can be used one or more different ways. For example, because each microphone's output can be time-stamped, it can be determined which microphone was closest to the source of the audio command (once processing occurs to decipher the command, discussed below). Further, because in subsequent processing the two microphones' outputs are combined, a single average time stamp value can be generated and applied to the combined audio command output from the respective keypad 106; this average time stamp can then be used and compared to other time stamps generated by other keypads 106 to further ascertain which keypad first received the audio command.

There are several mechanisms through which time stamps can be generated and applied according to aspects of the embodiments. As those of skill in the art can appreciate, a certain degree of accuracy is required in generating the time stamp in order to make the time stamp useful in determining the order of arrival of audio signals. The speed of sound, $V_s$, is about 1126 feet-per-second (fps) at sea level, under certain predefined conditions. The speed varies with temperature, humidity, and altitude, as those of skill in the art can appreciate, but the generally accepted "norm" value of V of 1126 fps can be used for the purposes of this discussion. Using this value yields a travel time of about 888.1 microseconds-per-foot (µs/ft). Most clock speeds of the processors and other digital circuitry will operate at much higher frequencies than 1100 Hz; however, it is not the absolute clock frequency that is important (though below a certain value, as those of skill in the art can appreciate, time stamping would not be effective), but that the clock speeds be substantially identical at each keypad 106, and be substantially in synchronization with each other, at least by several orders of magnitude in regard to the expected differences in time between when a first keypad marks the audio sound and a second keypad marks the same audio sound. According to aspects of the embodiments, there are several network communication protocols that can be used to generate time stamps of sufficient accuracy; one such system uses ZigBee, as described in papers entitled "Time Synchronization for ZigBee Networks," Cox, D. et al., IEEE 0-7803-8808, Sep. 2005, and "Non-invasive Time Synchronization for ZigBee Wireless Sensor Networks," Ferrari, P., et al., IEEE 978-1-4244-2275, March, 2008, the entire contents of both of which are incorporated herein by reference. Time-date stamp generator 1004 uses either or both the protocols described above, among others not mentioned, and generates the time-date stamp that is then added to digital word represented the amplitude output from each respective microphone; in this manner, the digital word now resembles a packet of data familiar to those of skill in the art of digital data transmission using protocols such as the Open Source Initiative (OSI) model and internet protocols, among others.

According to still further aspects of the embodiments, application of the time-date stamp can occur in one or both of controller 116 or gateway 114 after the audible command has been received from each of the keypads, assigned an identifier header (or footer), and transmitted following digitization. Thus, the digitized audible commands can be sent in real time to controller 116 or gateway 114. Considering the substantially instantaneous rate of communication from each keypad to the controller 116 (for purposes of this discussion, the use of controller 116 alone will be considered by means of a non-limiting example), such delay in time-date stamping can be negligible. According to further aspects of the embodiments, test communications can be sent to each keypad in order to ascertain a trip delay, and such delay time can be subtracted from each received audible command digital word after it has been received and time-date stamped, and prior to processing, as described below in regard to FIG. 8, and method 800.

Following the application of the time-date stamp by time-date stamp generator 1004, acoustic echo cancellation (AEC) algorithms can be applied through use of AEC processors 1006a,b to the respective digitals signals, DASa, b. The implementation and use of AEC processing is known to those of skill in the art, and therefore, in fulfillment of the dual purposes of clarity and brevity, a detailed discussion thereof need not be repeated herein. However, one known goal of use of AEC is to reduce extraneous media sounds from the digital audio signals. As those of skill in the art can appreciate, AEC can use an audio signal as a reference, and then cancels this reference signal from the microphone input. The reference signal can be provided to each AEC circuit from one or both of controller 116 and gateway 114. Such reference signal can be the audio portion of any video that might be playing in each respective room of the corresponding keypad 106, or audio signal that it being provided to amplifiers and speakers in each corresponding room. The AEC circuit uses a Least Mean Square (LMS) algorithm to create an adaptive filter used to eliminate the reference and acoustic echoes associate with it. In addition, non-linear adaptive filtering can also be used to further suppress this signal. According to aspects of the embodiments, this processing can occur in keypad 106, and the reference signal will then be provided to each keypad 106 from the media system to the respective keypad 106 either through the IEEE 802.15.4 radio connection (LR-WPAN transceiver 212 and second antenna 117), IEEE 802.11 radio connection (WLAN transceiver 214 and first antenna 115), cellular transceiver 216 (and third antenna 119), or via the IEEE 802.3 LAN connection (wired I/O interface 210). According to further aspects of the embodiments, AEC blocks 1006a,b can also include reverb reduction and/or active noise cancellation, the operation of which are known to those of skill in the art.

Following AEC in AEC blocks 1006a,b, the digital audio signal can be further processed and/or enhanced according to several further aspects of the embodiments. Each DAS from the respective microphones 504a,b in a first keypad 104a can have direction of arrival (DOA) processing performed in conjunction with directionally adapted beamforming (DABF); this processing can occur in DOA block 1008, which, as shown in FIG. 10, comprises at least two inputs, the respective DASs from each microphone 504a,b in first keypad 104a. The output of DOA block 1008 is another digital packet of data that includes the DOA processed digital audio signals and a relative angle that each microphone 504a,b received its analog audio signal. The DABF block 1010 receives that output from DOA block 1008 and uses the directional information (the relative angle) and further reduces the noise in the portion of the digital packet that represents the digitized and further processed audio signals. In this manner, the output of VR SoC circuit 520 has now substantially minimized or reduced the noise that accompanied the spoken command, so that the signal-to-noise ratio (SNR) has been improved of the spoken audio command.

A detailed discussion of the processing that occurs in either or both of DOA block 1008 and DABF block 1010 is not necessary to the understanding of the aspects of the embodiments; however, such processing is described in the following documents, the entire contents of each of which are incorporated herein in their entirety. Such documents include "A New DOA Estimation Method Using a Circular Microphone Array," Karbasi, A., et al., School of Comp. and Commun. Sciences, Ecole Polytechnique F'ed'erale de Lausanne CH-1015 Lausanne, Switzerland, and Common Platform Software Research Labs., NEC Corporation Kawasaki 211-8666, Japan, 2007; "Direction of Arrival Estimation Using the Parameterized Spatial Correlation Matrix," Dmochowski, J., et al., IEEE Transactions On Audio, Speech, and Language Processing, Vol. 15, No. 4, May 2007; and "Microphone Arrays: A Tutorial," McCowan, I., derived from "Robust Speech Recognition using Microphone Arrays," McCowan, I., PhD Thesis, Queensland University of Technology, Australia, 2001.

In addition, the following websites provide further information as to implementation of direction of arrival and directionally adaptive beamforming circuitry and processing: https://www.xmos.com/support/boards?product=35564, and http://www.vocal.com/voice/, both of which were current and available as of the date of filing of this U.S.

Non-provisional patent application, and the entire contents of each of which are incorporated herein in their entirety.

According to aspects of the embodiments, DOA and DABF processing can be implemented at each keypad 106 in regard to the one or more microphones 504 in the respective keypad 106, or, DOA and DABF processing can occur at a central location, such as in controller 116 and CPU 202 (or in gateway 114, among other "central locations"). Or, according to still further aspects of the embodiments, DOA processing can occur at each keypad, and DABF processing can occur at the central location such as controller 116 and CPU 202. Further, while it has been discussed and described that keypad 106 can have two microphones 504, according to further aspects of the embodiments, keypads 106 can have one, three, or even more microphones 504. Further still, one or more such microphones 504 can be stand alone units, i.e., one or more or a plurality of just microphones can be installed in one or more of the rooms/hallways of the home or enterprise location without keypad 106 in order to provide a larger area to listen for commands, and obtain more detailed spatial information about the location of the source of the audible command, as well as increasing the likelihood of accurately determining the room to which the command is being directed towards.

Following the processes described above, the digital audible signal can be processed by a speech recognition algorithm in order to attempt to discern the command that is contained in the digital audible signal. Such processing can be performed in each keypad 106. According to further aspects of the embodiments, however, such processing shall be discussed from the perspective of occurring in controller 116, within CPU 202, in fulfillment of the dual purposes of clarity and brevity. However, those of skill in the art can appreciate that such any of this processing, as well as additional processing described and discussed above and below, can be distributed throughout a network such as network 100, and could occur, for example, in one or more of gateway 114.

For example, one such command could be "lights off," as the person is leaving a bathroom. In a first scenario, it will be presumed that no extraneous noise exists, and that the command can only be heard by the keypad/processor in the room to which it is directed. Then, using a speech recognition algorithm in the respective keypad 106, processor 512 could relatively easily act on the command, and turn off the lights in the bathroom. Such "turning off" command can be acted upon even if the same command was received by an adjoining bedroom because of the relatively high percentage of certainty of the true nature of the command contained in the digital audible signal. As those of skill in the art can appreciate, speech recognition capabilities can be located throughout a residential or commercial facility to facilitate control of devices in the residence/office/enterprise location. However, as has been discussed above, extraneous noise does exist and it cannot be said with any degree of certainty that processor 512 of keypad 106 in the bathroom would act on such command, or that the lights of the bedroom next door would not also be turned off, much to the surprise of the occupant therein.

Therefore, according to further aspects of the embodiments, further processing of the received audio command can also determine the amplitude of the received digital audible signal at each respective keypad 106; such amplitude can be used by CPU 202 in controller 116 (or another processor, such as processor 512, though discussion will be directed to such processing occurring within CPU 202 from hereon in), to compare the amplitude of a plurality of received digital audible signals DASN. Relative amplitude between all of the received signals can be used to assist in determining which of the received signals was received first, as amplitude falls off with distance, as time increases as well. Therefore, if one of the received audio signals has a larger amplitude than the other, then the microphone associated with the (digital) audible signal with the larger amplitude can be considered to be the device to which the command is directed towards, or at least it can be considered as a factor to take into account. FIGS. 6 and 7, which are described in greater detail below, illustrate the principles of operation of the time-date stamp and amplitude determination.

According to further aspects of the embodiments, either or both of additional processing and additional circuitry can be used that reduces the likelihood of misinterpreting the received digital audio signal. The first item to be considered is the use of two microphones 504a,b in each keypad 106, as shown in FIG. 5. The outputs of mics 504a,b are both directed to VR SoC circuit 520, or audio processing board 505; as discussed above, only use of the former will be described herein in fulfillment of the dual purposes of clarity and brevity. When two (or more) mics 504a,b are used, the effects of noise on the intended audio signal can be reduced. Some sources of noise can include other people speaking, fans in bedrooms or bathrooms, ceiling speakers, televisions, cell-phones, and the like.

Those of skill in the art can appreciate that a detailed discussion of the technology and processing required to implement noise reduction with the use of two or more mics 504 is not needed to understand the aspects of the embodiments. Nonetheless, the following is provided for completeness. Regardless of how far away the source of the audio signal, i.e., the voice command, one signal from a respective mic 504 will be stronger than the other. The two sound waves can be compared following filtering, digitization, and other processing. The non-voice signal, or the one with the lower amplitude can be subtracted from the other, meaning the voice or audible command signal is now cleaner, with less noise.

According to aspects of the embodiment, the ASN can be part of a larger control system, such as control network 100. While the ASN can be part of control network 100, or the ASN can operate autonomously, reference from hereon in shall be made to only the ASN. As shown in FIG. 5, microphone 502 can incorporated into existing devices such as keypads 500 and motion detectors, or can be stand-alone independent devices with communications capabilities such as IEEE 811.14 PAN transceiver 514. Accordingly, each device can have local voice recognition capabilities (i.e., through the use of a "mini" processor that is co-located with the standalone microphone), of can be part of a centralized voice recognition system wherein voice recognition processing occurs at a remote server (such as gateway 114 or controller 116) or a combination of the two.

Attention is now directed towards FIG. 6, which illustrates the scientific principles upon which time-date stamping and amplitude determination are based. In FIG. 6, the source is shown as generating a sound; in this case, a "light-off" command directed towards room 1. The sound waves, as indicated, travel in the direction of arrow A, towards first and second microphones 504a1 and 504b1 of keypad 106a in room 1, and third and fourth microphones 504a2 and 504b2 of keypad 106b in room 2. The sound waves arrive at first and second microphones 504a1,b1 of keypad 106a in room 1 at times $T_{1'}$ and $T_{1''}$, respectively, with amplitudes of $A_{1'}$ and $A_{1''}$, respectively, wherein first microphone 504a1 is a distance $d_{1'}$ from the sound source, and second microphone 504b1 is a distance $d_{1''}$ from the sound source. Similarly, the sound waves arrive at third and fourth microphones 504a2,b2 of keypad 106b in room 2 at times $T_{2'}$ and $T_{2''}$, respectively, with amplitudes of $A_{2'}$ and $A_{2''}$, respectively, wherein third microphone 504a2 is a distance $d_{2'}$ from the sound source, and fourth microphone 504b2 is a distance $d_{2''}$ from the sound source. The calculations for determining the time in view of the velocity of sound are known to those of skill in the art, and therefore have been omitted herein in fulfillment of the dual purposes of clarity and brevity.

Accordingly, as the amplitude of the sound waves generally decreases with time and distance, the sound waves arriving at second microphone 504b1 should be somewhat smaller in amplitude, and arrive at a later time than those that arrive at first microphone 504a1. And, the sound waves at third microphone 504a2 should be smaller and arrive at a later time than those of second microphone 504b1, and so on for the fourth, and other microphones, depending on their spatial location with respect to the source of the sound. However, as those of skill in the art can appreciate, sometimes sound waves reflect off objects, causing larger amplitudes at farther distances, or become attenuated for a variety of reasons that might be different from one location to the other, even if the locations within a setting are within relatively short distances (meters, or yards), depending on the construction of the home or enterprise location. Thus, according to further aspects of the embodiments, amplitude or even time stamping might not be sufficiently dispositive in some cases in regard to the determination of which room the audible command is being directed towards, but in those circumstances they can be useful factors to take into account.

FIG. 7 illustrates a plan view of a floor of a house in which the system and method for determining which controllable device an audible command is directed to can be used according to aspects of the embodiments. Such a setting as discussed above can be as realized in FIG. 7, wherein room 1 is "Jordyn's Room" and room 2 is "Nolan's Room." Someone has just left room 1, at position (1), carrying bags in each hand, and cannot hit the light switch to turn off the lights on the way out. So, the person uses an audible command "Lights off," as they pass position (2). However, both of microphone 504a1,b1 (Jordyn's room, room 1) in keypad 106a, and both of microphones 504a2,b2 (Nolan's room, room 2) in keypad 106b, receive the audible command, and there can be confusion as to which lights to turn off. There could be someone still in Nolan's room, and to turn off those lights could be dangerous, or at least inconvenient. Since the first pair of microphones 504a1,b1 received the command earlier (through comparison of the time-date stamp), the controllable device associated with the first pair of microphones 504a1,b1 of keypad 106a will be directed to respond to the audible command. This processing decision can also be made, or verified, by comparing amplitudes of the first and second digital signals—amplitude $A_1$ will be greater, albeit by a small amount, than amplitude $A_2$, and as such whichever processor processes the received digital signals, it will ascertain that the command was directed to Jordyn's room, room 1, because the amplitude of the received signal is greater at Jordyn's room than at Nolan's room. According to aspects of the embodiments, the user would prefer that the lights in Jordyn's room be turned off well before they get to position (3)—the bottom of the stairs.

According to further aspects of the embodiments, the ASN can further include proximity sensors as a further means for discerning the presence or location of a user, which can assist in determining which room the command to the controllable device is directed towards. For example, in FIG. 7, there are shown a plurality of proximity sensors 702a-d, one each for Jordyn's room, Nolan's room, Raegyn's room, and the bathroom, as well, as 702e for the hallway. According to further aspects of the embodiments, proximity sensors can be the same or different as occupancy sensors; that is, an occupancy sensor can be a passive detection device; motion, heat, among other types. Proximity sensors can be active—using NFC, Bluetooth, Wi-Fi, or other low- or medium-power communications protocols, that transmit signals to which a device, such as PED 104, can respond to, thereby tracking movement and position of the user, without the user's input. For example, in FIG. 7, the user, when at position (2), has left Jordyn's room and is now at the top of the stairs. While each of proximity sensors 702a-e can, most likely, detect the presence of the user, each will have a different power level received signal from PED 104 that the user is carrying with them. Of course, as those of skill in the art can appreciate, this means that the user has to have loaded onto their PED 104 a configuration application that contains a portion of the program dedicated to the particular low- or medium-power communications protocol being used by the ASN. Thus, a central processor, such as central processor 116 or gateway 114 will receive data from each of proximity sensors 702 and will be able to check the signal strength level from each of proximity sensors 702a-e. The processor will therefore know that (a) the user has just left Jordyn's room, (b) is now headed down the stairs, and (c) that a command has just been issued by the user to turn off lights. A review of the light status of each of the rooms on that floor will determine that the lights were left on in Jordyn's room, and a command can now be generated and transmitted to turn them off.

While any one of the above proscribed processes can effectively turn off the light in the room as intended by the audible command—speech recognition algorithms, amplitude comparisons, time-date stamp comparisons, those of skill in the art can appreciate that additional problems can, from time to time, arise in the system and can potentially be the cause in erroneous operation. In some cases, any two of the three processes can be combined, or all three can be used. In addition, as immediately described below, additional processes can be implemented to construct an ASN that can operate substantially effectively, substantially all of the time.

As described above, according to aspects of the embodiments, one or more processors can obtain received digital audible signals (e.g., $DAS_1$ and $DAS_2$), and can process each of $DAS_1$ and $DAS_2$ using speech recognition algorithms to determine the nature of the command, if any, contained in $DAS_1$ and $DAS_2$. If the command can be ascertained with a degree of certainty that meets or exceeds a predetermined degree of certainty (those of skill in the art can appreciate that currently available speech recognition algorithms can assign a value of certainty in regard to recognition of the speech of the received digital audio signals), then the controllable device to which the received digital audible signal is directed can be instructed to act on the command. Sometimes, however, such received digital audible signals are not recognizable by the speech recognition algorithms. In these cases, additional processing can be necessary to ascertain the device to which the received DAS is directed. In this latter case, a time-date stamp can be applied to each received DAS, and then those time-date stamps can be compared to make a determination as to which DAS occurred first. The controllable device associated with the microphone that received the first DAS can then be directed to act on the command. In addition to comparing time-date stamps, the amplitude of the received DAS can also be compared; the controllable device associated with the microphone that received the DAS with the larger amplitude can be considered to be the one to which the command was directed. Amplitude comparisons, time-date stamp comparison, and speech recognition can be used independently of each other, or in various combinations with each other. Other processes can also be used, as described below.

According to further aspects of the embodiments, to reduce false positives, the ASN can include speech recognition algorithm (SRA) that recognizes and distinguish audible commands from silence. The SRA can learn, over time, the ambient noise levels of the room in which a respective microphone is located. According to an embodiment, these ambient levels become characterized as "silence" in the sense that they do not convey useful command and control information, or can be actually very low noise/sound level situations. According to further aspects of the embodiments, the SRA can then determine a state of silence (or absence of a command), a state that a command has been issued, and then silence again.

To reduce collocation errors, the SRA of the ASN recognizes zone commands. For example, the SRA of the ASN can recognize commands such as "Master Bathroom Off" and "Guest Room On," among others. In order to reduce errors in the acoustic sensory network, a user can speak such commands in a learning mode to that the SRA can learn to recognize the different vocal traits of the user or users. According to further aspects of the embodiments, any number of users can input "practice" commands that can then be learned by the SRA. However, as those of skill in the art can appreciate, the SRA and acoustic sensory network is not necessarily limited to such "learned" commands, nor does it even require such learned commands in order to recognize zone commands. However, by knowing the different zones beforehand, the SRA and acoustic sensor network can increase its efficiency in recognizing and responding to received DASs.

According to still further aspects of the embodiments, to reduce false positives and collocation problems, occupancy indicators can be utilized to determine location and deduce likely commands. For example, once an occupancy sensor determines occupancy in a room and automatically triggers the lights to turn on, the acoustic sensor network can then deduce that an "Off" command is likely to follow in that room. Similarly, other types of occupancy indicators can be combined, such as AV equipment operation, among others. Further, if a command is received by two or more co-located microphones, the occupancy sensors of each of the rooms can be checked, and if one still indicates an occupied room with the lights on, then it is likely the "Off" command was not directed towards it. However, additional processing can be implemented that takes into account time of day, day of the week, additional commands received within specified periods of time (e.g., correcting commands; a first "Off" command followed by a second "Off" command seconds later), among other processes.

According to further aspects of the embodiments, additional processing steps can be used to implement additional features. For example, to reduce privacy concerns, the ASN, at start-up, can temporarily employ a remote server to learn the operating environment of the keypad. Once a noise signature of the environment is deduced, the device may use a local processor to filter out background noise and recognize commands.

According to further aspects of the embodiments, the ASN, which is part of control network 100 (or which can be a stand-alone network), can reduce background noise to make determination of commands via SRAs more effective. In order to reduce background noise, the ASN can request that certain noise producing devices be turned off in an area where a command is likely to be heard. For example, after detecting lack of occupancy in a bedroom, the ASN can reduce the volume of any audio/video devices that may still be operating, and also reduce heating or air conditioning to the room; this can lower the ambient background noise, and make detection and determination of any commands easier.

According to further aspects of the embodiments, the ASN can reduce or eliminate collocation problems. As described above, collation problems are those that related to two or more microphone devices 504 that are relatively close to one another on two separate keypads 106 for different rooms; see, e.g., keypads 106a, 106b, in FIG. 7 for Jordyn and Nolan's room. One manner of reducing or substantially eliminating collocation issues, especially in systems that do not utilize zone commands, is to check for occupancy in different rooms/areas. After detecting occupancy in an area or room, the ASN can then disable microphones 504 known to be in adjacent zones (areas/rooms). According to further aspects of the embodiments the ASN can also use occupancy sensor data that shows no-occupancy as a means for reducing or substantially eliminating collocation issues. In this latter case, occupancy sensors from all adjoining rooms are checked against each other; if a room fails to show occupancy, then commands for that room that room would turn off lights are ignored. As those of skill in the art can appreciate, there are numerous variations on how to use occupancy sensor data by the ASN in processing commands to control controllable devices such as lights.

According to still further aspects of the embodiments, the SRA of the ASN can recognize characteristic sounds and deduce likely commands to be received in the vicinity. For example, a flushed toilet and running water are likely indicators that a bathroom microphone will receive a "lights off" command. A further example can be a garage door closing, among others.

According to still further aspects of the embodiments, the ASN can use voice or speech recognition to identify speakers, learn preferences, and set defaults accordingly. For example, the SAR algorithm of the ASN can recognize that certain individual users prefer certain temperature, humidity, AV, shade, and/or light settings, and set devices at those settings when detecting the user is present. When multiple users are present, the ASN can determine an optimal setting by taking into account each user's preference. According to still further aspects of the embodiments, when multiple users are present, the ASN can determine an optimum setting by taking into account each user's preference.

Attention is now directed towards FIG. 8 that illustrates a flow chart of method 800 for determining which controllable device out of a plurality of controllable devices an audible command is directed towards according to aspects of the embodiments.

As described herein, an encoding process is discussed in reference to FIG. 8 and method 800. The encoding process is not meant to limit the aspects of the embodiments, or to suggest that the aspects of the embodiments should be implemented following the encoding process. The purpose of the following encoding process is to facilitate the understanding of one or more aspects of the embodiments and to provide the reader with one or many possible implementations of the processed discussed herein. FIG. 8 illustrates a flowchart of various steps performed during the encoding process. The steps of FIG. 8 are not intended to completely describe the encoding process but only to illustrate some of the aspects discussed above. The encoding process can be further embodied in one or more programs that reside in one or more memory locations of one or more devices, such as, for example, VR SoC circuit 520, controller 116 and gateway 114, among other devices. However, in fulfillment of the dual purposes of clarity and brevity, discussion shall be made of method 800 as embodied in audible command processing and determination (ACPD) program 222 (shown in FIG. 2) that resides in memory 206 and can include one or more of AEC, DOA, and DABF processing, as well as SRAs.

Method 800 begins with optional method step 802. Each of the operations of method steps 802-810 has been described in greater detail above in regard to FIGS. 1-7; therefore, in fulfillment of the dual purposes of clarity and brevity, a detailed discussion of the same operations and system devices has been omitted from the discussion below of FIG. 8 and method 800. In method step 802, the ASN can be used to learn a user's speech characteristics in the manner as described above. In addition, method 800 can also acquire information regarding the zones or rooms of a building, office, home, or enterprise location. The latter information can be used to assist in determining which zone or room an audible command is directed towards as described in greater detail below. Method 800 can use the zone/room information to determine the intended "target" of the command by matching control devices to the rooms and zones, and verifying the presence and operational status of the proximity and occupancy sensors, and their locations with regard to each of the rooms and zones.

In method step 804, method 800 receives audio information in the form of an analog signal at one or more microphones 504 at one or more keypads 106 according to aspects of the embodiments. As described in greater detail above, the analog signals are digitized, time and date stamped, can be further processed to substantially eliminate or reduce noise (using AEC, DOA, DABF), and prepared for further processing. The audio signal is now in the form of digital data, or packets, and can be represented as $AF_n(t)$, where n ranges from 1 to the total number of keypads 106 that report an audible signal. In decision step 806 of method 800, each of the received plurality digitized audio signals $AF_n(t)$ is analyzed by a speech recognition algorithm (SRA) in ACPD program 222 in order to determine which keypad 106 and controllable devices the audio command signal is directed towards. According to one non-limiting aspect of the embodiments, for example, method 800 (and certain modules of ACPD program 222) can be directed to the control of lighting devise; therefore, each command is therefore understandable in the sense that is directed to turning lights on or off, or up or down in intensity, but the question is generally which room or zone is the command directed towards? As those of skill in the art can appreciate, however, the example of method 800 is not limited to lighting devices only, but can be used in controlling a plurality of different devices as has been described herein. With modifications that have been described herein method 800 can be used to control audio-video, HVAC, shading, security, and many other types of devices and/or systems, alone or in combination with each other. These can be embodied in one larger version of ACPD program 222, or can be embodied in multiple modules of ACPD program 222 as the case may be.

If the output of the SRA is of a certainty that exceeds a predetermined threshold of certainty, then method 800 can direct the command to the appropriate device ("Yes" step from decision step 806). If the output of the SRA is such that the controllable device of the audio signal cannot be discerned ("No" path from decision step 806), then method 800 proceeds to decision step 808. In decision step 808, method 800 compares the date-time stamp and magnitude of each of the received $AF_n(t)$ signals, presuming there is more than one (if there is only one, then method 800 applies the command to the controllable device to which the control device received the audible signal $AF_n(t)$). According to aspects of the embodiments, the magnitude of the earliest signal should be greater than the magnitude of later arriving signals. Thus, by way of example, if there are two audible signals, $AF_1(t_1)$ and $AF_2(t_2)$, $t_1$ should be less than $t_2$, and the magnitude of $AF_1(t1)$ should be greater than the magnitude of $AF_2(t_2)$. If this is the case ("Yes" path from decision step 808), method 800 proceeds to step 807 and applies the command to the controllable devices associated with the first keypad 106. The controllable devices of the control device that reports the earliest time-date stamp and greatest magnitude of $AF_n(t)$ are the controllable devices to which the command contained in the received $AF_n(t)$ signal will be directed towards. In this manner, method 800 takes into account the fact that the speed of sound in a home or office of enterprise location is essentially and substantially constant, and thus the control device that reports the earliest or greatest magnitude audible signal is the one that the command is directed to. If these equalities do not hold true ("No" path from decision step 808), then method 800 and ACPD program 222 are directed to decision step 810 for further processing and determinations according to aspects of the embodiments.

As those of skill in the art can no doubt now appreciate in view of the discussion above, there are situations and cases where the proscribed process steps 802-808 of method 800 might not be enough to discern which controllable device to direct the command to. Thus, in method step 810, additional parameters/processing/factors can be taken into consideration. As each of these has been described in greater detail above, they will be only briefly discussed again at this point in fulfillment of the dual purposes of clarity and brevity.

In method decision step 810, additional processing can be performed to determine which room or zone or controllable device the received audible signal is directed towards. One, some, or all of the following processing steps/parameters can be taken into account and/or performed, in any particular order, or none can and decision step 800 can terminate with step 808, as described above.

According to still further aspects of the embodiments, a further step that can be taken in decision step 810 alone or in conjunction with one or more of the other processing steps can be to make use of proximity sensors to determine which controllable device the audible signal (command) is directed to. That is, the system and method according to aspects of the embodiments, can use the knowledge of the presence, of lack of presence of a user as determined by one or more proximity sensors can be used to determine which controllable device the command is directed to. This can be accomplished through the use of low/medium power communications protocols such as Bluetooth, NFC, Wi-Fi, among others. According to aspects of the embodiments, a transmitted signal interrogates an electronic device such as PED 104; appropriate software located therein received such a transmission, and responds in kind to the proximity sensor.

A plurality of proximity sensors can send such location interrogation transmissions. Upon processing all of the responses from each proximity sensor, and determination can be made as to location based on the strength and/or time stamp of the signal transmitted by PED 104 and received by each of the proximity sensors.

According to still further aspects of the embodiments, a further step that can be taken in method step 810 alone or in conjunction with one or more of the other processing steps can be to make use of background and/or ambient noise in a passive measure. That is, the system and method according to aspects of the embodiments can use microphones 504 to periodically measure the background of ambient noise levels from time to time and one or more processors, wherever located, can store such readings. These noise levels can then be subtracted from future readings in order to facilitate the presence of commands. As those of skill in the art can appreciate, while such a determination may not in and of itself tell method 800 which controllable device the command is directed to, it can assist in helping to determine when a command has been issued, and in conjunction with other processing steps and/or parameter determinations can be used to determine the nature of the command (e.g., which controllable device in which zone/room the command is directed towards).

According to still further aspects of the embodiments, a further step that can be taken in method step 810 alone or in conjunction with one or more of the other processing steps can be to make active use of the occupancy sensor data. That is, the system and method according to aspects of the embodiments can determine the presence or not of a person or persons in a room, and further determine when such person or persons leave the room. Then it can be expected that any ensuing command could be directed towards that room or zone that was just vacated.

According to still further aspects of the embodiments, a further step that can be taken in method step 810 alone or in conjunction with one or more of the other processing steps can be to make active use of the output of the occupancy and proximity sensors. That is, the system and method according to aspects of the embodiments can turn off or reduce in volume any "noise" producing devices when occupancy and/or proximity sensors suggest that a room or zone is unoccupied. By reducing the ambient noise level—in this case, noise referring to any audible sound that is not a command (e.g., music, video audio)—the commands, or any commands that might be issued, will become easier to discern, and respond to.

According to still further aspects of the embodiments, a further step that can be taken in method step 810, alone or in conjunction with one or more of the other processing steps, can be to make active use of the output of the occupancy and proximity sensors in another, different manner than that just described. That is, the system and method according to aspects of the embodiments can turn off or disable one or more microphones 504 in one or more rooms or zones when occupancy and/or proximity sensors suggest that a room or zone is unoccupied. By eliminating one or more outputs from microphones 504 in which a command is not expected, the system and method according to aspects of the embodiments will be able to detect with greater accuracy the controllable device that the command is being directed towards.

According to still further aspects of the embodiments, a further step that can be taken in method step 810 alone or in conjunction with one or more of the other processing steps can be to make active use of background and/or ambient noises; that is, when certain background or ambient noises occur, the system and method according to aspects of the embodiments can predict future operations based on those noises. Such predictive behavior can be learned over time. By way of non-limiting examples, when a user closes a garage door, for example, a command to turn off the lights in the garage can be expected. Similarly, when a toilet flushes, or running water is turned off in the bathroom sink, the command to turn off the lights in the bathroom can be expected.

Once one, some, or all of the above additional processing for ascertaining the correct room to which the received audible command is directed towards are performed, method 800 (ACPD program 222) can determine whether, within a certain predefined degree of certainty as to which room the command is directed. If method 800 can make the determination ("Yes" path from decision step 810), method 800 proceeds to method step 807 wherein the command is applied to the specified controllable device of the specified room or controlled zone. If, however, after all of the processing of method 800 as embodied as ACPD program 222, a determination still cannot be made, then no response is provided, and the command is ignored. The user or users can be informed of this by some type of audible, visual, or haptic feedback, or any combination thereof (including all of the feedback methods).

FIG. 9 illustrates processing and memory components/circuitry of one or more of the personal electronic device 104 of FIG. 4, gateway device 114 of FIG. 3, controller 116 of FIG. 2, and any other devices that uses one or more processors as described herein that uses software and/or applications to perform various functions and actions as described herein according to aspects of the embodiments.

FIG. 9 illustrates processing and memory components/circuitry (generally referred to as a "computer" or PC) of one or more of the personal electronic device 104 of FIG. 4, gateway device 114 of FIG. 3, controller 116 of FIG. 2, and any other devices that uses one or more processors as described herein that uses or runs or implements software and/or applications, such as the configuration application, project files, or control applications, to perform various functions and actions as described herein according to aspects of the embodiments, suitable for use to implement method 800 for determining which controllable device an audible command is directed towards according to an embodiment.

PC 900 comprises, among other items, integrated display/touch-screen 902 (though not used in every application of PC 900), internal data/command bus (bus) 904, processor board/PC internal memory (internal memory) 932, and one or more processors 908 with processor internal memory 906 (which can be typically ROM and/or RAM). Those of ordinary skill in the art can appreciate that in modern PC systems, parallel processing is becoming increasingly prevalent, and whereas a single processor would have been used in the past to implement many or at least several functions, it is more common currently to have a single dedicated processor for certain functions (e.g., digital signal processors) and therefore could be several processors, acting in serial and/or parallel, as required by the specific application. PC 900 further comprises multiple input/output ports, such as universal serial bus ports 910, Ethernet ports 911, and video graphics array (VGA) ports/high definition multimedia interface (HDMI) ports 922, among other types. Further, PC 900 includes externally accessible drives such as compact disk (CD)/digital versatile disk (DVD) read/write (RW)

(CD/DVD/RW) drive 912, and floppy diskette drive 914 (though less used currently, many PCs still include this device).

Internal memory 932 itself can comprise HDD 916 (these can include conventional magnetic storage media, but, as is becoming increasingly more prevalent, can include flash drive memory 934, among other types), ROM 918 (these can include electrically erasable (EE) programmable ROM (EEPROMs), ultra-violet erasable PROMs (UVPROMs), among other types), and RAM 920. Usable with USB port 910 is flash drive memory 934, and usable with CD/DVD/RW drive 912 are CD/DVD disks 936 (which can be both read and write-able). Usable with floppy diskette drive 914 are floppy diskettes 938. External memory storage 924 can be used to store data and programs external to box 901 of PC 900, and can itself comprise another hard disk drive 916a, flash drive memory 934, among other types of memory storage. External memory storage 924 is connectable to PC 900 via USB cable 956. Each of the memory storage devices, or the memory storage media (906, 916, 918, 920, 924, 934, 936, and 938, among others), can contain parts or components, or in its entirety, executable software programming code or application (application, or "App"), such as ACPD program 222, which can implement part or all of the portions of method 800 described herein.

Bus 904 provides a data/command pathway for items such as: the transfer and storage of data/commands between processor 908, integrated display 902, USB port 910, Ethernet port 911, VGA/HDMI port 922, CD/DVD/RW drive 912, floppy diskette drive 914, and internal memory 932. Through bus 904, data can be accessed that is stored in internal memory 932. Processor 908 can send information for visual display to either or both of integrated and external displays, and the user can send commands to system operating programs/software/Apps 940 that might reside in processor internal memory 906 of processor 908, or any of the other memory devices (936, 938, 916, 918, and 920).

PC 900, and either processor internal memory 906 or internal memory 932, can be used to implement method 800 for determining which controllable device an audible command is directed towards according to an embodiment. Hardware, firmware, software or a combination thereof can be used to perform the various steps and operations described herein. According to an embodiment, App 940 for carrying out the above discussed steps can be stored and distributed on multi-media storage devices such as devices 916, 918, 920, 934, 936 and/or 938 (described above) or other form of media capable of portably storing information. Storage media 934, 936 and/or 938 can be inserted into, and read by devices such as USB port 910, CD/DVD/RW drive 912, and disk drives 914, respectively.

As also will be appreciated by one skilled in the art, the various functional aspects of the embodiments may be embodied in a wireless communication device, a telecommunication network, or as a method or in a computer program product. Accordingly, the embodiments may take the form of an entirely hardware embodiment or an embodiment combining hardware and software aspects. Further, the embodiments may take the form of a computer program product stored on a computer-readable storage medium having computer-readable instructions embodied in the medium. Any suitable computer-readable medium may be utilized, including hard disks, CD-ROMs, DVDs, optical storage devices, or magnetic storage devices such a floppy disk or magnetic tape. Other non-limiting examples of computer-readable media include flash-type memories or other known types of memories.

Further, those of ordinary skill in the art in the field of the embodiments can appreciate that such functionality can be designed into various types of circuitry, including, but not limited to field programmable gate array structures (FPGAs), ASICs, microprocessor based systems, among other types. A detailed discussion of the various types of physical circuit implementations does not substantively aid in an understanding of the embodiments, and as such has been omitted for the dual purposes of brevity and clarity. However, as well known to those of ordinary skill in the art, the systems and methods discussed herein can be implemented as discussed, and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, DVD, or other optical disk storage, magnetic cassettes, magnetic tape, magnetic disk storage or other magnetic storage devices, or any other medium which can be used to store the desired information and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or nonvolatile memory such as ROM and/or RAM. A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable and volatile/nonvolatile computer storage media. For example, the processor can access a hard disk drive that reads—from or writes-to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

Aspects of the embodiments provide for the use of unrelated multimedia devices while microphones are listening for voice commands. This technology also allows for intercoms and phone calls with improved fidelity in the presence of multimedia devices playing in the vicinity.

FIG. 11 illustrates conventional voice recognition system (CVRS) 1100. CVRS 100 comprises CVRS circuitry (CVRSC) 1102, video distribution system (VDS) 1150, internet 1126, and voice recognition server (VRSv) 1110, and interfaces with person 1122. Person 1122 speaks and generates unknown voice audio 1124, which CVRS attempts to decipher, and act upon, in the presence of unknown multi-media audio ($MMA_U$) 1120 broadcast by video distribution system (VDS) 1150, as well as audio broadcast by multi-media audio system (MMAS) 1138, which also can be referred to as $MMA_U$ 1120. VDS 1150 comprises high-definition multimedia interface (HDMI) transceiver 1128, display 1134, and audio sound bar 1132. CVRSC 1102 comprises VRS processor 1104, network connection 1106, one or more speakers 1114, and one or more microphones (mic) 1116. It is fairly well known by many people at this time how CVRSC 1102 operates. Each different type of CVRSC 1102 substantially continuously samples the output of an electrical transducer—a microphone—for the presence of a specific audio signal that is converted to an electrical signal. In many cases, the specific electrical signal represents electrically a known spoken word, such as "Siri®" or "Alexis®." These words will have a certain, known frequency response, which CVRSC 1102 can recognize, following digitization (such well known circuitry and details have been omitted from FIG. 11, in fulfillment of the dual purposes of clarity and brevity). When it is determined that this known command word has been spoken, CVRSC 1102 and VRSv 1110, using one or more voice recognition programs or algorithms, acquires and deciphers the spoken words that follow to determine what they are, discern their meaning, and respond to requests. Operation of CVRSC 1102, VRSv 1110, and its voice recognition algorithms are discussed in greater detail below. At this point in time, many people are aware of how such systems operate, even if they themselves do not own and operate the technology.

MMAS 1138 transmits electrical signals over speaker cable 1108 (or wirelessly, but such circuitry has not been included in FIG. 11) that are broadcast by transducers (speakers) 1114b, which can be located in the ceiling and/or walls or other locations within a room or building, or even outside the building. Such configurations are well known to those of skill in the art. The audio signals broadcast by speakers 1114,1132 can be referred to as $MMA_U$ 1120, and can consist of voice, music, and/or other types of sounds. The audio output by speakers 1114b, as well as other devices described below, is referred to as "unknown" because it is not known beforehand by CVRSC 1102 prior to being broadcast, and thus received by microphone 1116, and input to VRS processor 1104 and VRSv 1110. Consequently, because it is unknown audio, the voice recognition software/algorithms have greater difficulty compensating for it in determination the received voice audio. This is discussed in greater detail below.

HDMI transceiver 1128 receives video and audio signals either from a local or remotely located video source, such as a DVD player (not shown), or some other similar type of device, or via network/Internet 1126. Network 1126 can be virtually any type of network, such as a PAN, LAN, wide area network (WAN), the "cloud," micro networks, among others, as well as combinations thereof. The output of HDMI transceiver 1128 are electrical signals transmitted over HDMI cable 1130 (or wirelessly, not shown) and contain video and $MMA_U$ 1120 signals, the former of which is displayed by video display 1134, and the latter is broadcast by audio sound bar 1132. Audio sound bar 1132 typically contains several speakers, generally a mix of low frequency range, mid-frequency range, and high-frequency range speakers (e.g., 20-120 Hz, 100 Hz-10 kHz, and 8-20 kHz, respectively). The output of audio sound bar 1132 is $MMA_U$ 1120, i.e., another unknown type of audio.

In addition to the unknown audio broadcast by audio sound bar 1132, and the unknown audio broadcast by speakers 1114b, there is also shown in FIG. 11 one or more person(s) 1122 whom generate voice audio 1124, which is also an unknown type of audio signal. Thus, in FIG. 11, there are at least three sources of unknown audio: external MMAS 1138, HDMI transceiver 1128, and person 1122 (for each source-type, there can be one or more such sources). As those of skill in the art can appreciate, other types of unknown audio includes, but is not limited to, environmental sounds (wind, rain, sleet, hail, among other types), machine sounds (fans, motors, blowers. compressors, among other types), and background miscellaneous noise (other people talking, doors opening and closing, and sources of sound that are the same, or of similar nature.

As briefly discussed above, CVRSC 1102 comprises VRS processor 1104, mic 1116, and speaker 1114. Processor 1104 transmits and receives audio and voice responses over network connection 1106, which establishes a connection to internet 1126 in a known, conventional manner. In most, if not all CVRSCs 1102, voice recognition is generally accomplished at both a remotely located server such as VRSv 1110, and in processor 1104, as shown in FIG. 1. Processor 1104 detects the presence of a keyword (such as "computer") prior to transmitting audio files to VRSv 1110. VRSv 1110, accessible to CVRSC 1102 via internet/network 1126, is adapted to store in memory one or more voice recognition algorithms. Digitized signals, typically transmitted using IP packet based technology, are transmitted to VRSv 1110 where they are received and processed by the algorithms, and audio responses are sent back to CVRS 1102 for broadcasting by CVRS 1102 via one or more speakers 1114a. As those of skill in the art can appreciate, this means that each CVRSC 1102 will have its own unique internet protocol address. As those of skill in the art can further appreciate, this description is greatly simplified, but exemplifies the basic operation of CVRSC 1102. As those of skill in the art can still further appreciate, any and all communications can be via wired or wireless means, or any combination thereof, and can include one or more of cellular, satellite, NFC, Bluetooth, and WiFi (IEEE 802.11 (any and all variations, thereof)), as well as other wireless protocols.

Speaker 1114a outputs known multi-media audio ($MMA_K$) 1118 that it has received via internet/network interface 1106 that forms part of CVRSC 1102. Because CVRSC 1102 has knowledge of $MMA_K$ 1118 before it is broadcast, and received by its own mic 1116, it can decipher unknown voice audio 1124 in the presence of $MMA_K$ 1118, if no other, or substantially no other, unknown multi-media audio $MMA_U$ 1120 is present; however, those of skill in the art can appreciate that that scenario is rarely the case; that is, it is generally the case that there will always be background noise, or music, or other multi-media audio being broadcast from an unknown source. Such unknown sources can be external audio devices, such as external multi-media audio system 1138, and the multi-media audio output by HDMI transceiver 1128. It is the presence of unknown audio that makes it difficult to use CVRSC 1102 many times, because CVRSC 1102 and VRSv 1110 has increased difficulty in discerning the spoken commands in the presence of what is essentially background noise.

FIG. 12 illustrates a block diagram view of external audio compensated voice recognition system (EAC-VRS) 1200 according to aspects of the embodiments, wherein previously unknown multi-media audio $MMA_U$ 1120, which can be broadcast by VDS 1150, and/or audio from VRSv 1110, becomes known multi-media audio ($MMA_K$ 1118), and EAC-VRS 1202, according to aspects of the embodiments, can take into account the known multi-media audio $MMA_K$ 1118 to enhance the recognition of voice audio 1124 generated by person 1122 speaking, according to aspects of the embodiments.

EAC-VRS 1200 is adapted to interface with many of the same components as in CVRS 1102, and as such their operation need not be explained again, in fulfillment of the dual purposes of clarity and brevity. EAC-VRS 1200 further comprises EAC-VRS circuitry (EAC-VRSC) 1202, remotely located network microphone devices (NMD) 1212 1116, HDMI audio extractor device 1206, and audio amplifier 1210 according to aspects of the embodiments. Prior to discussing operation of EAC-VRS 1200, each of the new components of EAC-VRS 1200 will be described.

In FIG. 11, VDS 1150 was shown and described, and in FIG. 12, many of the same components exists in VDS 1220 as in VDS 1150. There are, however, some differences. For example VDS 1220 as shown in FIG. 12 further comprises HDMI audio extractor 1206, which is shown in greater detail in FIG. 15. Referring now to FIG. 15, HDMI audio extractor 1206 comprises HDMI transceiver 1502, which receives HDMI video and audio from HDMI transceiver 1128. Ostensibly, these two transceivers can be the same device, or different, in that HDMI transceiver 1128 is an initial or primary transceiver of HDMI video from either a stand-alone source, or the internet 1126. In addition, it is possible that HDMI transceiver 1502 may not, in some circumstances, be necessary to receive the HDMI video from HDMI transceiver 1128 according to aspects of the embodiments. In this case, HDMI video would be received directly by HDMI video and audio delay 1504. Following HDMI transceiver, the received combined video and audio signal is sent to HDMI audio extractor (audio extractor) 1506a, and HDMI video and audio delay (delay) 1504.

Audio extractor 1506a receives the un-delayed combined video and audio signal and, according to aspects of the embodiments, extracts the audio signal and sends it to audio transceiver 1208a. The audio signal can now be referred to as $MMA_K$ 1118, and transmits it (as transmitted audio signal 1218) to NMD 1212, which has a corresponding audio transceiver 1208. Audio transceiver 1208a can transmit transmitted audio signal 1218 via wired or wireless means to NMD 1212. In contrast to the transmitted signal from audio transmitter 1208b, discussed below, the audio signal transmitted by audio transmitter 1208a is not delayed. The purpose of delaying the audio signal is discussed in greater detail below.

As shown in FIG. 15, the combined HDMI video and audio signal received from transceiver 1502 is also sent to delay 1504. Delay 1504, which is programmable, can delay the combined signal by a pre-determined, programmable amount of time. Delay 1504 can be programmed to delay the combined video and audio signal from about 1 millisecond to about 10 milliseconds. According to further aspects of the embodiments, different ranges of delay are also possible. Once delayed, the combined video and audio delayed signal is output to video display 1134 and audio sound bar 1132, as well as to HDMI audio extractor 1506b. HDMI audio extractor 1506a extracts the audio from the delayed signal, and sends it to audio transceiver 1208b. Audio transceiver 1208b receives the now-known delayed audio signal (referred to as $MMA_K$ 1118') and transmits it (as transmitted audio signal 1218), in either or both of a wired or wirelessly manner, to audio amplifier 1210, if one exists in EAC-VRS 1200 according to aspects of the embodiments.

Referring back to FIG. 12, there is also shown audio amplifier 1210. Audio amplifier 1210 can receive as an input audio from MMAS 1138 through audio delay and extraction device 1222, or can receive delayed audio from HDMI audio extractor device 1206 as transmitted audio signal 1218 by audio transmitted 1208b. In this latter case, transmitted audio signal 1218 contains delayed known audio, $MMA_K$ 1118'. The received audio is processed and amplified and sent to speakers 1114b, which can be located in one or more of ceilings, wall, or exterior portions, and broadcast.

According to further aspects of the embodiments, audio delay and extraction device 1222, a detailed view of which is shown in FIG. 22, delays the unknown audio output from MMAS 1138. MMAS 1138 can be a tuner, reel-to-reel tape machine, compact disk player, conventional stereo system, a series of stereo components, turntable, network music streaming device, among other types of devices. The output of MMAS 1138 is processed by audio delay and extraction device 1222. Referring now to FIG. 22, it can be seen that un-delayed audio $MMA_K$ 1118 from MMAS 1138 is received by transceiver-digitizer 2202, which can digitize the output of analog devices, such as a tuner, if needed. The output of transceiver-digitizer 2202 is sent to delay 2204, which delays the digitized/digital audio signal, $MMA_K$ 1118', by a known, predetermined amount, and is sent to audio amplifier 1210; the other output of transceiver-digitizer 2202 is sent to audio transceiver 1208 in audio extraction and delay device 1222, which transmits, either in a wired or wireless manner, un-delayed audio output signal $MMA_K$ 1118 from MMAS 1138 to NMD 1212, where it is sent to AEC 1304 and processed, as described below.

Also shown in FIG. 12 is EAC-VRS NW processor 1204, a detailed block diagram of which is shown in FIG. 19. Referring now to FIG. 19, NW processor 1204 is shown and comprises microprocessor 1902, bus 1904, and delays 1504a,b, among other components not shown. As those of skill in the art can appreciate, many components of a processor have been eliminated from FIG. 19, as both beyond the scope of this discussion and not needed to understand the aspects of the embodiments. Therefore, in fulfillment of the dual purposes of clarity and brevity, illustration and discussion of the same have been eliminated from herein. Audio data, regardless of its ultimate origin, is received from interface 1106 in 1202, and placed on bus 1904, through command and control of microprocessor 1902. Audio data destined to be sent to audio transceiver 1208, and then to amplifier 1210, is put through programmable delay 1504b, and then to audio transceiver 1208. The audio signal is then referred to as $MMA_K$ 1118' (known audio, delayed). This can be music audio data, but can also be audio data generated in VRSv 1110, according to aspects of the embodiments. Audio data destined to be sent to speaker 1114, is put through programmable delay 1504a, and then to speaker 1114a. The audio signal is then referred to as $MMA_K$ 1118' (known audio, delayed). This is typically audio data that originates from VRSv 1110. Audio data destined to be sent to NMD 1212, is transmitted directly thereto, and referred to as $MMA_K$ 1118; in this case, this is any audio data received by processor 1204 according to aspects of the embodiments. The audio signal is then referred to as $MMA_K$ 1118 (known audio, un-delayed).

Attention is now directed back to FIG. 12. According to aspects of the embodiments, by tying in what was previously unknown audio, $MMA_U$ 1120, from external sources, into EAC-VRSC 1202, $MMA_U$ 1120 becomes known audio, $MMA_K$ 1118, and the voice recognition algorithms, which need either no or no-substantive modifications, can better discern voice audio 1124, as that now becomes virtually the only significant source of unknown audio in the environment in which EAC-VRSC 1202 operates. That is, being able to subtract or eliminate more sources of audio as being not relevant audio makes the voice recognition software and algorithms perform more effectively and efficiently, and therefor able to more readily discern spoken audio commands 1124. EAC-VRSC 1202 and the voice recognition algorithms can then better able determine what the voice commands are, and then react to them more precisely.

According to aspects of the embodiments, and as shown in FIGS. 12 and 15, unknown audio, $MMA_U$ 1120, can be obtained by EAC-VRS NW processor 1204 located in EAC-VRSC 1202 from extracted audio transceiver 1208 located in HDMI audio extractor device 1206. In the case of sending extracted audio to EAC-VRS NW processor 1204, HDMI extractor device 1206 sends both delayed audio $MMA_K$ 1118' and un-delayed $MMA_K$ 1118. EAC-VRS NW processor 1204 retrieves the audio, and broadcasts the delayed version ($MMA_K$ 1118') through speaker 1114a, and forwards the un-delayed version ($MMA_K$ 1118) to NMD 1212 through microphone interface 1214 for use in acoustic echo cancellation processes, described in greater detail below, in which the known audio is subtracted from the received outputs of mics 1306, as shown in FIGS. 13 and 14. Those of skill in the art can appreciate that this description of operation of the AEC is greatly oversimplified.

As those of skill in the art can appreciate, the response by VRSv 1110 (i.e., the response to a spoken query picked up by NMD 1212, is "unknown" audio until it is processed by EAC-VRS NW processor 1204, as well as other audio received by network connection 1106 through network 1126 (e.g., music from one or more streaming services, or music played by MMAS 1138, among other sources and types of audio) according to aspects of the embodiments. Thus, the input to network connection 1106 is shown to contain $MMA_U$ 1120, and it becomes known after being received and processed by EAC-VRS NW processor 1204.

In regard to HDMI video (and its accompanying audio) HDMI audio extractor 1206 processes the received video signals and audio signals, and in doing so, what was previously unknown audio becomes known audio $MMA_K$ 1118. No physical or electrical or any other type of transformation takes place other than insertion of a delay, as discussed above in regard to FIG. 15. Once HDMI audio extractor obtains the audio signals, and inserts a suitable delay, the otherwise unchanged audio (or combined audio-video) signals are re-transmitted to their destinations. Delayed audio and video is sent to audio sound bar 1132 and video display 1134. Delayed audio can also be sent to audio amplifier 1210 via audio transceiver 1208 in audio extractor 1206, and broadcast by speakers 1114b, as shown in FIG. 12.

According to further aspects of the embodiments, an external amplifier can be used to power remotely located speakers that are not directly connected to the audio source, or EAC-VRSC 1202. These external speakers (not shown) can be installed in ceilings, walls, or even outside, and powered by the external amplifiers (also not shown). The audio signals sent to the external speakers can be transmitted by audio transceiver 1208 located in either audio extractor 1206, or in amplifier 1210

As those of skill in the art can appreciate, most microphone arrays used for voice recognition are located in a device that has speakers—e.g., VRS 1102, as shown in FIG. 11. Some examples include a table top media speaker like Amazon Echo®. Further, there are televisions and sound bars located near televisions that contain mic arrays. These locations are not ideal because there is a poor echo return loss (ERL) in this configuration. ERL is the level of the sound coming from the speakers heard by the microphones compared to the level of the voice that the microphones are intended to pick up. Poor ERL often results in poor echo cancellation. To improve the ERL, it is desirable to locate the microphones as far as possible from the speakers and closer to the location where the person speaking is located. Better locations of the microphones include table top, ceiling mount and wall mount locations, among others.

Attention is now directed towards FIGS. 13 and 14. According to aspects of the embodiments, NMDs 1212 will not only be remotely located from speakers 1114, but will have additional features that facilitate voice pickup. Because NMD 1212 is remotely located, the circuitry located within NMD can be powered by one or more of a hard-wire connection to house power, one or more batteries (which can also be rechargeable), and a PoE device. None of these power devices have been included shown in FIG. 13 or 14 in fulfillment of the dual purposes of clarity and brevity, as those of skill in the art can appreciate how each of these devices operate. NMDs 1212 can each include a plurality of MEMs microphones 1306, as shown in FIGS. 13 and 14, which can be used in a linear (FIG. 13) or 2-dimensional configuration (FIG. 14) to enable direction of arrival and adaptive beamforming.

As shown in FIG. 13, each of MEMs mic 1306 is followed by its own AEC circuit 1304; those of skill in the art can appreciate that while MEMs mics 1306 are generally standalone, individual devices, AEC circuit 1304 can be configured in a package that includes eight or sixteen or even more such circuits, each accepting at least two inputs: the first being the output of MEMs mic 1306, and the other being the un-delayed known audio signal, $MMA_K$ 1118. In AEC circuit 1304, the known, un-delayed audio is subtracted from each of the outputs of the MEMs mics 1306. MEM mics 1306 detect acoustical energy, which consists of the delayed known audio, $MMA_K$ 1118' and unknown voice audio 1124, and convert the same to electrical signals, in a manner well known to those of skill in the art.

AEC processing then occurs. According to aspects of the embodiments, once the electrical signals representing the voice signals are received by AEC circuits 1304, the analog electrical signals are digitized and time-tagged, and processing ensues (in some instances, according to further aspects of the embodiments, each MEM mic 1306 output can be location tagged, and converted to a digital signal as well). According to further aspects of the embodiments, AEC circuit 1304 can also be built into the microphone assemblies themselves; however, for the purposes of this discussion, hereon in after, reference shall be made to reference signal $MMA_K$ 1118 being received and processed in AEC circuit 1304, as shown in FIG. 13, although those of skill in the art can now appreciate that such processing can also occur in mics 1116. As shown in FIG. 13, AEC occurs prior to dynamic beamforming in direction detection and beamforming (DDB) circuit 1302. Dynamic beamforming processes are well known to those of skill in the art, and therefore, in fulfillment of the dual purposes of clarity and brevity, a detailed discussion thereof will not be repeated herein.

According to aspects of the embodiments, it is in AEC circuit 1304 that previously unknown audio, $MMA_U$ 1120, which is now known audio, $MMA_K$ 1118 is used to isolate unknown voice audio 1124 from the outputs of MEMS mic 1306. That is, $MMA_K$ 1118 is used as a reference signal in AEC circuits 1304 to help create a filter needed to eliminate the sound of the unknown multimedia. According to aspects of the embodiments, if EAC-VRSC 1202 is being used in an intercom or phone mode, then $MMA_K$ 1118 can also contain the far end voice signal so that it is cancelled so that a full duplex call can be made. According to further aspects of the embodiments, a mix of multimedia (e.g., $MMA_K$ 1118) and far end signal (e.g., voice) can be used as a reference signal in AEC circuit 1304 so a conversation can be carried on while playing music. Sources of $MMA_U$ 1120 can include one or more of audio transmitted through network 1126, and HDMI video and audio (via VDS 1220).

According to still further aspects of the embodiments, the reference to the microphone device, or AEC circuit 1304 (e.g., $MMA_K$ 1118), is to be received at each AEC circuit 1306 such that it has a substantially constant latency between them all, meaning, the audio signal is received at each AEC circuit 1306a-n at substantially the same time. In order to facilitate a substantially equal arrival time at each AEC circuit 1306, a delay can be added to each path following receipt by EAC-VRS processor 1204 (not shown). According to further aspects of the embodiments, AEC circuit 1304 can also compensate for relatively minor differences in arrival times between the acoustic signals that are converted by MEMs mic 1306. In addition, and according to further aspects of the embodiments, known audio $MMA_K$ 1118 reaches AEC circuit 1304 prior to when delayed known audio $MMA_K$ 1118' reaches MEMs mic 1302. This principle is shown in FIGS. 16 and 17.

FIG. 16 illustrates a timing diagram of delayed known multi-media audio, un-delayed multi-media audio, and unknown audio from a speaker and/or other sources according to aspects of the embodiments, and FIG. 17 illustrates a simplified block diagram illustrating the principle of determining a time delay between the broadcasting of known audio from one or more speakers and receipt by a microphone associated with an acoustic echo cancellation device wherein knowledge of the delay increases the efficacy of echo cancellation and other audio system processes according to aspects of the embodiments.

FIG. 16 illustrates a timing diagram between delayed known audio $MMA_K$ 1118', un-delayed known audio $MMA_K$ 1118, and unknown audio 1124 in EAC-VRS 1200 according to aspects of the embodiments. According to aspects of the embodiments, insertion of a delay into the audio stream such that known audio is received at each of mics 1116/AEC circuit 1306 before receipt of the same audio broadcast by speakers 1114 along with the unknown voice audio 1124 provides for increased efficacy of echo cancellation and other audio system processes. According to aspects of the embodiments, EAC VRS 1202 can incorporate delay D1 (shown in FIG. 16 as $\Delta t$) between the source of each audio signal and speaker 1114 in order to ensure that un-delayed audio $MMA_K$ 1118 is received by AEC circuit 1306 before the same delayed audio $MMA_K$ 1118' is received by AEC device 1306.

Referring now to FIG. 16, the known audio $MMA_K$ 1118 is delayed by $\Delta t$, which is the length of time between lines A and B. That is, known broadcast audio $MMA_K$ 1118 is delayed by $\Delta t$, through audio delay 1504, located in both HDMI audio extractor device 1206, and in EAC-VRS NW processor 1204, and is processed concurrently with unknown voice audio 1124 at the time shown by line B. For simplicity, the unknown audio is shown in the form of a square wave, and each pulse is numbered. As those of skill in the art can further appreciate, the delay is substantially continuous, but in the diagram, it is shown as occurring at a single point in time. As can be seen, at line A, the difference between the two signals is two pulses. The delay processing "begins" at line A, when pulse 4 appears in the un-delayed audio signal. In actuality, unknown voice audio 1124 and delayed $MMA_K$ 1118', are combined. Because the un-delayed version arrives first at AEC circuit 1306, it has the opportunity (in this case, during the two pulse widths) to process the delayed audio before pulse 4 combines with $MMA_U$ 1124 and appears at the input of AEC 1306, which occurs at line B. This is shown by line C; Since AEC circuit 1306 has knowledge of MMAK 1118', it can subtract it from the combined signal of MMAU 1124 and delayed MMAK 1118'. Other processing can occur as well.

In order to implement the delay, delay 1504, as shown in FIG. 15, can be inserted in extractor device 1206 and processor 1204, though this need not necessarily be the case. That is, delay 1504 can also be a stand-alone device, or a separate circuit, among other configurations. In regard to EAC-VRSC 1202, once unknown audio MMAU 1120 is received at EAC-VRS NW processor (processor) 1204, delay 1504 delays the audio that is sent to speaker 1114a ($MMA_K$ 1118'), and un-delayed audio $MMA_K$ 1118 is sent to AEC 1306 for processing with audio received by MEMs mic 1306a-n. In regard to video and audio signals received via HDMI audio extractor 1206, according to aspects of the embodiment, an audio signal and its accompanying video signal can both be delayed a similar amount, then routed to video display 1134, and sound bar 1132. According to further aspects of the embodiments, the video signal does not need to be delayed, especially if the delay is kept very low, e.g., on the order of about 1-2 milliseconds.

As briefly discussed above, FIG. 16 illustrates the timing of the different signals and their respective processing. Although FIG. 16 illustrates the audio signals as discrete waveforms, those of skill in the art will understand that that is generally not the case, but has been done merely to make the illustration easier to understand. Nonetheless, the illustration of relative timing between the various audio signal and processing is the same regardless of whether the signals are discrete or substantially continuous in time.

Attention is now directed to FIG. 17, which illustrates a simplified block diagram showing the principle of determining an appropriate time delay between the broadcasting of known audio from one or more speakers and receipt by a microphone associated with an acoustic echo cancellation device wherein knowledge of the delay increases the efficacy of echo cancellation and other audio system processes according to aspects of the embodiments.

As those of skill in the art can appreciate, however, there are different methods in which to implement a delay of transmitted and broadcast audio signals. As described above, a physical delay device (delay 1504) can be added in one or more circuit locations. Another means for incorporating delay in a broadcast audio signal is to maintain a known physical separation between the speakers and microphones. FIG. 17 illustrates how each of these delays can be determined during system design. In FIG. 17, the physical delay device, delay D1, or delay 1504, is located on an output of audio received by system 1200. Then, as shown in FIG. 17, the time it takes for the audio to get from the source (within system 1200) to speakers 1114/1132 is designed at time $t_2$; the time through delay D1 and then output through speakers 1114/1132, and then when received by MEMs mic 1306.

Delay D2 is the time it takes for sound to arrive at MEMs mic 1306 after being broadcast by speakers 1114/1132. That is, delay D2 is determined by a separation distance between speakers 1114/1132 and MEMs mic 1306, as shown in FIG. 17, which is $\Delta x$. According to aspects of the embodiments, it has been determined that a delay of about 2 ms is appropriate in order for AEC circuit 1306 to have time to process previously unknown audio $MMA_U$ 1120 into known audio $MMA_K$ 1118. A delay of 2 ms from speaker 1114 to mic 1116 indicates a speaker-mic separation distance of about 0.686 meters (at standard temperature, pressure, and at sea level), which is about 2.25 feet, or 2'3".

Referring back to FIG. 13, once the combination of known audio $MMA_K$ 1118, delayed known audio $MMA_K$ 1118', and unknown voice audio 1124 is received by MEMs mic 1306, and processed by AEC circuit 1306 (which performs AEC and other audio signal processing techniques), the now processed audio, which comprises substantially only of spoken words, is first processed to determine if the keyword is present. As briefly described above, keyword detection is performed locally for several reasons. A first reason is privacy; if the speaker or speakers 1122 do not intend to use EAC-VRS 1200 according to aspects of the embodiments, then there is a reasonable expectation that their conversation is considered private, and should not be transmitted to the cloud or VRSv 1110. While every attempt is made to keep VRSv 1110 and EAC-VRS 1200 secure from hackers, it is not always possible to guarantee such protection. In addition, transferring large audio files that are not going to be processed can be a waste of valuable bandwidth through internet 1126 and use of VRSv 1110.

Thus, keyword detection occurs locally according to aspects of the embodiments. Such keyword detection can occur in any of AEC circuit 1304, DDB circuit 1302, or transceiver 1208; once detection of the keyword has occurred, the remainder of the conversation is digitized and transmitted to VRSv 1110, in a manner known to those of skill in the art. A discussion of the processing that occurs from this point onwards is both not needed to understand the aspects of the embodiments, nor within the scope of this discussion and as such has been omitted in fulfillment of the dual purposes of clarity and brevity.

Transmission of the large audio data files can be transmitted via network connection 1106 for voice recognition, intercom, and other purposes. Network 1126 can include the cloud, the internet, a LAN, WAN, and other types of networks. Various communications and network protocols can be used, such as session initiation protocol (SIP), which, as those of skill in the art can appreciate, is one of the most common protocols used in VoIP technology. SIP is an application layer protocol that works in conjunction with other application layer protocols to control multimedia communication sessions over the Internet. Other types of low latency network protocols include DANTE, AES-67 or AVB, among others. AES67 is a technical standard for audio over IP, and audio over Ethernet interoperability. As those of skill in the art can appreciate, the AES67 standard was developed by the Audio Engineering Society and first published in September 2013. It is a layer 3 protocol suite based on existing standards and is designed to allow interoperability between various IP-based audio networking systems such as RAVENNA, Livewire, Q-LAN and Dante. It also provides interoperability with layer 2 technologies, like Audio Video Bridging (AVB). AVB is an audio-video based network that implements a set of protocols developed by the IEEE 802.1 Audio/Video Bridging Task Group. AVB works by reserving a fraction of the available Ethernet bandwidth for AVB traffic. There are other low latency wireless protocols such as Bluetooth, 802.11, among others, that can be used, including proprietary protocols. A wired network interface can also be used for audio and configuration communication, as well as for power, using PoE.

There are numerous technologies and devices that currently exist that can be used in physical implementations of the aspects of the embodiments. By way of non-limiting example, one physical configuration that can be used implements four pulse density modulation (PDM) MEM mics 1306 connected to an XMOS manufactured "Far Field Voice Processor," acting as EAC VRS 1204. For the networking aspect of the implementation, a Dante Ultimo integrated circuit (IC), manufactured by Audinate, can be used for audio networking. The Dante Ultimo network IC provides bidirectional pulse code modulation (PCM) audio communication. One direction would be the microphone output, and the other would be the AEC reference input. The XMOS device can be connected to the Ultimo device using an $I^2S$ interface. As those of skill in the art can appreciate, the $I^2S$ interface is an electrical serial bus interface standard used for connecting digital audio devices together. It can be used to communicate PCM audio data between integrated circuits in an electronic device. The $I^2S$ bus separates clock and serial data signals, resulting in low jitter rates than is typical of communications systems that recover the clock from the data stream.

As briefly described above, according to further aspects of the embodiments, audio from video and external audio signals can also be extracted, and used as a reference signal in AEC circuit 1304. Referring back to FIG. 12, external video and audio signals are transmitted to EAC VRS 1200, and is received by audio extractor 1206. Audio extractor 1206 extracts the audio signal—referred to as $MMA_U$ 1120—from the video signal—making it into $MMA_K$ 1118, known audio, for use in AEC processing, as described above. $MMA_K$ 1118 is sent to NW processor 1204. as shown in FIG. 15, delay 1504 delays both the audio and video signal substantially equal amount. The delay provides for proper processing as discussed above. According to further aspects of the embodiments, delay 1504 does not necessarily have to delay the video as small audio delays are generally not noticeable, but can be included to keep the audio and video in as good a sync situation as possible. Use of delay 1504 provides that audio sent to AEC circuit 1304 is received ahead of the audio broadcast by speakers 1114/1132 and received by MEMs mic 1306. According to further aspects of the embodiments, HDMI video interface 1206 can also perform de-interlacing and/or scaling. In addition, as discussed above, low latency network connections can transmit the known audio reference signal, $MMA_K$ 1118 to AEC circuit 1306 and mic 1116. Such networks include DANTE and AES-67, with fixed and configurable delays in the range of a couple of milliseconds.

According to still further aspects of the embodiments, HDMI video interface 1206 can be made as two different components. That is, in a first aspect of the embodiments, HDMI video interface 1206 can be manufactured to be part of, or attached to HDMI Transceiver 1128. HDMI Transceiver 1128 can have a wired or wireless output that can include the output of HDMI video interface 1206, all of the outputs of which can be wired or wireless. According to still further aspects of the embodiments, a simple video and audio transmitter can be located at the output of HDMI Transceiver 1128, and the HDMI video and audio signal can be transmitted to audio sound bar 1132, video display 1134, either by wired or wireless means, and also transmitted to NMD 1212; in this case, delay 1504 can be located in NMD 1212 (recalling that small differences in timing between audio and video can be inconsequential when the video is viewed on a monitor). In addition, delay 1504 can also be located in audio amplifier 1210, and all of these spatially separated delays 1504 can be adapted to receive a substantially similar delay configuration signal that proscribes a fixed amount of delay for the audio signal, regardless of its source.

Referring back to FIG. 13, there is also shown optional network interface device (NID) 1308 (which can also be implemented in the configuration of FIG. 14, according to aspects of the embodiments, although the same has not been included in FIG. 14, in fulfillment of the dual purposes of clarity and brevity; its operation in the configuration of FIG. 14 is substantially similar to that of FIG. 13 and thus additional discussion is not needed). According to aspects of the embodiments, the audio output signal from MEMs mic 1306 may need to be converted to a format useful for cloud processing or VoIP calls. NID 1308 can be located within each of MEMs mic 1306, within AEC circuit 1304, or within DDB circuit 1302, or NID 1310 can be a stand-alone device, as shown in FIG. 13. If located in as a stand-alone device, NID 1308 can convert between the low latency real time audio network protocol and the higher-level protocols like hyper text transport protocol (http), session initiation protocol (SIP), or real time protocol (RTP). According to further aspects of the embodiments, it is also possible that a multitude of NMDs 1212 can be used throughout the room to improve coverage and improve SNR. In that case, NID 1308 can be used to combine the outputs of the plurality of NMDs 1212 using various algorithms (e.g., auto-mixing) to create a single voice output of higher quality.

FIG. 18 illustrates a block diagram view of external audio compensated voice recognition system with a surround sound stereo system (EAC-VRS-S) 1800 according to further aspects of the embodiment. EAC-VRS-S 1800 incorporates many of the same components as system 1200 shown in FIG. 12, though many have been eliminated from FIG. 18 in order to make the figure clearer and easier to understand. Nonetheless, those of skill in the art can or should appreciate that EAC-VRS-S 1800 operates substantially similarly to that of system 1200, and includes all of the same components. According to aspects of the embodiments, EAC-VRS-S 1800 comprises surround sound stereo source (stereo source) 1802, surround sound audio transfer cable (audio cable) 1804, surround sound speakers 1806*a-h*, surround sound audio transfer interface (audio interface) 1808, and surround sound audio transfer down-mixer (audio down-mixer device) 1810.

In EAC-VRS-S 1800, a 7.1 stereo surround system is included and operates in a conventional manner. In order to compensate for the complex audio output from the eight speakers when recovering unknown voice audio 1124, however, according to aspects of the embodiments, the complex 7.1 stereo audio signal is down-mixed to a mono or "true" stereo audio stream, which is then used as the un-delayed reference signal, $MMA_K$ 1118, and input to AEC circuits 1304 in NMD 1112. As shown in FIG. 18, the complex 7.1 stereo audio signal is transmitted first to audio interface 1808, which then passes the complex 7.1 stereo audio signal to both down-mixer circuit 2002 (shown in FIG. 20, which is a detailed block diagram of down-mixer device 1810) and delay 1504. The output of delay 1504 is then sent to speakers 1806*a-h* (1806*a*—right rear; 1806*b*, right middle; 1806*c*—right front; 1806*d*—center front; 1806*e*—left front; 1806*f*—left center; 1806*g*—left rear; and 1806*h*—subwoofer) to be broadcast via audio cable 1804 as delayed $MMA_K$ 1118'. At the same time, the complex 7.1 stereo audio signal is also input to down-mixer circuit 2002. Down-mixer circuit 2002 generates an un-delayed mono or "true" stereo audio signal, that is sent to EAC-VRS NW processor 1204 as un-delayed $MMA_K$ 1118, which directs it to NMD 1212 via mic interface 1214. Un-delayed MMAK 1118 representing the down-mixed complex 7.1 stereo audio signal is then forwarded to each AEC circuit 1304 in NMD 1212, to be used in the manner as described in detail above to obtain an as accurate as possible representation of unknown voice audio 1124 according to aspects of the embodiments. According to further aspects of the embodiments, once the keyword has been determined, delay 1504 can be instructed to mute its output i.e., shut down playing of the complex 7.1 stereo audio signal so that the balance of the speech command can be more readily understood.

According to further aspects of the embodiments, and referring back to FIGS. 12-20, any one or more of the paths that carry known audio, whether delayed or un-delayed, can be encrypted. In particular, according to still further aspects of the embodiments, un-delayed known audio MMAK 1118 can be encrypted prior to being sent to NMD 1212, and the returned audio stream be encrypted as well as it is sent to EAC-VRSC 1202 and then to VRSv 1110. That is, according to aspects of the embodiments, the output of DDB 1302 can be encrypted prior to be output and transmitted to EAC-VRS NW processor 1204. In addition, and according to further aspects of the embodiments, known undelayed audio signal MMAK 1118 can be encrypted by EAC-VRS NW processor 1302 prior to be transmitted to NMD 1212 from microphone interface 1214. Such encryption provides for additional security when EAC-VRS 1200 is used in a corporate board room, or meeting-room, setting, by way of non-limiting example.

FIG. 21 illustrates a flow chart of method 2100 for compensating for known audio in regard to unknown audio, so that the unknown audio can more be more clearly determined using an external audio compensated voice recognition system (EAC-VRS) according to aspects of the embodiments. Method 2100 begins with method step 2102 in which external audio is received by EAC-VRS 1200; as described above, such external audio can be audio associated with an HDMI transmission, audio from VRSv 1110, audio from an VoIP telephone call, or music from an external stereo audio system, such as MMAS 1138.

In method step 2104, the received audio is transmitted to AEC 1304, which is located in NMD 1212. The transmitted audio can also be referred to as undelayed audio, as no delay is applied to it as the audio that is forwarded to one or more of speakers 1114 in method step 2106. Even if the audio is extracted from a combined video-audio signal, it is delayed, and, according to aspects of the embodiments, the video can be equally delayed as well.

In method step 2108, which follows method step 2106, method 2100 receives an output from each mic in NMD 1212. The output of each of the mic's is the delayed version of the external audio received in method step 2102; the delay is inserted to that the AECs 1304 can have time to analyze the externally received audio signal, and be ready to perform processing when the same audio—at least in part—is received by the mics. That is, both the external audio and unknown voice audio is received at each mic, and output to a respective AEC circuit 1304; then in method step 2108, the undelayed external audio is subtracted from the mic output and what remains is substantially clearer unknown voice audio.

In decision step 2110, the unknown audio is checked to determine if the keyword has been spoken to initiate the voice recognition process. As those of skill in the art can appreciate, the voice recognition process is typically used in a query-answer mode, in which the speaker speaks the keyword, then asks a question, such as—"Keyword, can you tell me where to find a lobster?" If the question is ambiguous, or not recognizable, voice recognition algorithms can query the speaker for additional information. Or, if the question in not ambiguous, algorithms in VRSv 1110 find a most suitable answer and return it to EAC-VRS 1202 to be broadcast to the speaker. While such explanation is greatly simplified, those of skill in the art can appreciate that a detailed discussion of how such voice recognition application operate is not needed to understand the aspects of the embodiments, and therefore, in fulfillment of the dual purposes of clarity and brevity, and more detailed discussion has been omitted from herein.

If the keyword has not been received, and/or not understood ("No" path from decision step 2110), method 2100 returns to step 2102 and continues to receive external audio and perform method steps 2104-2110, until the case when the method step is both received and understood ("Yes" path from decision step 2110). Then, method 2100 proceeds to method step 2112, wherein the process for transmitting the query to VRSv 1110 begins. As those of skill in the art can appreciate, while the term "query" has been used herein, the spoken audio by user 1122 does not necessarily need to be an actual question for it to be transmitted to VRSv 1110. Method 2100 then continues to transmit the audio spoken by user 1122 (all the while continuously performing the receipt and subtraction process as described in method steps 2102-2108) until either the receipt of a transmission termination command (e.g., "stop"), or a period of silence that is at least as long as a predetermined period of silence that indicates an end of a query to VRSv 1110 (method step 2114). Then, following the termination of the transmission, method 2100 reverts back to method step 2102, and begins the process again. As those of skill in the art can appreciate, there is often the difficulty to illustrate graphically what occurs in a method in which substantially continuous processing occurs; as such, the devices illustrated in FIGS. 12-20 substantially continuously perform the processing steps illustrated in FIG. 21 as embodied as method 2100 according to aspects of the embodiments.

The embodiments discussed herein can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include ROM, RAM, CD-ROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to, when implemented in suitable electronic hardware, accomplish or support exercising certain elements of the appended claims can be readily construed by programmers skilled in the art to which the embodiments pertain.

INDUSTRIAL APPLICABILITY

To solve the aforementioned problems, the aspects of the embodiments are directed towards systems, methods, and modes for controlling controllable devices in the control network based on audio commands alone, according to an aspect of the embodiments, and in further aspects of the embodiments, controlling the controllable devices of the control network based on audio commands and other sensory information.

The disclosed embodiments provide a system, software, and a method for determining which of one or more controllable devices an audible command is directed towards using one or more of speech recognition, time-date stamping, amplitude analysis, and other techniques, as described herein. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

Alternate Embodiments

Alternate embodiments may be devised without departing from the spirit or the scope of the different aspects of the embodiments.

What is claimed is:

1. A method for determining one or more spoken words, comprising:
   receiving an electrical audio signal from an external source (un-delayed external source audio signal);
   delaying the external source electrical audio signal by a delay device with a first predetermined delay (delayed external source audio);
   transmitting the delayed external source audio to a one or more loudspeakers to generate a delayed acoustic external source audio signal (undesired acoustic audio signal);
   transmitting the un-delayed external source audio signal to a first input of an acoustic echo cancellation (AEC) device as a reference signal;
   generating desired acoustic audio signals by one or more people;
   receiving both the desired acoustic audio signals and the undesired acoustic audio signals at one or more microphones within a microphone system, and converting the same from acoustical energy signals into electrical audio signals and outputting them as microphone output audio signals;
   receiving the microphone output audio signals from the one or more microphones at a second input of the AEC device, and receiving the reference signal at the first input of the AEC device;
   processing the reference signal and the microphone output audio signals in the AEC device, wherein the first predetermined delay is substantially equal to a second delay that occurs between the generation of the undesired acoustic audio signals by the one or more loudspeakers and the processing of the microphone output audio signals;
   cancelling substantially all of the reference signal from each of the microphone output audio signals in the AEC device; and
   outputting the same from the AEC as a corrected audio signal.

2. The method according to claim 1, wherein the step of cancelling comprises:
   subtracting the reference input signal from each of the microphone output audio signals and outputting the result as the corrected audio signal.

3. The method according to claim 1, further comprising:
   receiving two or more corrected audio signals at a direction detection and beamforming (DDB) device and combining the same into a single audio output signal.

4. The method according to claim 3, further comprising:
   encrypting the output of the DDB device prior to outputting the single audio signal.

5. The method according to claim 1, wherein
   the external amplifiers and speakers are located within an audible detection radius of the AEC circuit.

6. The method according to claim 1, wherein
   the external amplifiers and speakers are located within hearing distance of the one or more microphones.

7. The method according to claim 1, further comprising:
   detecting a spoken keyword in the corrected audio signal by a keyword recognition device.

8. The method according to claim 7, further comprising:
   initiating transmission of the corrected audio signal to a voice recognition server through a network following detection of the spoken keyword; and
   terminating transmission of the corrected audio signal upon the occurrence of a termination event.

9. The method according to claim 8, wherein the termination event comprises:
   at least one of a timeout condition, and one or more termination words.

10. The method according to claim 1, wherein
    the corrected audio signal comprises substantially only a desired spoken audio signal.

11. The method according to claim 1, further comprising:
    receiving the corrected audio signal at a voice recognition system; and
    performing speech recognition analysis on the corrected audio signal by the voice recognition system.

12. The method according to claim 11, further comprising:
    responding to the recognized corrected audio signal by the voice recognition system.

13. The method according to claim 1, further comprising:
    operating the microphone system in a full duplex intercom mode.

14. The method according to claim 1, further comprising:
    operating a first microphone and one or more additional microphones through a voice recognition system in a full duplex intercom conversation mode.

15. The method according to claim 1, further comprising:
    operating the microphone system as a telephone system.

16. The method according to claim 15, further comprising:
    conducting telephone conversations between a first microphone and one or more additional microphones.

17. The method according to claim 1, wherein the microphone device comprises:
    an Ethernet network device.

18. The method according to claim 17, wherein
    the Ethernet network device is adapted to receive power over a power-over-Ethernet interface.

19. The method according to claim 1, wherein
    the microphone system is associated with a voice recognition system.

20. The method according to claim 1, further comprising:
    encrypting the reference signal prior to being transmitted from the external audio system to the AEC device.

21. A method for determining one or more spoken words, comprising:
    receiving acoustic audio signals at one or more microphones within a microphone system, and converting the same from acoustical energy signals into electrical audio signals and outputting them as microphone output audio signals;
    receiving the microphone output audio signals from the microphone device at a first input of an acoustic echo cancellation (AEC) device, and receiving a reference input signal at a second input of the AEC device;
    subtracting the reference input signal from the microphone output audio signals; and
    outputting the same as a corrected audio signal, and wherein
      the reference signal comprises an audio signal generated by an external audio system, and wherein
      the received acoustic audio signals comprises a combination of a desired spoken audio signal and a delayed version of undesired audio signals, and wherein
      the delayed version of the undesired audio signal has been delayed by a delay device with a first predetermined delay, and wherein
      the reference signal comprises an un-delayed version of the undesired audio signals, and further wherein the corrected audio signal comprises substantially only a desired spoken audio signal.

22. The method according to claim 21, further comprising:
   receiving two or more corrected audio signals at a direction detection and beamforming (DDB) device and combining the same into a single audio output signal.

23. The method according to claim 22, further comprising:
   encrypting the output of the DDB device prior to outputting the single audio signal.

* * * * *